United States Patent [19]

Willard et al.

[11] Patent Number: 5,555,183
[45] Date of Patent: Sep. 10, 1996

[54] METHOD AND APPARATUS FOR SYNCHRONIZING TO A SYNCHRONOUS SELECTIVE CALL SIGNAL

[75] Inventors: David F. Willard, Plantation; Robert J. Schwendeman, Pompano Beach; William J. Kuznicki, Coral Springs; Michael J. DeLuca, Boca Raton, all of Fla.

[73] Assignee: Motorola, Inc, Schaumburg, Ill.

[21] Appl. No.: 191,881

[22] Filed: Feb. 3, 1994

Related U.S. Application Data

[63] Continuation-in-part of Ser. No. 801,574, Dec. 2, 1991, Pat. No. 5,325,088.

[51] Int. Cl.$^6$ .............................. H04Q 7/18; H04Q 7/06
[52] U.S. Cl. .............................. 340/825.21; 340/825.44; 340/825.2; 455/38.3; 375/354
[58] Field of Search .................................. 455/38.1, 38.3, 455/343; 379/57; 340/825.2, 825.21, 825.44; 370/105.1; 375/354

[56] References Cited

U.S. PATENT DOCUMENTS

| | | | |
|---|---|---|---|
| 4,398,192 | 8/1983 | Moore et al. | 340/825.44 |
| 4,422,162 | 12/1983 | Davis et al. | 365/227 |
| 4,668,949 | 5/1987 | Akahori et al. | 340/825.47 |
| 4,839,639 | 6/1989 | Sato et al. | 455/343 |
| 4,860,003 | 8/1989 | DeLuca et al. | 340/825.44 |
| 4,897,835 | 1/1990 | Gaskill et al. | 370/94.1 |
| 4,995,099 | 2/1991 | Davis | 455/343 |
| 4,996,526 | 2/1991 | DeLuca | 455/343 |
| 5,089,813 | 2/1992 | DeLuca et al. | 455/343 |
| 5,128,665 | 7/1992 | DeLuca et al. | 340/825.47 |
| 5,128,932 | 7/1992 | Li | 370/60 |
| 5,150,954 | 9/1992 | Hoff | 340/825.44 |
| 5,168,493 | 12/1992 | Nelson et al. | 370/84 |
| 5,185,604 | 2/1993 | Nepple et al. | 340/825.44 |
| 5,252,963 | 10/1993 | Snowden et al. | 340/825.44 |
| 5,349,695 | 9/1994 | Zhong et al. | 455/343 |

OTHER PUBLICATIONS

"Semi–Distributed Addressing, a New Concept for ERMES Radio Protocol" dated May 11, 1989 by an unknown author.
"Sub–addressing, a Battery Saving Method" dated Mar. 16, 1989 by an unknown author.

*Primary Examiner*—Donald J. Yusko
*Assistant Examiner*—Edward Merz
*Attorney, Agent, or Firm*—D. Andrew Floam

[57] ABSTRACT

A selective call receiver (111) receives a synchronous selective call signal (99) having synchronization portions (102 and 104) and a frame identification portion (106). Upon finding the signal the selective call receiver's bit and frame synchronizers (126 and 128) synchronize to a frame (100) of the signal and a frame ID decoder (130) decodes the frame ID (106). A comparator (136) compares the received frame ID (106) with an ID (142) assigned to the receiver, and optionally a first and second mask (134A and 134B) to determine the number of frames until an occurrence of a desired frame and conserves power until the occurrence of the desired frame (188).

4 Claims, 20 Drawing Sheets

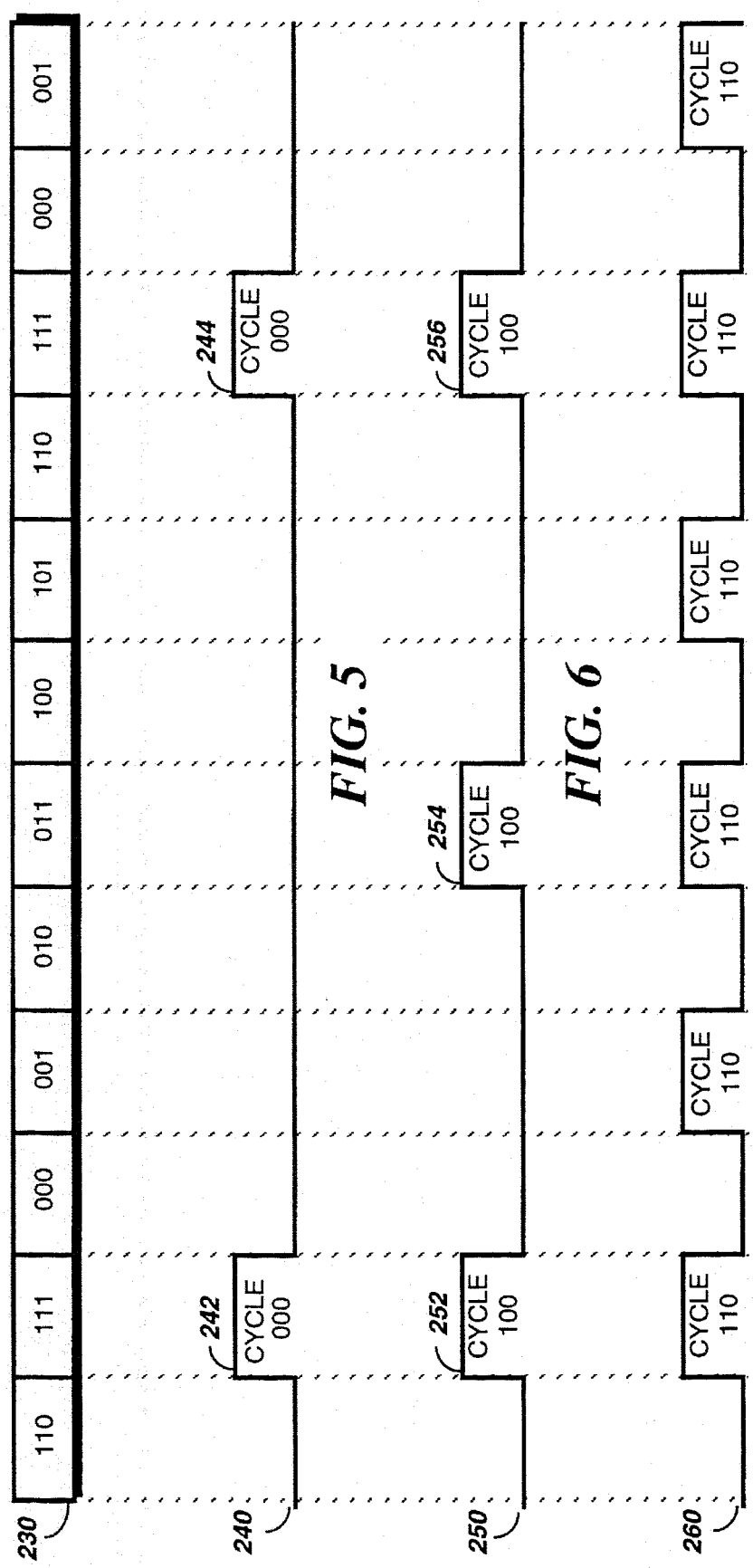

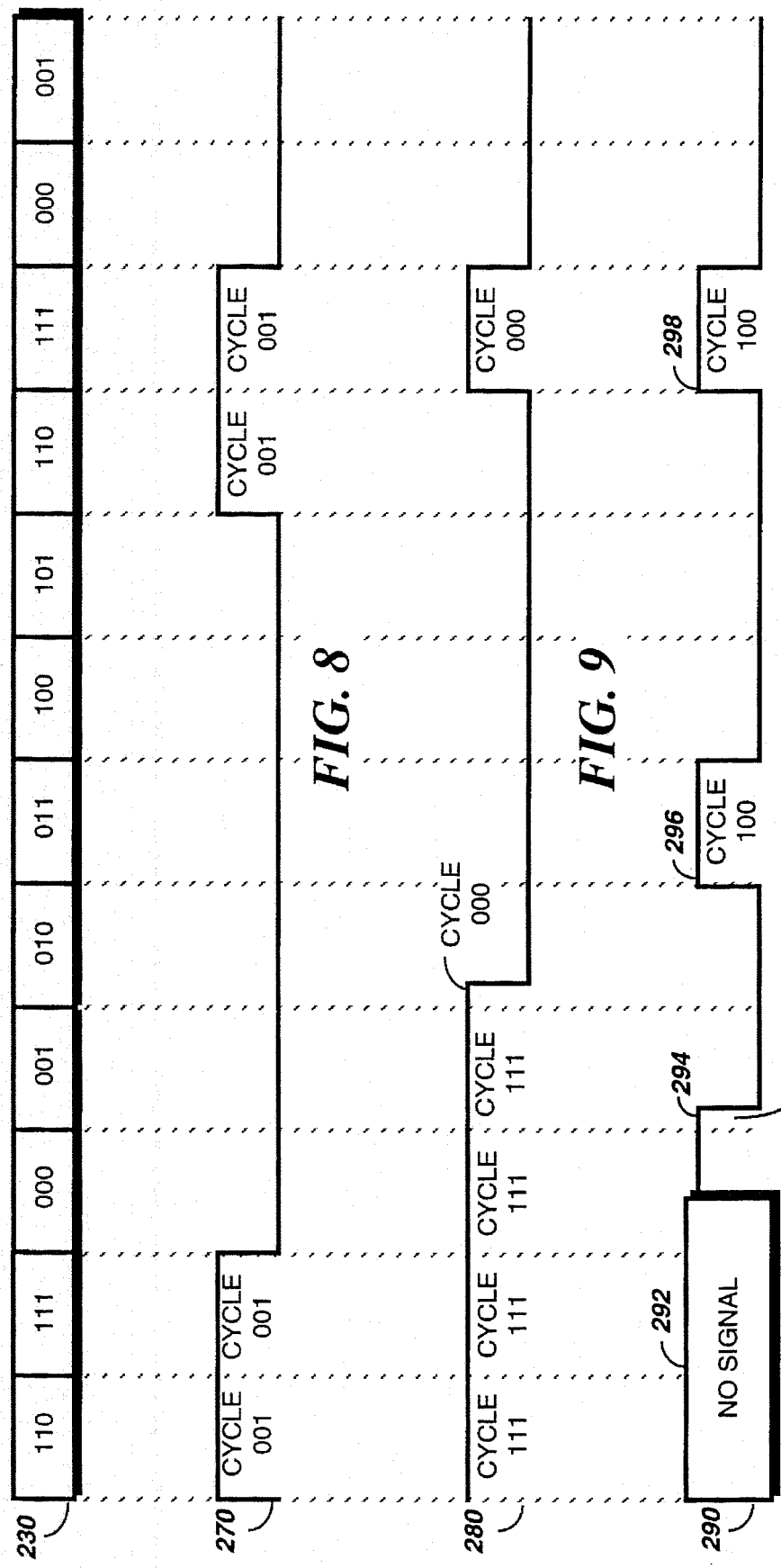

CODE PLUG ID = 111, CYCLE = 000

FRAME # →

DECODED CYCLE ↑

| | 000 | 001 | 010 | 011 | 100 | 101 | 110 | 111 |
|---|---|---|---|---|---|---|---|---|
| 000 | | | | | | | | YES |
| 001 | | | | | | | YES | YES |
| 010 | | | | | | YES | | YES |
| 011 | | | | | YES | YES | YES | YES |
| 100 | | | | YES | | | | YES |
| 101 | | | YES | YES | | | YES | YES |
| 110 | | YES | | YES | | YES | | YES |
| 111 | YES | YES | YES | YES | YES | YES | YES | YES |

*FIG. 11*

CODE PLUG ID = 111, CYCLE = 100

FRAME # →

DECODED CYCLE ↑

| | 000 | 001 | 010 | 011 | 100 | 101 | 110 | 111 |
|---|---|---|---|---|---|---|---|---|
| 000 | | | | YES | | | | YES |
| 001 | | | YES | YES | | | YES | YES |
| 010 | | YES | | YES | | YES | | YES |
| 011 | YES | YES | YES | YES | YES | YES | YES | YES |
| 100 | | | | YES | | | | YES |
| 101 | | | YES | YES | | | YES | YES |
| 110 | | YES | | YES | | YES | | YES |
| 111 | YES | YES | YES | YES | YES | YES | YES | YES |

*FIG. 12*

| FRAME # | 000 | 001 | 010 | 011 | 100 | 101 | 110 | 111 |
|---|---|---|---|---|---|---|---|---|
| 000 | 0 | 1 | 2 | 3 | 4 | 5 | 6 | 7 |
| 001 | 01 | 01 | 23 | 23 | 45 | 45 | 67 | 67 |
| 010 | 02 | 13 | 02 | 13 | 46 | 57 | 46 | 57 |
| 011 | 0123 | 0123 | 0123 | 0123 | 4567 | 4567 | 4567 | 4567 |
| 100 | 04 | 15 | 26 | 37 | 04 | 15 | 26 | 37 |
| 101 | 0145 | 0145 | 2367 | 2367 | 0145 | 0145 | 2367 | 2367 |
| 110 | 0246 | 1357 | 0246 | 1357 | 0246 | 1357 | 0246 | 1357 |
| 111 | 1-8 | 1-8 | 1-8 | 1-8 | 1-8 | 1-8 | 1-8 | 1-8 |

(TRANSMITTED CYCLE on vertical axis)

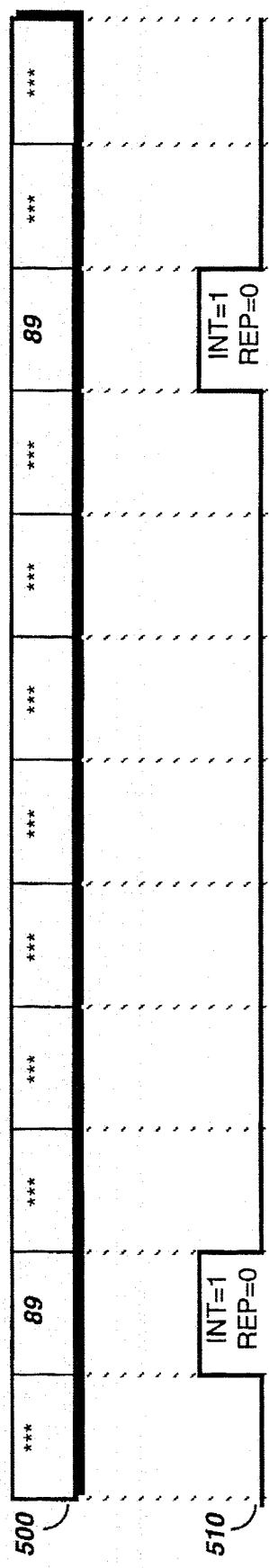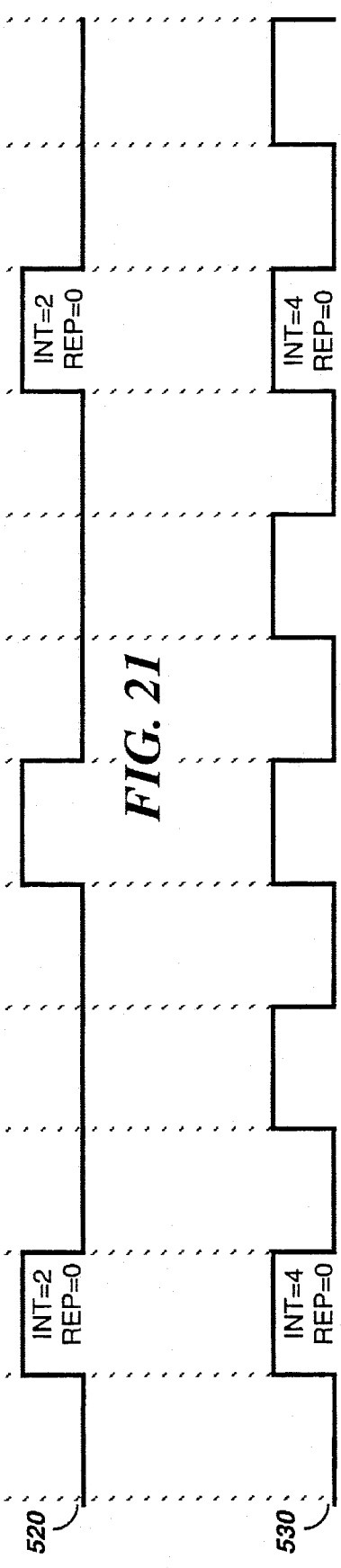
FIG. 20
FIG. 21
FIG. 22

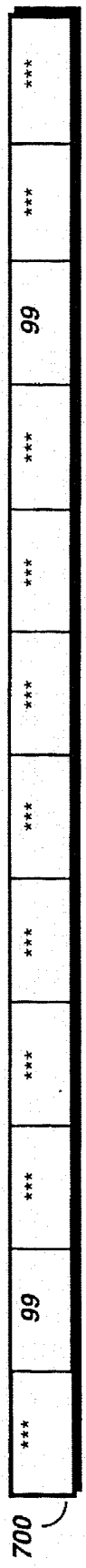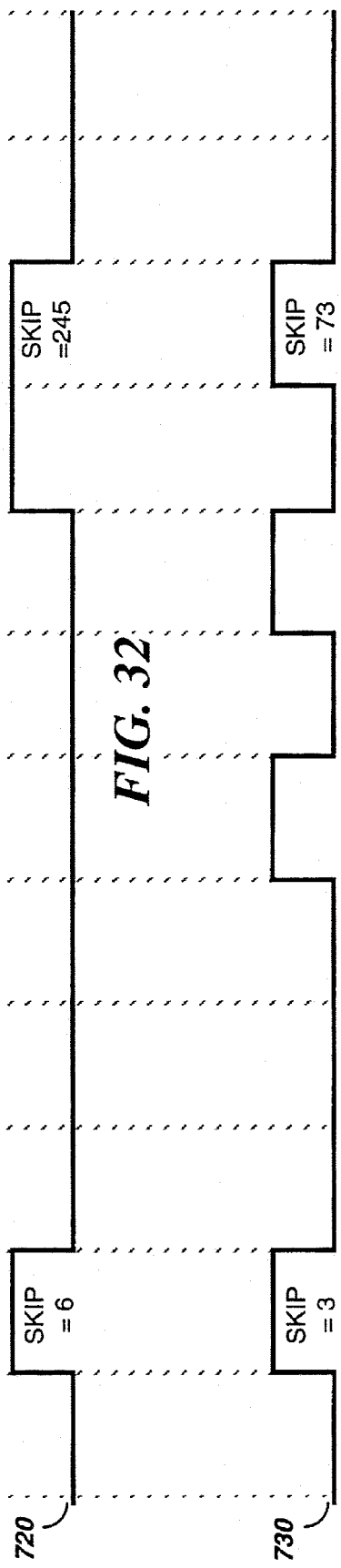
FIG. 31    FIG. 32    FIG. 33

METHOD AND APPARATUS FOR SYNCHRONIZING TO A SYNCHRONOUS SELECTIVE CALL SIGNAL

This is a continuation in part of U.S. application Ser. No. 07/801,574 filed Dec. 2, 1991, now U.S. Pat. No. 5,325,088.

FIELD OF THE INVENTION

This invention relates in general to methods and apparatuses using a selective call paging signaling protocol.

BACKGROUND OF THE INVENTION

Prior art selective call receiver systems (paging systems) have endeavored to efficiently communicate information to selective call receivers (pagers) while providing for effective battery saving operation of the selective call receivers. The widely accepted Golay Sequential Code (GSC) provides an asynchronous method for communicating message information to selective call receivers and has been described in U.S. Pat. Nos. 4,424,514 and 4,427,980 both issued to inventors Fennell, et al. The GSC protocol provides a preamble signal which initially synchronizes the selective call receivers to a paging signal. One of the several well known preamble signals may be used, each identifying a different group of selective call receivers which are used to decode following message information. Additionally, U.S. Pat. No. 4,860,003 issued to DeLuca, et al. describes power conservation during the reception of a signal, such as the GSC signal, in response to a signal indicating the occurrence of address information.

An asynchronous/synchronous signaling system has been defined by the Post Office Standardization Code Advisory Group (POCSAG). The operation according to the POCSAG signaling system requires selective call receivers to synchronously decode the received signal subsequent to being synchronized to the POCSAG signal. The POCSAG signal and a method for decoding the signal is described in U.S. Pat. No. 4,663,623 issued to Lax, et al. Like GSC, a POCSAG transmission may begin asynchronously with respect to a prior POCSAG transmission, and once the transmission begins, the signal is synchronously decoded until the transmission ends. The POCSAG transmission has at least one batch, each batch beginning with a synchronization signal followed by eight frames, each frame occurring at a predetermined time after the synchronization signal. A selective call receiver synchronized to the signal needs to search for its address in only a predetermined one of the eight frames. In the remaining seven frames, the selective call receiver conserves power by one of the well known techniques of battery saving. However, subsequent transmissions, for example, the POCSAG signals, need not be either bit or frame synchronized to the previous POCSAG transmission. By permitting a subsequent transmission signal to be synchronized only with each transmission, and not by bit or frame synchronization, the subsequent is asynchronously synchronized to the POCSAG signal.

Most paging protocol signals are designed to co-exist with other paging protocol signals. For example, a GSC may be followed by a POCSAG which may be followed by a 5-tone sequential transmission, etc. It is desirable to provide battery saving features for the selective call receiver during the absence of a signal being directed to the selective call receiver. This has typically been accomplished with a preamble signal preceding the message transmission. Both the GSC and POCSAG signals begin with a long preamble signal providing for selective call receiver synchronization before the message and providing for battery saving in the absence thereof. The preamble signal although providing for battery saving and synchronization, decreases the overall system message throughput. During the time taken for a preamble, no message information is being communicated to the selective call receivers, thereby decreasing throughput of the system.

Synchronous selective call receiver protocols eliminate any preamble signal, thereby enabling a more efficient battery savings. A synchronous paging signal is shown in U.S. Pat. No. 4,642,632 issued to Ohyagi, et al. This synchronous signal has selective call receivers divided into one of a plurality of group fields, each group field occurring at a predetermined period and having a predetermined maximum message information capacity. Since the synchronous signal is always being transmitted, no preamble signals are required, and a selective call receiver needs only decode paging information while its preassigned group is being transmitted.

However, the selective call receiver need only receive one of a multiplicity of groups. Before it has determined the occurrence of its desired group, the selective call receiver may expend excessive power searching for the occurrence of its own group. Thus, what is needed is a method and apparatus capable of conserving power while searching for the occurrence of its own group.

SUMMARY OF THE INVENTION

A selective call receiver has a power consuming circuit for receiving a synchronous communication signal having a multiplicity of frames. Each of the multiplicity of frames has synchronization signals and a frame identification signal. The frame identification signal is a member of a plurality of frame identification signals and the each of the plurality of frame identification signals occur in a predetermined sequence. The selective call receiver has an assigned frame identification signal corresponding to one of the plurality of frame identification signals. The selective call receiver implements a method of conserving power while acquiring synchronization comprises the steps of enabling the power conserving circuit, synchronizing to the synchronization signals, receiving one of the plurality of frame identification signals to produce a received frame identification signal, determining an occurrence of a desired frame of the multiplicity of frames by comparing the received frame identification signal, the predetermined sequence and the assigned frame identification signal, and disabling the power consuming circuit until an occurrence of the desired frame, thereby conserving power.

BRIEF DESCRIPTION OF THE DRAWINGS

FIG. 5–10 are timing diagrams of a synchronous selective call receiver signal and the battery saver operation of the selective call receiver according to FIG. 2.

FIG. 11 shows a table of the possible frames which may be decoded by a selective call receiver having a predetermined ID for receiving the signal of FIGS. 5–10.

FIG. 12 shows a table of possible frames which may be decoded by the selective call receiver of FIG. 11 in response to an alternate predetermined cycle value.

FIGS. 20–25 show timing diagrams of a synchronous selective call receiver signal and the battery operation according to the selective call receiver of FIG. 26 shows a block diagram of a selective call receiver terminal generating a paging signal in accordance with FIG. 16.

FIGS 31–35 are timing diagrams of a synchronous selective call signal and the battery saver operation according to the selective call receiver of FIG. 29.

DESCRIPTION OF A PREFERRED EMBODIMENT

Figure 1:
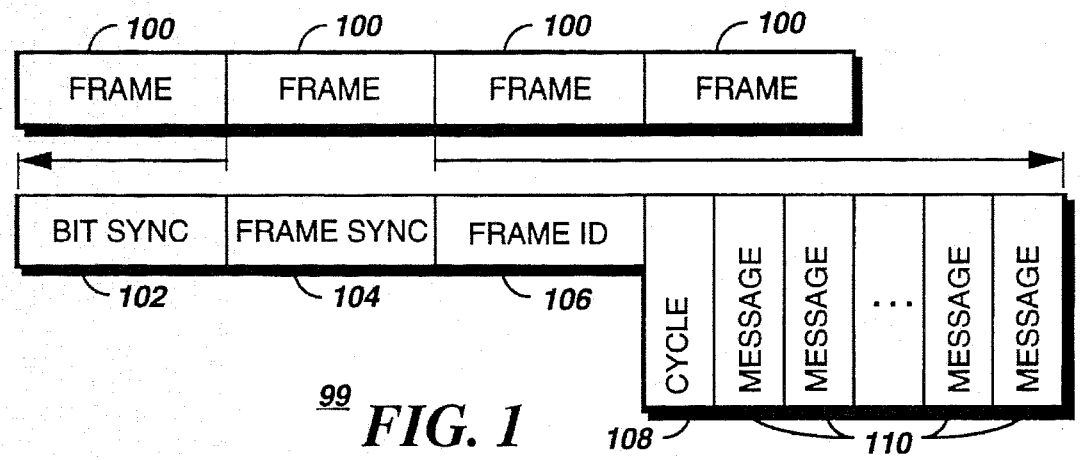
FIG. 1 illustrates a synchronous signal in accordance with the preferred embodiment of the present invention.

FIG. 1 shows a synchronous signal 99 in accordance with the preferred embodiment of the present invention. The signal 99 comprises of a number of message packets or frames 100. Each frame is preferably four seconds in duration and has a preferred base data rate of 1200 bits per second. Although, it will be appreciated that other data rates can be utilized as will be described below. Additionally, each frame is comprised of a bit sync signal 102, preferably 32 bits of alternating 1,0 patterns, followed by a frame sync signal 104 preferably one of several predetermined thirty-two bit words, and a frame ID signal 106, preferably one thirty-two bit word having twenty-one variable information bits containing information such as a frame identification number. The bit sync signal 102 provides for selective call receiver bit synchronization while the frame sync signal 104 provides for frame synchronization and may include a signal indicative of the data rate of message information following the frame ID signal 106. The frame ID signal 106 indicates the number of the frame. Each frame is numbered in a preferred sequence from 0 to 63 in a signaling system having sixty four frames. Alternately, any number of frames may be used in the system, however $2^N$ frames (where N is an integer) is preferred.

Following frame ID 106 is a word 108 having a cycle value and a plurality message words 110 follow thereafter. Words 108 and 110 are, preferably, 31,21 BCH code words having twenty-one information bits and ten parity bits generated according to the well known BCH algorithm. An additional even parity bit extends the word to a 32,21 code word. At least one message is within words 110 each message having an address signal and optional information signals associated with the address signal. Preferably, all the address signals within the frame are located in a first portion and the information signals are located in a subsequent portion of the frame. It is well known to those skilled in the art how the locate addresses in a first portion and message information in a second portion of a frame. Additionally, U.S. Pat. No. 5,128,665 to DeLuca et al., assigned to the assignee of the present invention shows an improved method of locating addresses in a first portion and message information in a subsequent portion of a signal. Word 108 includes the cycle value which forms the indicating frames in which a selective call receiver is to decode message information as will be discussed below. In a paging system having $2^N$ frames, the cycle value occupies an N bit word 108. The remaining bits may contain a boundary signal indicating a boundary between the address and information signals in words 110. Words 108 and 110 are shown in a vertical orientation to indicate that these words may be interleaved in order to improve the immunity of the transmission to burst errors. Preferably words 108 and 110 comprise 18 blocks of words wherein each block contains 8 interleaved words. In an alternate embodiment the interleaving may be modified or eliminated.

Figure 2:
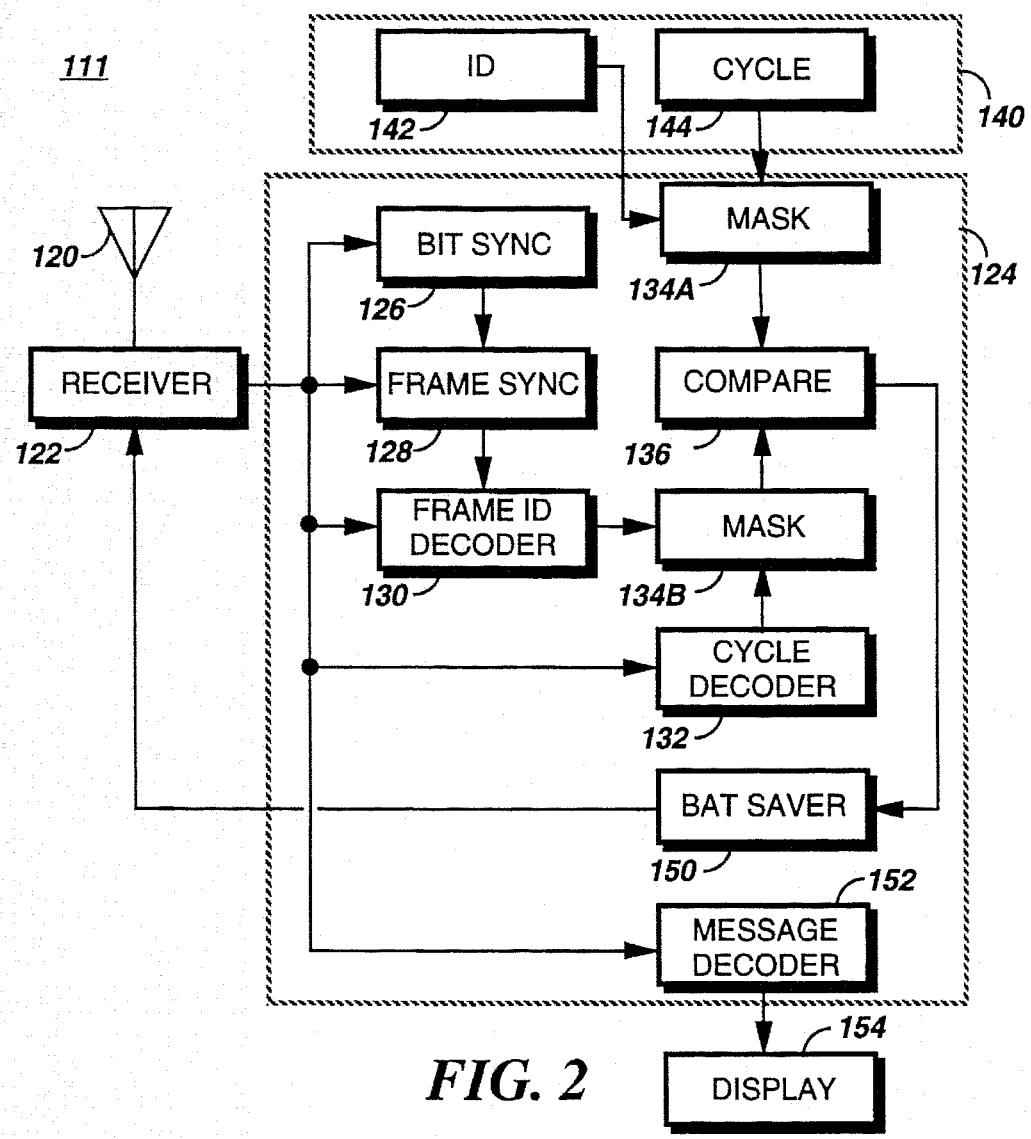
FIG. 2 is a block diagram of a battery operated selective call receiver operating in accordance with the preferred embodiment of the present invention.

FIG. 2 shows a battery operated selective call receiver operating in accordance with the preferred embodiment of the present invention. The radio frequency modulated signal 99 of FIG. 1 is received by antenna 120, demodulated by receiver 122 and processed by decoder 124. Decoder 124 may be comprised within a microcomputer executing a program causing the selective call receiver to process the demodulated signal. A preferred microcomputer is the MC68HC05C8 microcomputer manufactured by Motorola, and a selective call receiver having a microcomputer decoder is described in the aforementioned U.S. Pat. No. 4,860,003 to DeLuca et al. which is hereby incorporated by reference herein. The decoder 124 comprises a bit synchronizer 126 and a frame synchronizer 128 for synchronizing to signals 102 and 104, and respectively providing bit and word boundary signals for use by the remaining elements of the decoder 124. The decoder 124 preferably includes an identifier means for identifying the received frames or packets. Frame ID decoder 130 and cycle decoder 132 decode signals 106 and 108, respectively. The decoded signals 106 and 108 are masked by masking function 134B and compared by comparator 136 with information contained within a code plug 140. Code plug 140 has a predetermined frame ID 142, a predetermined cycle value 144, and a predetermined address assigned to the selective call receiver, as well as other signals which configure the selective call receiver for desired operating characteristics. As will be shown, the predetermined cycle value 144 allows one selective call receiver to be assigned to a plurality of frames. The predetermined frame ID 142 is masked with the predetermined cycle value 144 to generate a first mask value or pager mask (at mask function 134A) indicative of a first period of reception of the selective call receiver and is used by comparator 136 to enable battery saver 150 to produce a first period of reception. Battery saver 150 deactivates receiver 122 for certain frames thereby conserving battery power. When the selective call receiver receives the information in words 108 and 110 message decoder 152 searches for an address signal matching a predetermined address signal assigned to the selective call receiver and further decodes information signals associated with the address. The message information may then be displayed on display 154.

In an alternate embodiment, the cycle value 108 may contain a signal indicative of the cycle to be used. The selective call receiver may include a plurality of predetermined cycle values, one of which is selected in response to the signal indicative of the cycle to be used. The table below shows a relationship between the received signal and the cycle value.

| SIGNAL | CYCLE | SIGNAL | CYCLE |
| --- | --- | --- | --- |
| 000 | unused | 100 | 11 1000 |
| 001 | 00 0000 | 101 | 11 1100 |
| 010 | 10 0000 | 110 | 11 1110 |
| 011 | 11 0000 | 111 | 11 1111 |

In the table above, the system provides, for example, 6 bits for defining a cycle value, thereby providing for $2^6$ or, 64 frame IDs. Transmitting a signal indicative of the cycle to be used provides for communication of the cycle value with less information bits, thereby increasing the amount of information bits available for other information which may be included in word 108.

Figure 3:
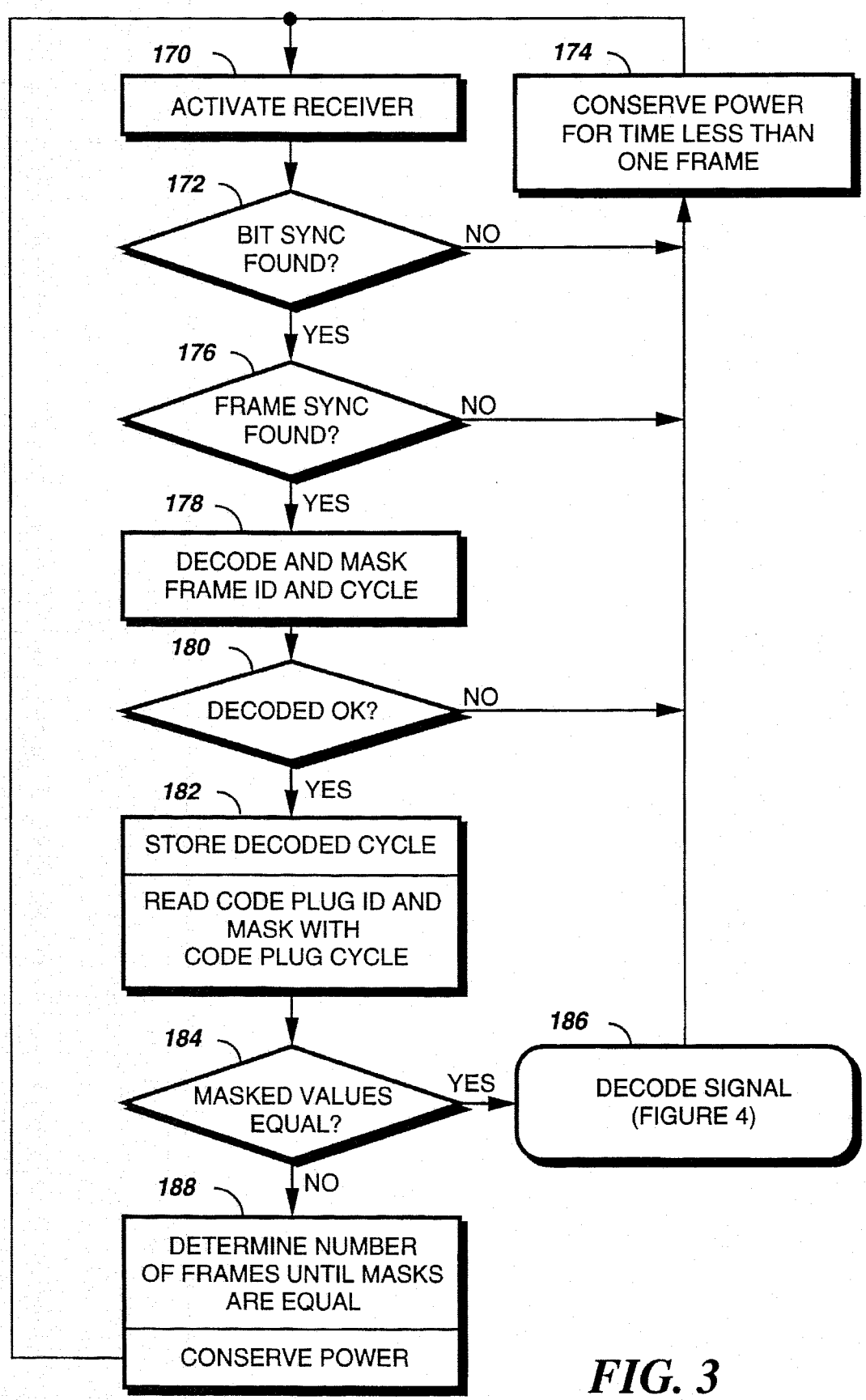
FIG. 3 is a flow diagram of the selective call receiver of FIG. 2 illustrating steps of decoding the synchronous signal in accordance with the preferred embodiment of the present invention.
Figure 4:
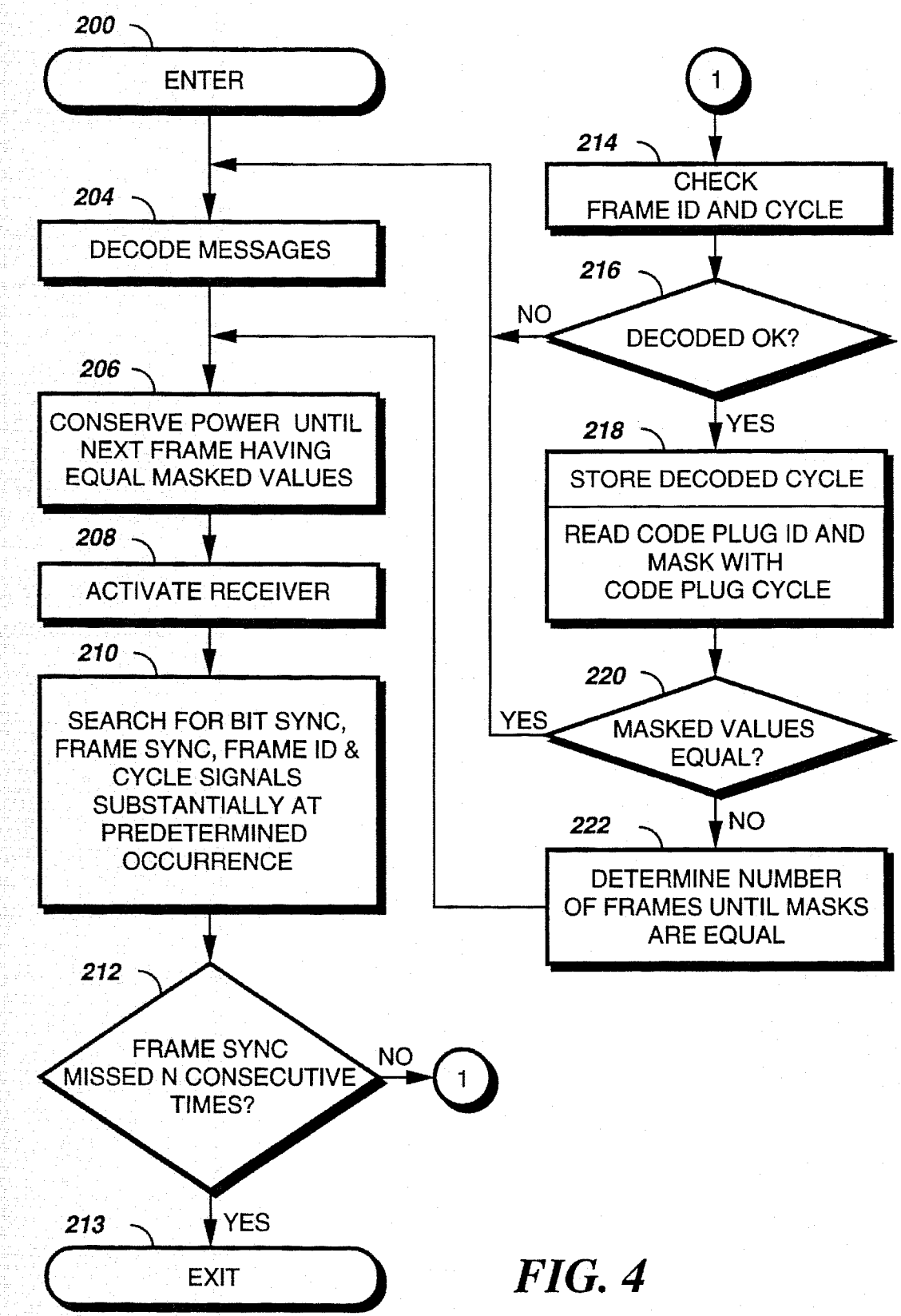
FIG. 4 is a flow diagram of the selective call receiver illustrating the steps of synchronously decoding in accordance with the preferred embodiment of the present invention.

FIG. 3 shows a flow diagram illustrating the operation of the selective call receiver decoding a synchronous signal in accordance with the present invention. It is assumed the flow diagram begins with the selective call receiver in an unsynchronized state. In step 170, the receiver is activated. Step 172 attempts bit synchronization (bit sync) for a predetermined time, preferably a time greater than the time of one frame. If synchronization is unsuccessful, step 174 conserves power for a time less than the time of one frame. In other embodiments, the times of steps 172 and 174 may be varied. Thereafter step 170 is again executed. If in step 172, bit sync is found, step 176 searches for frame sync 104. If frame sync 104 is not found within a predetermined time, preferably a time greater than the time of one frame, step 174 is executed. However, if frame synchronization is found, step 178 decodes the frame ID signal 106 and cycle signal 108 and masks the signals together to generate a second mask value or system mask as will be described below. Then step 180 determines if the frame ID and mask were decoded OK. If not, a frame ID not recognized by this embodiment of the invention may be present, or the signal may have been corrupted by noise. In response thereof, step 174 is executed. If decoded OK, step 182 stores the decoded cycle value in a temporary register and reads from the code plug. The predetermined ID and cycle value are masked together (at mask function 134A) to obtain the first mask indicative of the first period of reception. For example, if the code plug contains a predetermined frame ID of 111 and a predetermined cycle value of 000, the resulting first mask value is 111. Similarly, if the decoded frame ID and cycle value were 001 and 100 respectively, the resulting second mask value (at mask function 134B) of X01 (the X indicating a "don't care"). Step 184 then compares the first and second masked values, 111 and X01 and finds them to be not equal. If however the decoded frame ID and cycle values were 011 and 100 respectively the resulting second mask would be X11, and step 178 would then compare the first and second masked values of 111 and X11 and find them to be equal. If the compared masks are equal, step 186 synchronously decodes the signal as indicated by FIG. 4. In response to step 184 determining the inequality, step 188 determines the next frame where the first and second masked values will be equal. In the preceding example, the decoded frame ID and cycle were 001 and 100 respectively and the resulting second masked value was X01, and it can be determined that after two frames the resulting masked value would be X11 thereby providing an equality for step 184. This determination may be made because the frames are consecutively numbered. Thus step 184 would conserve power for two frames. Similar determinations may be made for systems having more frame numbers occurring in any predetermined sequence.

However, when the second masked value indicates the second period of response is more frequent than the first period of response indicated by the first masked value, the period of power conservation will be reduced (less battery saving). In this way, a ubiquitous signal having a second mask indicative of the second period of response may be sent to all selective call receivers which have a first mask indicative of a first period of reception. Upon receipt, the selective call receivers determine whether to change their first period of reception to the second period of reception. Thus a selective call receiver terminal can instruct the selective call receivers to temporarily change their period of reception to ease traffic demand without knowing the period of receptions of different selective call receivers. Accordingly, the selective call receivers compare the generated second masked value with the generated first masked value to determine if the second period of reception is more frequent than the first period of reception, and if so, the period of reception will be changed.

By the flowchart of FIG. 3, a selective call receiver 111 is shown to have a power consuming receiver circuit 122 for receiving a synchronous communication signal 99 having a multiplicity of frames 100, each of the multiplicity of frames having bit and frame synchronization signals 102 and 104, and a frame identification signal 106 being a member of a plurality of frame identification signals, each of the plurality of frame identification signals occurring in a predetermined sequence see FIG. 1, and the selective call receiver having an assigned frame identification signal 142 corresponding to one of the plurality of frame identification signals. The flowchart of FIG. 3 shows a method of conserving power while acquiring synchronization which comprises the steps of enabling the power conserving circuit 170, synchronizing to the synchronization signals 172 and 174, and receiving one of the plurality of frame identification signals to produce a received frame identification signal 178. Steps 180 to 188 show determining an occurrence of a desired frame of the multiplicity of frames by comparing the received frame identification signal, the predetermined sequence and the assigned frame identification signal and disabling the power consuming receiver circuit until an occurrence of the desired frame, thereby conserving power.

FIG. 4 is a flow diagram illustrating synchronously decoding of the selective call receiver in accordance with the preferred embodiment of the present invention. The flow diagram is entered at step 200 from step 186 (as shown in FIG. 3). Step 204 decodes message signals from words 110 and any boundary signal from word 108. Those skilled in the art will appreciated that power conservation may be performed in this step by only activating the receiver in coincidence with the occurrence of address signals as indicated by a boundary signal. In the event of an address matching a predetermined address assigned to the selective call receiver, an alert is generated, and the message information signals associated with the address decoded. The message signals are then displayed to the user of the selective call receiver. In step 206, which is similar to the operation of step 188, the next frame having equal first and second masked values is determined. Power is conserved until then. Then in step 208 the receiver is again activated. In step 210, bit and frame synchronization, the frame ID and cycle values are searched for in substantial coincidence with their expected occurrence.

Step 212 checks if synchronization is maintained. Specifically, step 212 checks if frame synchronization has been missed for a predetermined number "N" consecutive times. In one embodiment, the number "N" is selected so that the selective call receiver synchronously operates in a noisy environment for several hours. If synchronization is not maintained, the flow exits through step 213 to step 174 of FIG. 3 to attempt to regain synchronization. By making the value for "N" large, the selective call receiver can efficiently conserve power in a noise environment. Additionally, the long synchronization lock time provided for by a large "N" provides for the interruption of the signal by other paging protocols communicating message information while maintaining bit and frame synchronization for the selective call receiver.

If synchronization is maintained, as is the expected typical case (step 212), step 214 checks if the frame ID and cycle values were correctly decoded. If not, the flow through step 216 returns to step 204 to decode messages, thereby maintaining the cycle value from a previous decoding of the cycle. Furthermore, in the event bit or frame synchronization were missed in step 210, bit and frame synchronization can be maintained from a previous successful synchronization. This path may be taken in the event a frame ID is not recognized by the selective call receiver or if the selective call receiver is in a noisy environment when an alternate paging protocol is being transmitted. In an alternate embodiment, if either the bit or frame synchronization, or frame ID or cycle values were missed, step 216 could proceed directly to step 206 thereby conserving power through the expected message words of the frame.

If the frame ID and cycle values are decoded OK in step 216, step 218 stores the new decoded cycle value in temporary memory and reads the frame ID and cycle from the code plug and masks them together as described above. Step 220 then checks if the result is substantially the same. If so, the flow returns to step 204. If no, the flow proceeds to step 222 to determine the number of frames until the masked values are again equal. The execution of step 222 is typically in response to a change in the received cycle value.

FIG. 5–10 show an example of a synchronous paging signal and the battery saver operation of the selective call receiver of FIG. 2. For the sake of simplicity, the example shows a signal 230 having only $2^3$ (eight) repeating frames numbered 0–7. The frame numbers 0–7 are indicated with the binary equivalent values 000–111. Lines 240–290 show battery saving and signal processing operation of a selective call receiver having a predetermined frame ID of 111 and a predetermined cycle value of 000 (thereby indicating the selective call receiver at the minimum decodes only in frame 111). A logic high on line 240–290 indicates the selective call receiver is receiving and processing information and a logic low indicates the selective call receiver is conserving power. Line 240 shows the selective call receiver operation when cycle signal 108 comprises a 000. This cycle signal indicates that only the frame assigned to the pager is to be decoded. This is evidenced by high logic states 242 and 244 which are in coincidence with frame 111.

Line 250 shows the selective call receiver operation with a cycle value of 100. In this case the resulting masked values of the received frame ID and cycle value is X11 during intervals 252, 254, and 256. A mask value of X11 equals the predetermined frame ID of 111 during frames 011 and 111 of line 230. Similarly line 260 shows the operation of the selective call receiver receiving a cycle value of 110 which causes the receiver to receive and process in frames 001, 011, 101, and 111. Similarly line 270 shows the operation of a pager receiving a cycle value of 001.

Line 280 shows the pager receiving a cycle value of 111 for four frames and a cycle value of 000 thereafter. When the cycle value is 111, the selective call receiver decodes in every frame, and when the cycle value is changed to 000, the selective call receiver decodes only in a frame having a frame ID equal to the predetermined ID assigned to the pager. Also, upon receiving a cycle value wherein the masked values are not equal, receiving and processing of the frame is terminated. However, because the frames are numbered in a predetermined sequence, the pager is capable of reactivating precisely in time to decode the correct frame. In this way, the selective call receiver by comparing a second received masked value with the corresponding first masked value can increase the period of reception for receiving relocated frames to reduce traffic build-up or message queuing within the selective call receiver system.

Line 290 shows the selective call receiver synchronizing to the system. During interval 292 no signal is received, possibly because the selective call receiver was switched off during this interval. During interval 294 the signal is received and bit and frame synchronization are accomplished. Then a frame ID of 001 and a cycle value of 100 is detected. The selective call receiver then determines that frame 011 results in matching masked value, and conserves power for the duration of frame 001 and receives and processes information during frame 011 as shown by interval 296. The selective call receiver is synchronized to the system and conserves power after frame 011 until frame 111 wherein the masked values are again equal.

Thus FIGS. 5–10 show that a selective call receiver may be reassigned to a number of frames using the received cycle value and its internal masked value. The selective call receiver may additionally quickly determine the proper frame for decoding in the event the cycle value is changed, or when synchronization is initially acquired. In systems having more than eight frames, such as a sixty four frame system, the advantages to battery saving and traffic management are even more evident. However, when the selective call receivers are directed to a second period of reception through the received second masked value, the battery saving features of the selective call receiver are inhibited in the interest of reducing traffic build-up or message queuing. That is, selective call receivers are directed to access frames at a more frequent rates than is indicated by the internal generated first masked value. Therefore, using the transmitted second masked value, a selective call receiver system can temporarily change the period of reception of the selective call receivers without knowing the period of receptions of the selective call receivers to reduce traffic build-up, etc.

FIG. 11 shows a table of the possible frames in which a selective call receiver having a predetermined ID of 111 operating in the eight frame system protocol of FIGS. 5–10 to decode signals. The selective call receiver has a predetermined cycle value of 000. The top row corresponds to the frame numbers of line 230 of FIGS. 5–10. The left column corresponds to the decoded cycle signal 108 of FIG. 1, that is, the received second masked value indicates a second period of reception. A "YES" entry in the table corresponding to the top row and left column indicates the frame in which the selective call receiver of the example will receive and process information. It can be seen by the column associated with frame 111 that the selective call receiver of the example will always be active in its own frame. It can be further seen by viewing the bottom row that a cycle value of 111 will cause the selective call receiver to be active in every frame. In this way, the selective call receiver is instructed to temporarily increases the period of reception for reducing traffic build-up on the system.

FIG. 12 shows a table of possible frames of the selective call receiver of FIG. 11 wherein the selective call receiver alternately has a predetermined cycle value of 100. The resulting masked value is X11. Thus the selective call receiver behaves as if the selective call receiver assigned to both frames 011 and 111.

Figures 13, 14:
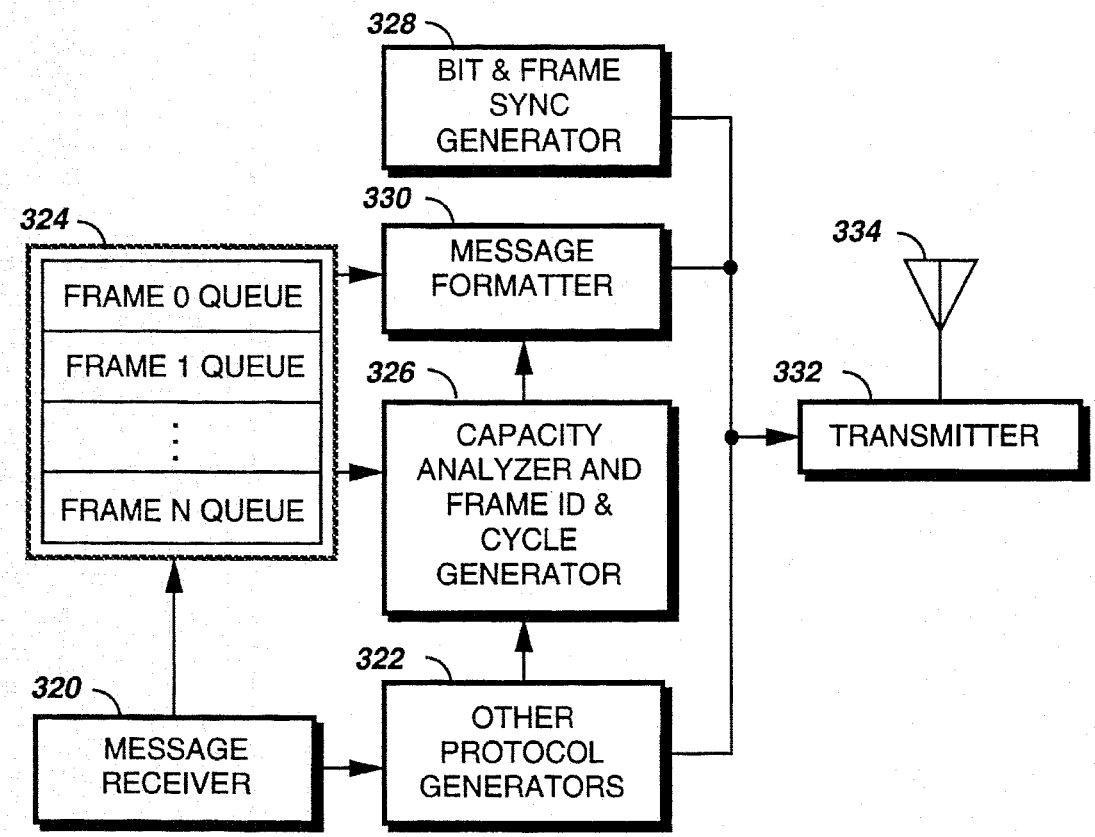
FIG. 13 shows a block diagram of a paging terminal for generating a paging signal in accordance with FIG. 1.
FIG. 14 shows a table indicating frames the selective call receivers will decode in response to the cycle signal.

FIG. 13 shows a block diagram of a paging terminal generating a paging signal in accordance with FIG. 1. The functions of the paging terminal is implemented within software, for example within a MODAX 500 Radio Paging Terminal which is manufactured by Motorola Inc. As shown, message receiver 320 receives messages for selective call receivers typically from the public switched telephone network. The appropriate protocol and address is determined for the message. If the message is not to be sent via the signal format of the present invention, it is sent to one of the other protocol generators 322 which may include GSC and POCSAG protocol generators. Messages to be transmitted on the protocol of the present invention are stored in a frame queue buffer 324 which has queues for the corresponding frames of the signal. The predetermined frame ID of the pager corresponding to the message is determined and the message is stored in the corresponding frame queue. Capacity analyzer and frame ID/cycle generator 326 determine the sequence of frame IDs to be transmitted, analyze the capacity of each frame and determine the cycle value to be used. The capacity analyzer is also responsive to other protocols being transmitted. For example, if the expected occurrence of a frame is to be replaced by the transmission of one of the other protocols (thereby diminishing the capacity of the frame), the capacity analyzer can account for this with the determined cycle value. Bit and frame sync generator 328 synchronously generates bit and frame synchronization signals. Message formatter 330 determines in response to the current combination of selective call receivers decoding messages in a frame, the frame queues from which messages may be included within the current frame. The messages are then formatted for transmission. Transmitter 332 accepts signals from blocks 328, 330 and 322 and modulates and transmits radio frequency paging signals to selective call receivers via antenna 334 in a manner well known to those of ordinary skill in the art.

Figure 15:
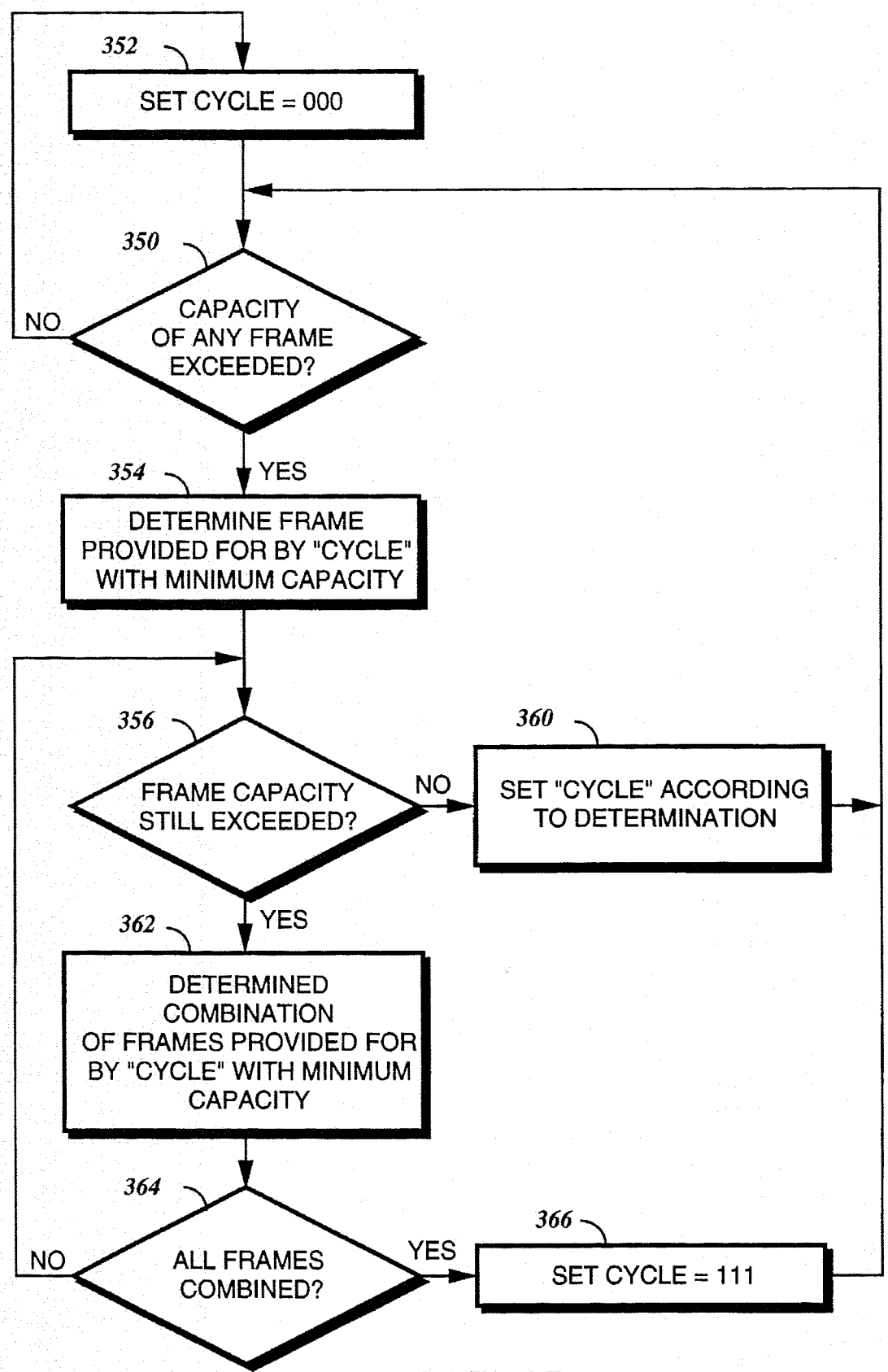
FIG. 15 shows a flow diagram of the operation of the capacity analyzer and cycle generator in accordance with FIG. 13.

FIG. 15 is a flow diagram illustrating the operation of the capacity analyzer and cycle generator of FIG. 13. Step 350 examines the frame queues of buffer 324. With each frame being approximately 4 seconds long and having a base data rate of 1200 bits per second, each frame capacity is approximately 4,800 bits of synchronization and information code words. If the traffic capacity of any of the buffers is not exceeded, step 352 sets the cycle value to 000, thereby causing the selective call receivers to operate only in frames corresponding to the information (first masked values) within their respective code plugs. If however, the frame capacity is exceeded, step 354 determines a frame having a lesser capacity utilization (lesser traffic) which is available for combining by the cycle value, and the frames are combined. The step 356 determines if the frame capacity of the combined frames are still exceeded. If not, step 360 sets the cycle value according to the determined value. If however the capacity is still exceeded, step 362 combines more frames as provided for by the cycle value. Then step 364 determines if all of the frames of the system have been combined. If not, the program returns to step 356 and a check for exceeded capacity is again made. If in step 364 all frames are combined, a cycle of 111 is selected. Process continues in step 350 from either step 360 or step 366. This process allows for continuous adjustment of the cycle value to accommodate variation in message traffic which cause the capacity of frames to be exceeded. It should be appreciated that the rate of change of the cycle value may be further governed in order to regulate rapid changes in the operation of the paging system. Additionally, the changes in the operation can be weighed against the extra power consumption and the changes caused in the individual selective call receivers with the paging system. Selective call receivers directed to decode in extra frames in response to the cycle value also expend additional power while decoding in those frames, thus frustrating their battery saving features in the interest of reducing the traffic on the paging system.

FIG. 14 shows a table indicating the frames in which selective call receivers will decode in response to the cycle signal. The table corresponds to the eight frame ID example described above. The top row indicates the frame ID number while the left column indicates the cycle value. The entries in the table correspond to the decimal equivalent of selective call receivers having predetermined frame IDs which decode information in that frame. As can be seen, a cycle value of 000 causes only selective call receivers having the predetermined frame IDs matching that frame ID to decode in that frame, while a cycle value of 111 causes all selective call receivers (predetermined frame IDs of 0–7) to decode in every frame.

An example of the use of the table is given below. For example, if the traffic capacity of frame 7 (111) is exceeded, and upon examining the other frame queues, it is determined that substantial capacity of frame 3 is not utilized. Frames 7 and 3 may be combined with a cycle value of 100. This cycle value may be utilized until the capacity of frame 7 is no longer exceeded (in response to which the cycle value would be returned to 000). If however the capacity of combined frames 3 and 7 are still substantially exceeded and it is determined that frames 1 and 5 still have remaining capacity, a cycle value of 110 could be used thereby combining frames 1, 3, 5, and 7. In this way, the paging terminal transmits information to the selective call receivers which is combined with the internal first masked value of the selective call receivers to determine the change in the period of reception for relieving traffic variations with the paging system.

Thus, a selective call receiver responds to the synchronized signal generated from the paging terminal to receive at least one additional frame at a second period of reception as described above. Some selective call receivers may require additional battery saver performance and may not respond to the cycle value, thereby decoding only those frames indicated by the code plug. Alternately, the selective call receiver could respond only to a portion of the cycle value. In such an embodiment the selective call receiver may only respond to the least significant one or two bits of the cycle value thereby limiting the number of possible frames in which the pager must be active in order to decode message information. The paging terminal must correspondingly be programmed with a table of selective call receivers having limited response to the cycle value in order to direct message information to those selective call receivers in the proper frames.

Figure 16:
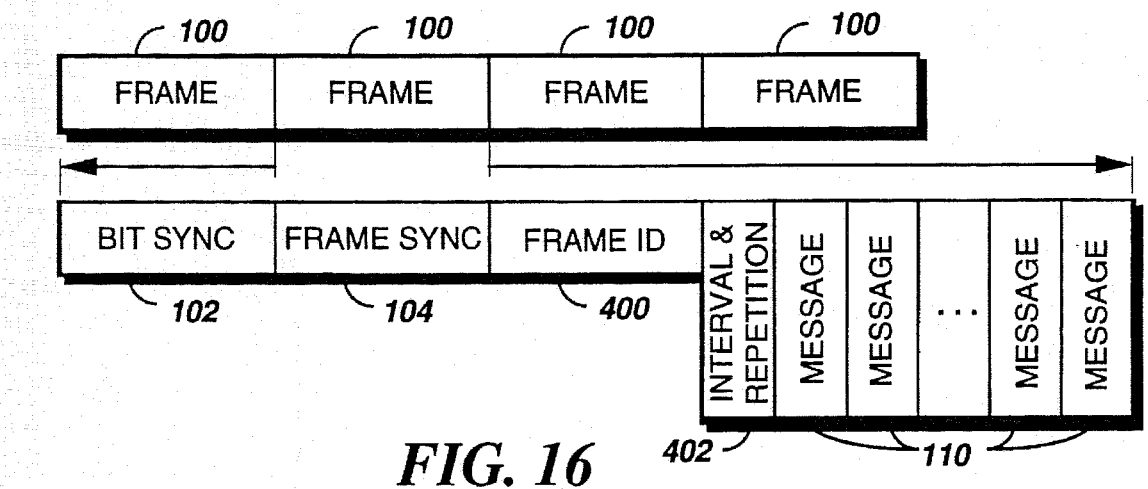
FIG. 16 shows a synchronous signal in accordance with a second embodiment of the present invention.

FIG. 16 shows an alternate signal in accordance with a second embodiment of the present invention. The signal has substantially the same attributes as described in the signal of FIG. 1 with the exception of words 400 and 402. Word 400 includes the frame IDs which need not be numbered in sequence and is preferably one of any number of frame IDs. This enables addition of frame IDs to the paging system as the requirements change. However, each frame ID has a predetermined period which need not be the same period as other frame IDs on the system. Word 402 comprises interval and/or repetition values, and includes, additionally, a boundary signal indicative of the boundary between address and data portions of words 110.

Figure 17:
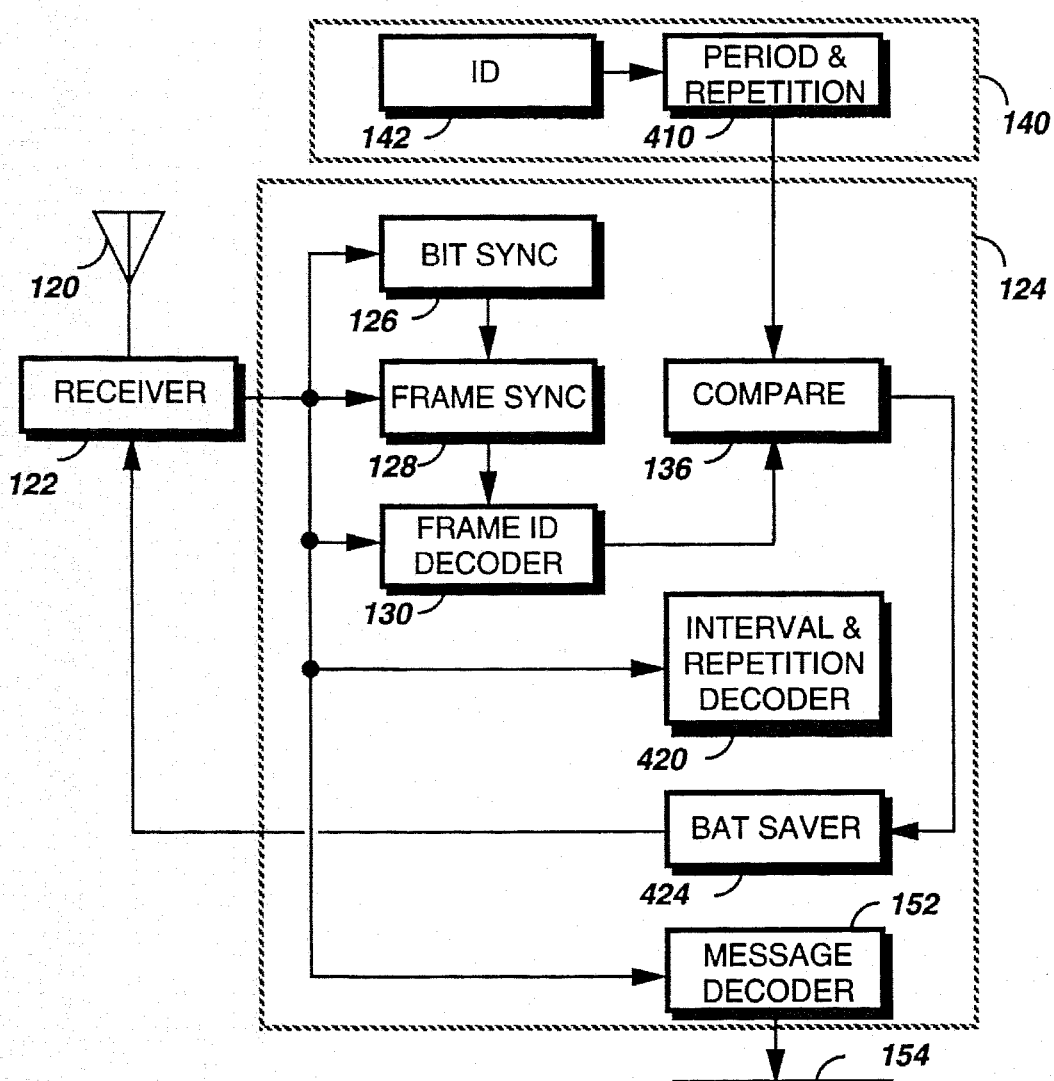
FIG. 17 is a block diagram of the preferred embodiment of a selective call receiver for decoding the signal illustrated in FIG. 16.

FIG. 17 illustrates the block diagram of the paging receiver for decoding the signal of FIG. 11. The majority of the functions of the selective call receiver are identical with the selective call receiver of FIG. 2. Antenna 120, receiver 122, and display 154 are substantially identical in function to those of FIG. 2. Code plug 140 includes the predetermined frame ID 142 and further includes a predetermined period and repetition values 410. The period corresponds to the predetermined period of the predetermined frame ID 142. Decoder 124 has bit and frame synchronizers 126 and 128 respectively, and frame ID decoder 130 and message decoder 152 have substantially the same operation. Interval and repetition decoder 420 decodes signal 400. Comparator 422 sends a signal to battery saver 424 when the decoded frame ID equals the predetermined frame ID 142. In response to the comparator 422, the interval and repetition signal 402, the predetermined period, and repetition 410, the battery saver 424 causes the receiver 122 to either activate or conserve power.

Figure 18:
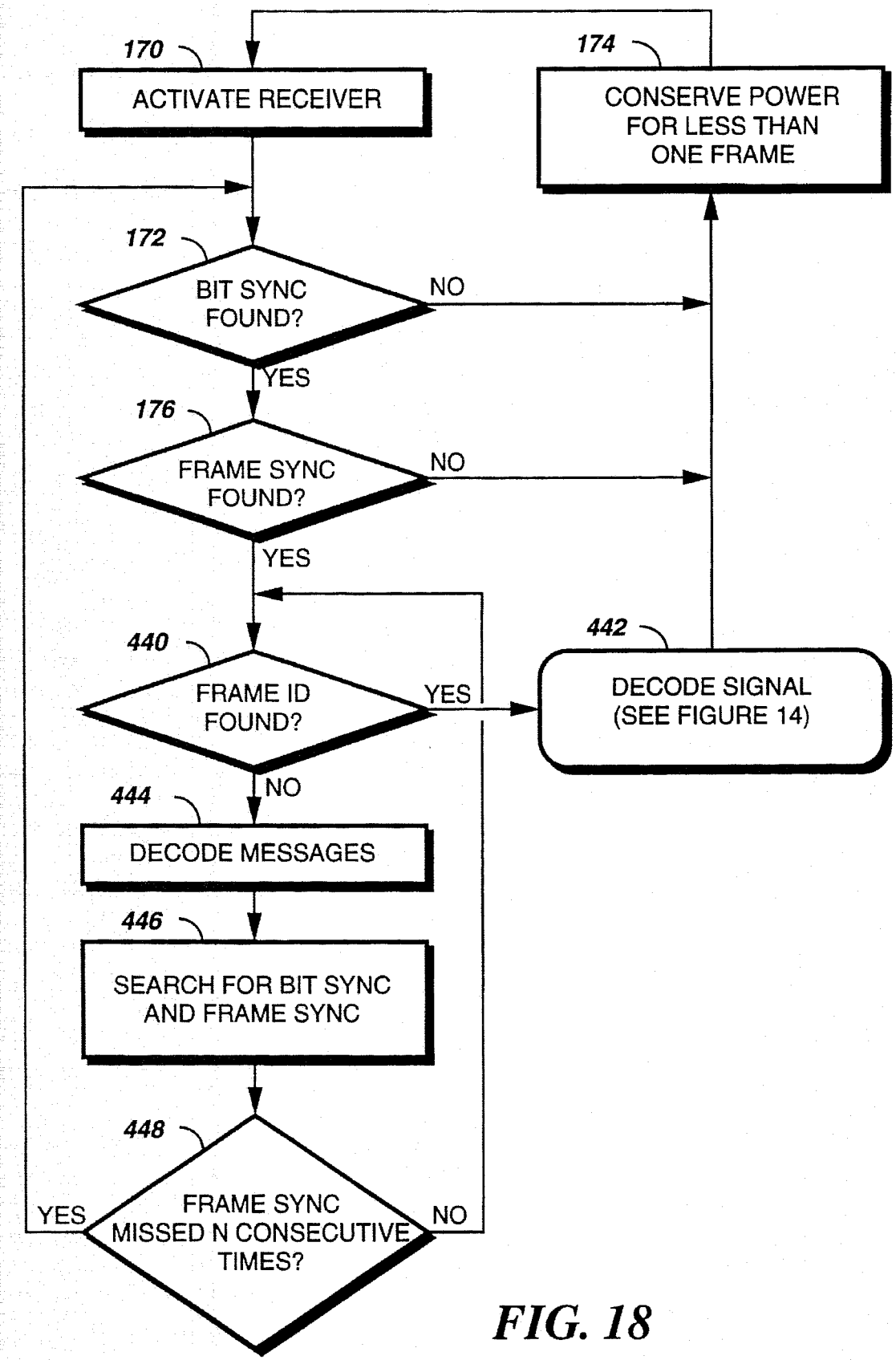
FIG. 18 is a flow diagram illustrating the operation of the selective call receiver according to FIG. 17.

FIG. 18 is a flow diagram illustrating the operation of the receiver of FIG. 17. Steps 170–176 have been described with respect to FIG. 3. Accordingly, upon finding frame synchronization in step 176, step 440 checks if the received frame ID 400 matches the predetermined ID 142. If equal, synchronous decoding occurs in step 442 which is described in detail in FIG. 19. If the inequality is determined in step 440, step 444 decodes messages within the frame. The functions of this step are similar to those of step 204 of FIG. 4. If an address matching a predetermined address assigned to the selective call receiver is found, an alert is generated, and information associated with the address may be decoded and stored for displaying. Power conservation is performed in this step after the address portion of the frame is received. Step 446 again searches for bit and frame synchronization. Step 448 checks if frame synchronization has been missed for a predetermined number of times. If yes, step 172 is again executed and synchronization is again acquired. If no, step 440 is again executed.

The flowchart of FIG. 18 provides for decoding of information within every frame until a frame having a frame ID corresponding to the predetermined frame ID is found. If the synchronization of step 446 is unsuccessful, subsequent executions of step 444 may use the synchronization from prior successful attempts. Alternately, step 444 conserves power during the remainder of a frame if the synchronization of step 446 was unsuccessful.

Figure 19:
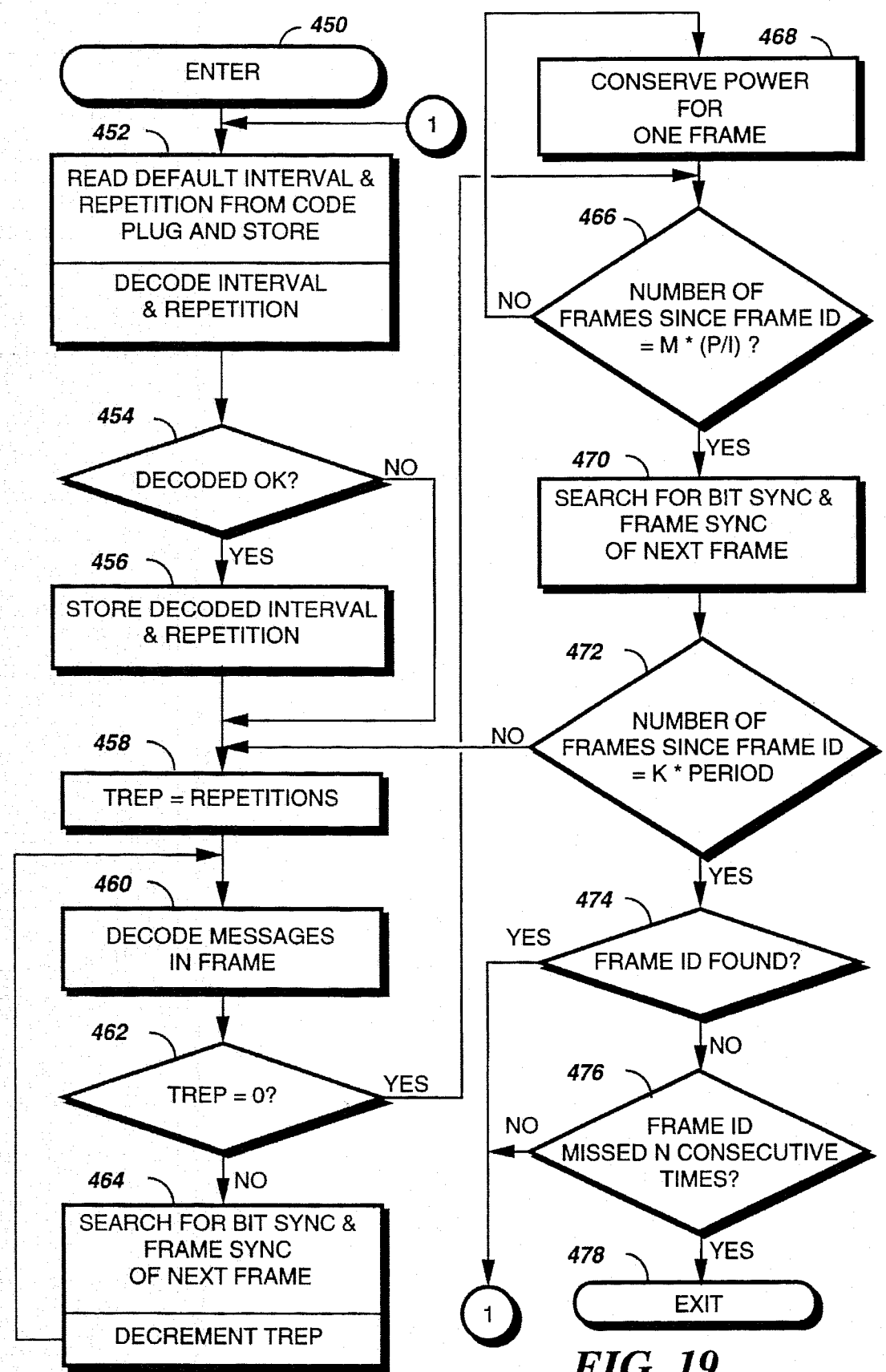
FIG. 19 is a flow diagram further illustrating the synchronous operation of the selective call receiver of FIG. 17.
Figures 23, 24, 25:
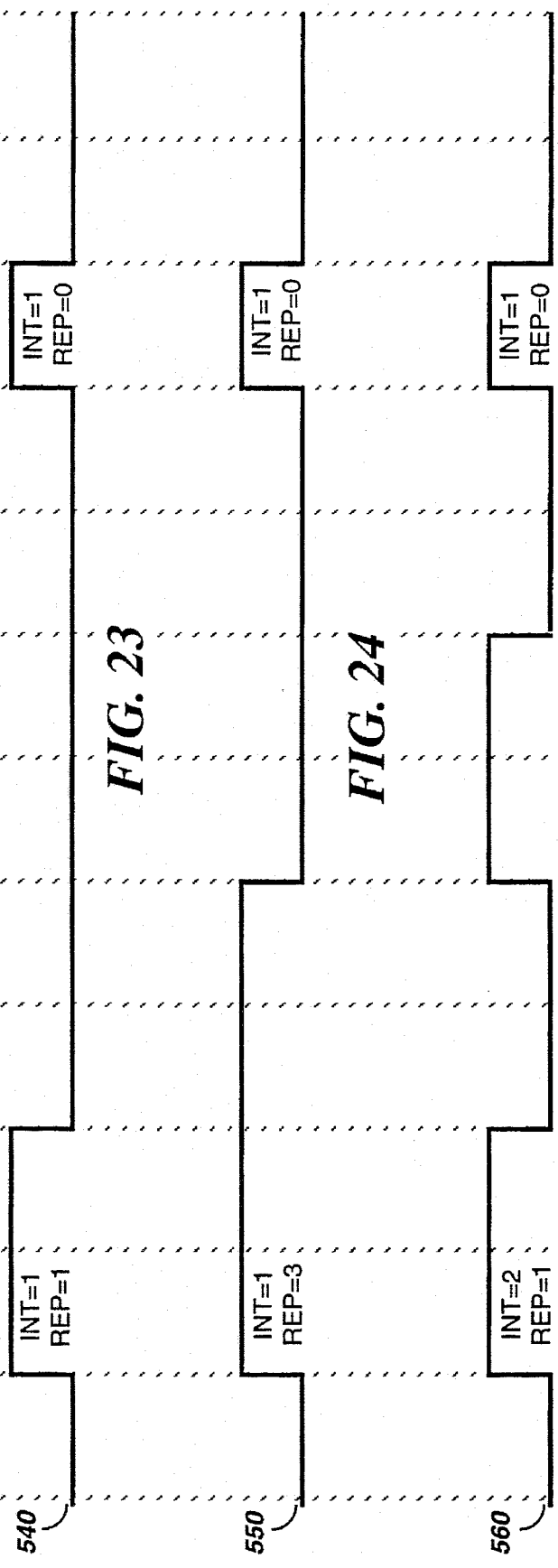

FIG. 19 is a flow diagram illustrating the synchronous operation of the receiver of FIG. 17. The flowchart is entered at step 450 via step 442 of FIG. 18 when the frame ID 400 matches the predetermined ID 142. Step 452 then reads default interval and repetition values 410 from the code plug and stores the values temporarily in memory. The received interval and repetition signal 402 is also decoded. If decoded OK, step 454 causes step 456 to substitute the decoded values with the corresponding values from the code plug by overwriting the temporary memory. If not decoded OK, step 456 is bypassed, and the code plug values remain in temporary memory. The step 458 sets a temporary variable TREP equal to the repetition value stored temporarily in memory. Then, similar to the processes described in step 444, step 460 decodes the messages in the frame. After decoding the frame, step 462 checks if TREP value is zero. If no, step 464 searches for bit and frame sync in the next frame, decrements TREP and returns to step 460. Steps 460–464 provide for a number of frames to be decoded in repetition according to a repetition value either received in the signal or stored in the selective call receiver code plug. A preferred application is to have the transmitted repetition value less than or equal to the repetition value of the code plug.

After the repetition cycle is completed (zero), step 466 determines if the number of frames subsequent to decoding of the frame ID is equal to a non-zero integer value M multiplied by the ratio of the predetermined period P, and the interval I which is stored in the temporary memory. If no, power is conserved for one frame in step 468 and step 466 is again executed. Steps 466 and 468 provide for variations in the interval in which frames are decoded. If for example, the received interval had a value of one, executions of step 466 would result in an inequality until the number of frames after the frame ID equals the period of the frame ID (e.g, M=1). In another example, if the predetermined period of the frame=8 and the received interval=1, step 466 would result in an equality (M=1) after eight frames have elapsed after the detected frame, which would be in coincidence with the next occurrence of the frame. If however, the received interval was 2, step 466 would result in an equality (M=1 and 2) both after four and eight frames have elapsed after the prior detected frame, the latter would be in coincidence with the next occurrence of the frame, while in the former, additional message information may be included for selective call receivers assigned to the frame.

When step 466 results in an equality, step 470 activates the receiver and searches for bit and frame synchronization. Then step 472 determines if the number of frames after the detected the frame ID corresponds to an integer K multiplied by the predetermined period of the frame ID. If false, step 472 proceeds to step 458 to decode the number of frames specified by the repetition value stored in temporary memory. If yes, step 474 checks if the frame ID is found. If found, step 452 is again executed through connector "1", otherwise step 476 checks if the frame ID has been consecutive missed for a predetermined number N. If no, synchronization is maintained, and step 452 is again executed. If yes, the flow returns 478 to reacquire synchronization at step 174 of FIG. 18. In a typical operation, step 474 is executed in correspondence with the predetermined period of the predetermined ID assigned to the selective call receiver. The predetermined value N of step 476 may be selected to maintain synchronization for long periods of time in the absence of signal. These periods can extend to hours or days depending on parameters of the system, thereby providing for efficient battery saving in the absence of a signal receivable by the selective call receiver.

FIGS. 20-25 show an example of a synchronous paging signal and the battery saver operation of the pager of FIG. 17. In this example, the selective call receiver has a predetermined frame ID of 89. Line 500 shows that the predetermined period of frame 89 is 8 frames, that is, a frame having an ID of 89 occurs every eighth frame. The frame IDs of the intervening frames are shown as "*" and are not relevant because the selective call receiver only recognizes the frame ID of 89. Lines 510-560** show the power conservation and receiving and processing strobe of the selective call receiver. A logic high indicates frames where the selective call receiver is receiving and processing information and a logic low indicates frames where the selective call receiver is conserving power.

Line 510 shows the selective call receiver receives and processes only during the occurrence of frames having an ID of 89 (every eighth frame), that is, when the interval signal is a 1 and the repetition signal is a 0. Line 520 shows that the selective call receiver receives and processes every fourth frame when the interval signal is a 2 and the repetition signal is a 0. Note that any frame ID, interval, or repetition signal in the fourth frame after frame 89 is ignored by the selective call receiver since it does not occur in a frame having an ID of 89. Line 530 shows that the selective call receiver receives and processes every other frame when the interval signal is a 4 and the repetition signal is a 0. Line 540 shows that the selective call receiver receives and decodes in 2 consecutive frames in response to the repetition signal being a 1. Line 550 shows that the selective call receiver receives and decodes in 3 consecutive frames in response to the repetition signal being a 3. Finally, line 560 shows that the selective call receiver receives and decodes in two consecutive frames every fourth frame in response to the interval signal being a 2 and the repetition signal being a 1.

FIG. 20-25 show the flexibility of programming frames for a selective call receiver using the interval and repetition values. A selective call receiver assigned to a particular frame ID may be programmed to decode in various frames. Furthermore, a first frame ID may have a period different from a second frame ID. In this way, the paging terminal may redirect selective call receivers to different frames for reducing the traffic with the paging system. Furthermore, the internal mask of the selective call receivers enables the paging terminal to reassign selective call receivers without knowing their specific period of receptions, because the internal mask determines if the particular selective call receiver may be reassigned.

Figure 26:
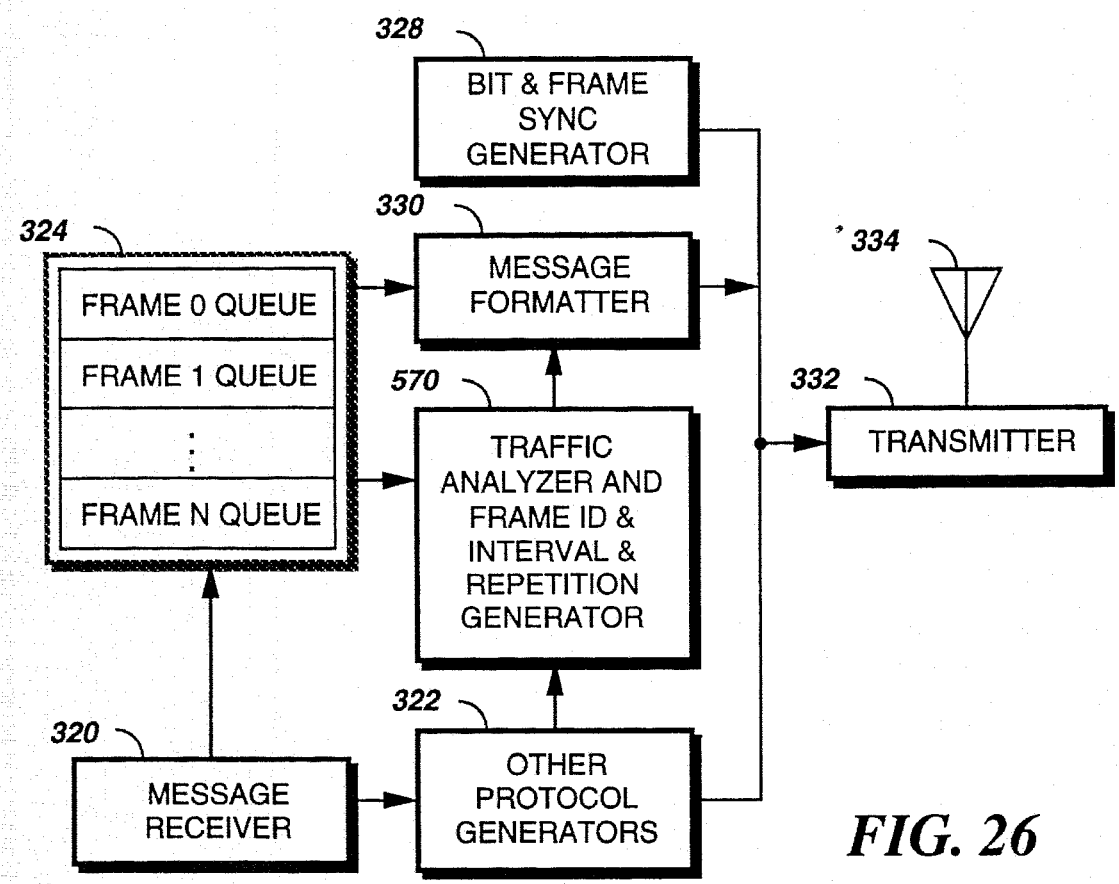

FIG. 26 shows a block diagram of a paging terminal generating a paging signal in accordance with FIG. 16. The functions of the paging terminal are substantially identical to the functions described with respect to FIG. 13 having identification numbers corresponding thereto. The difference is the traffic analyzer and frame ID, interval and repetition generator function 570. This function generates frame IDs at the predetermined period, determines the interval and cycle values to be included within a frame in response to the traffic conditions of the frame. As in the capacity analyzer 326 of FIG. 13, block 570 is also responsive to other protocols being transmitted.

Figure 27:
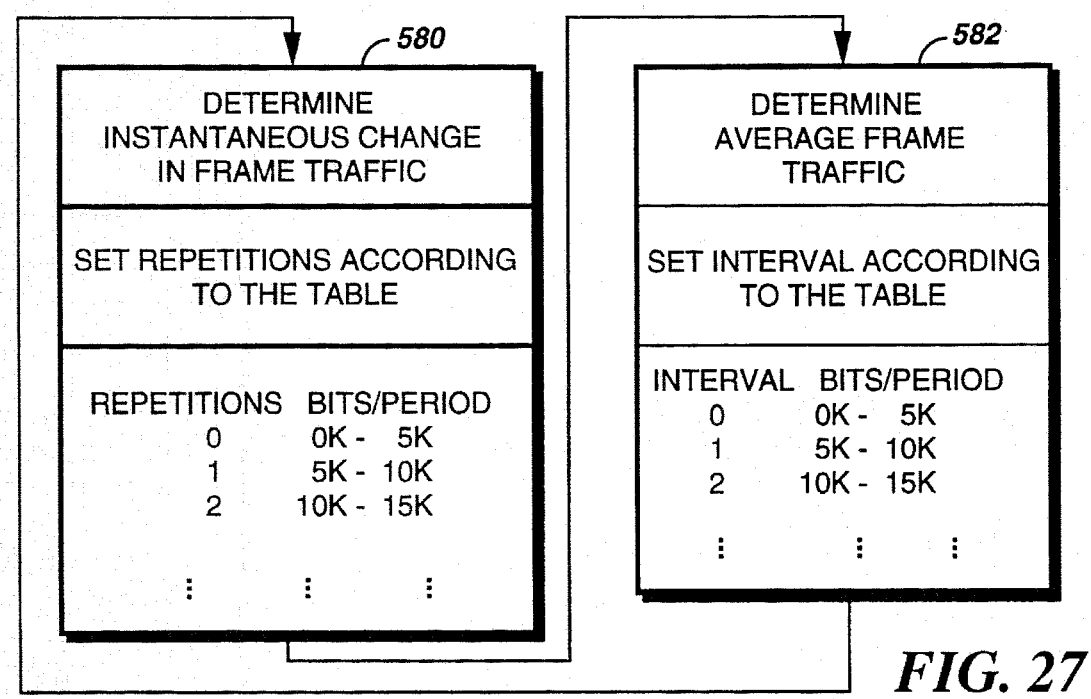
FIG. 27 is a flow diagram showing the operation of the traffic analyzer and interval and repetition generator of FIG. 26.

FIG. 27 shows the operation of the traffic analyzer and interval and repetition generator. When a frame ID is being transmitted, step 580 sets the repetition value. First the instantaneous change in traffic for the frame is determined. If the increase in traffic from a prior period of the frame is in the range of 0 to five thousand bits, a repetition value of zero is selected. This indicates a steady average traffic for the frame. If however, a change in the order of five thousand to ten thousand bits per period was detected, the repetition value of one is selected. This value would represent a momentary substantial increase in frame traffic such as the increase due to one very long information message. This kind of increase is compensated for by causing selective call receivers to immediately decode in the following frames. The repetition value increases as the magnitude of the instantaneous traffic increases. Thereafter, step 582 determines the average frame traffic. This determination may be made by averaging the number of bits per period received for the frame over a predetermined number of frame periods. Step 582 shows that the interval is set to zero if the average traffic is zero to five thousand bits, and the interval value increases with increasing traffic.

Thus FIG. 27 shows increasing the repetitions of selective call receivers assigned to a frame ID in response to instantaneous changes in frame traffic and increasing the interval in response to changes in the average traffic of a frame ID. Different criterion can be used to adjust repetition and interval values in other embodiments. In this way, the paging terminal may redirect selective call receivers to different frames for reducing the traffic with the paging system. The internal mask of the selective call receivers enables the paging terminal to reassign selective call receivers without knowing their specific period of receptions, because the internal mask determines if the particular selective call receiver may be reassigned.

Figure 28:
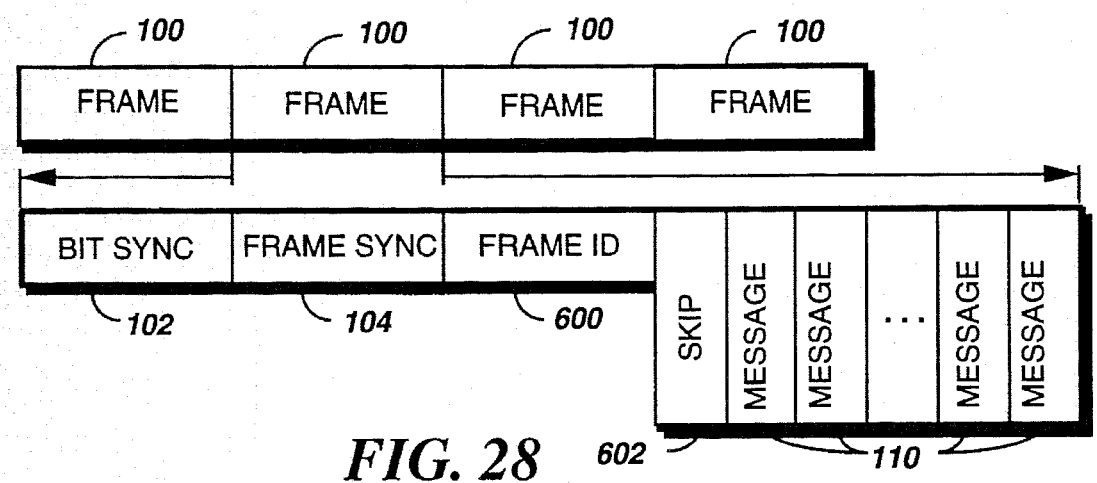
FIG. 28 shows a synchronous signal in accordance with a third embodiment of the present invention.

FIG. 28 shows a synchronous signal in accordance with another embodiment of the present invention. Word 600 includes frame IDs which need not be sequentially numbered, and may have any number of frames IDs. Furthermore, additional frame IDs may be added as the system requirements change, and each frame ID may occur at any interval. Thus a frame ID may "skip" through the synchronous signal as required. Word 602 comprises a "skip" value which indicates the minimum number of frames until the occurrence of the frame ID, and may also include an additionally boundary signal indicative of the boundary between the address and data portions of words 110.

Figure 29:
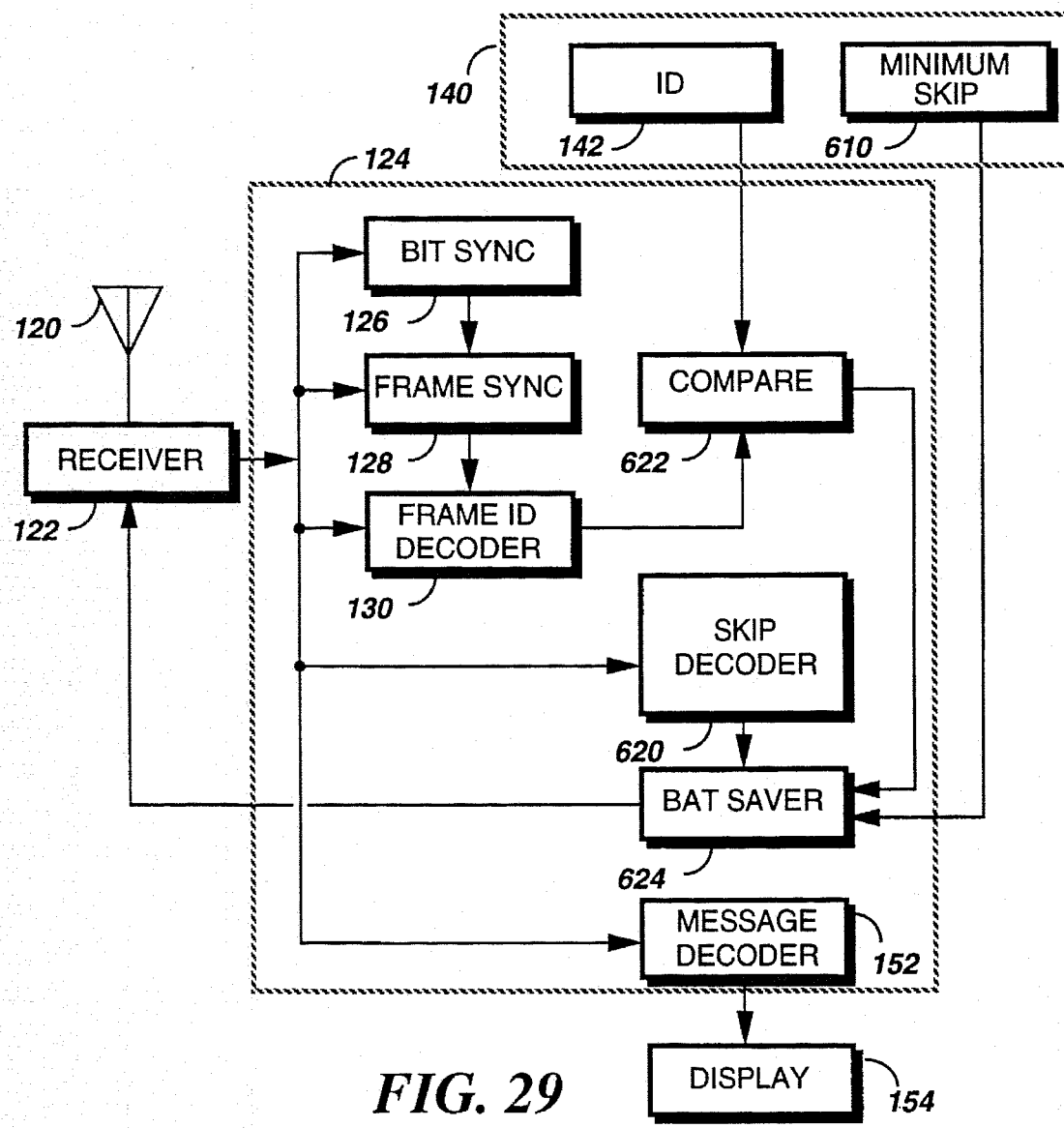
FIG. 29 is a block diagram of the selective call receiver capable of decoding the signal of FIG. 28.

Accordingly, FIG. 29 shows a block diagram of the paging receiver which decodes the signal of FIG. 18. The majority of the functions of the selective call receivers are identical with the selective call receiver of FIG. 2. Antenna 120, receiver 122, and display 154 are substantially identical in function to those of FIG. 2. The code plug 140, however, includes the predetermined frame ID 142 and a predetermined minimum "skip" value 610. Decoder 124 has bit and frame synchronizers 126 and 128, and a frame ID decoder 130 and message decoder 152 which operate substantially the same as those of FIG. 2. Skip decoder 620 decodes signal 602. Comparator 622 sends a signal to battery saver 624 when the decoded frame ID equals the predetermined frame ID 142. In response to the comparator 622 and the skip signal 602, battery saver 624 causes receiver 122 to either activate or conserve power.

Figure 30:
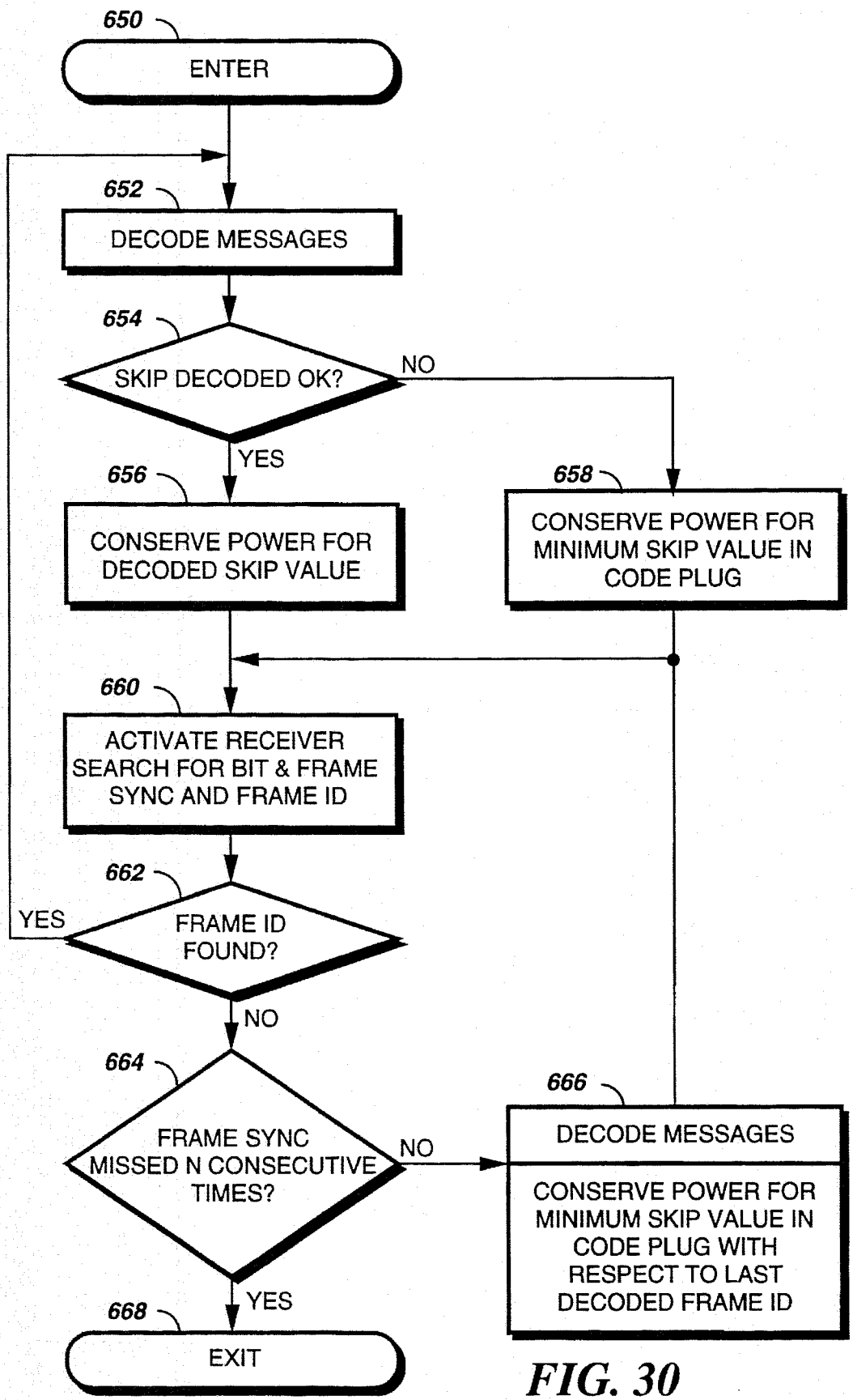
FIG. 30 is a flow diagram illustrating the synchronous operation of the selective call receiver according to FIG. 29.
Figures 34, 35:
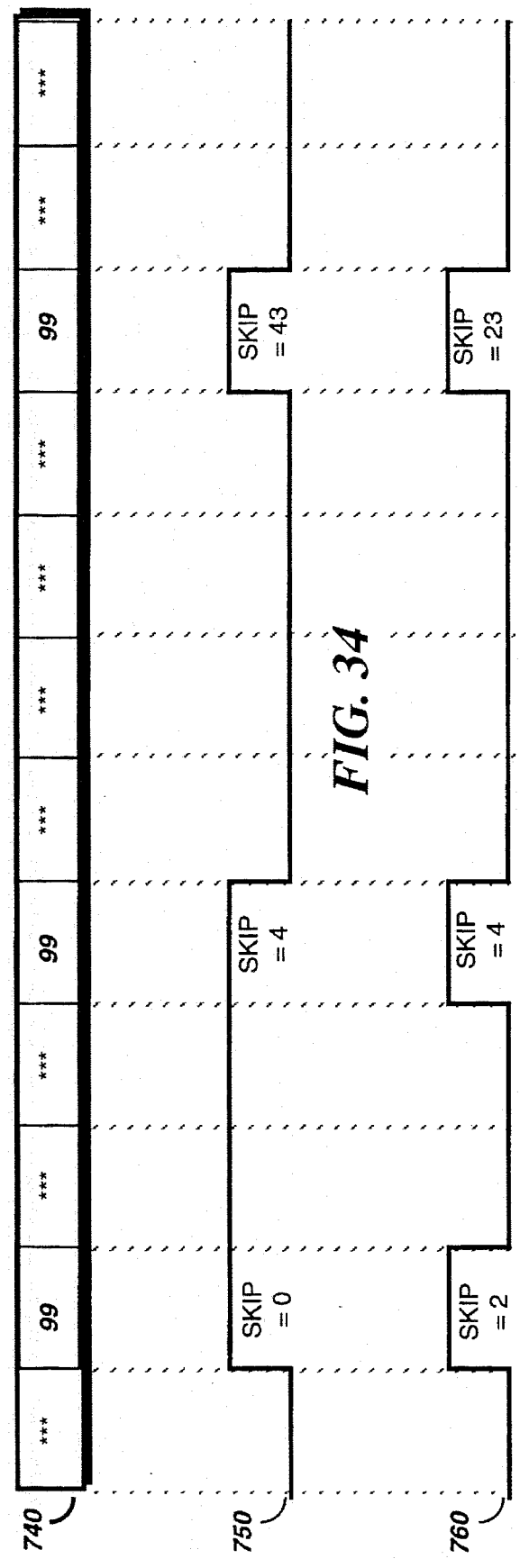

Referring to FIG. 30, a flow diagram is shown illustrating the synchronous operation of the embodiment of a receiver shown in FIG. 29. Subsequent to finding a frame ID matching the predetermined frame ID within the selective call receiver code plug, the operation proceeds to enter the flow diagram at step 650. Step 652 decodes the messages in the frame and additionally, decodes the "skip" value. Step 654 determines if the "skip" value was decoded OK in step 652 (this portion of the transmission may have been disrupted by noise). If yes, step 656 conserves power for the number of frames indicated by the "skip" value. If no, power is conserved for the minimum "skip" value stored in the code plug. Responsive to either step 656 or 658, step 660 activates the receiver and searches for bit and frame synchronization and frame ID. If a frame ID is found matching the predetermined frame ID in step 662, the flow returns to step 652 to continue to decode messages. However, if the frame ID is not found, step 664 determines if frame sync has been missed for a predetermined consecutive number N of times. If not, the selective call receiver is still synchronized and step 666 causes the messages in the frame to be decoded (as in step 652) and power is conserved for the minimum "skip" value. Thus, the next frame in which decoding is to be performed is determined with respect to the last occurrence of a frame having the frame ID matching the predetermined frame ID of the decoder. Subsequently, the flow returns to step 660. However, if (step 664) frame synchronization has been missed for N consecutive times, the flow exits (step 668) to step 174 of FIG. 18 to reacquire synchronization. Thus, in response to the "skip" value, a selective call receiver may conserve power for any number of frames. Additionally, if the pager is decoding in a frame wherein the frame ID is not found, the selective call receiver may decode at frame intervals corresponding to the minimum "skip" value. In practice, the "skip" and minimum "skip" values should be related in such way that a selective call receiver having found at least a first frame with the frame ID of the selective call receiver, the selective call receiver utilizing only the minimum "skip" values will always decode in a frame having the frame ID of the selective call receiver.

FIGS. 31–35 shows an example of a synchronous paging signal and the battery saver operation of the selective call receiver of FIG. 29. In this example, the selective call receiver has a predetermined frame ID of 99. Lines 700 and 740 shows that the frame ID 99 may occur at a multitude of positions. Line 700 shows the frame ID of 99 occurring eight frames apart, while line 740 shows the frame ID of 99 occurring three and five frames apart. The frame IDs of the intervening frames of lines 700 and 740 are shown as "*" and are not relevant because the selective call receiver only recognizes the frame ID of 99. Lines 710–730 and 750–760** show the power conservation and receiving and processing strobe of the selective call receiver. A logic high indicates frames where the selective call receiver is receiving and processing information and a logic low indicates frames where the selective call receiver is conserving power.

Line 710 shows a selective call receiver which, from a previous "skip" value, has been directed to decode in coincidence with the occurrence of the first frame 99. This frame has a "skip" value of 7 which causes the selective call receiver to conserve power for seven frames and begin decoding thereafter, which is in coincidence with the second occurrence of frame ID 99 of line 700. During the second occurrence of frame ID 99, the selective call receiver receives a new skip value of 45, which causes the selective call receiver to conserve power for 45 frames subsequent.

Line 720 shows a selective call receiver which, from a previous "skip" value, has been directed to decode in coincidence with the occurrence of the first frame 99. The selective call receiver, (line 720) has a predetermined minimum "skip" value of "0". A decoded "skip" value of 6 causes the selective call receiver to conserve power for 6 frames. Upon activating, the selective call receiver does not recognize the frame ID of the seventh frame but decodes information in that frame. The subsequent frame contains the ID of 99 and a "skip" value of 245, and the selective call receiver decodes the frame and conserves power for 245 frames. Thus, by providing a "skip" value less than the occurrence of the next frame ID for the selective call receiver, the selective call receiver can be made to decode in additional frames. Upon finding the frame ID of the selective call receiver, additional power conservation is performed.

Line 730 shows the operation of a selective call receiver having a minimum skip value of 1. Subsequent to a decoded first frame having an ID of 99, the selective call receiver receives a "skip" value of 3 and conserves power for 3 frames. The information in the fourth frame is decoded, however, if a frame ID of 99 is not found, the selective call receiver decodes the fourth frame and conserves power for the minimum skip value of 1 and then decodes the sixth frame. This frame also does not have a frame ID of 99 and power is again conserved for the minimum skip value of 1 frame. The selective call receiver then decodes the eight frame wherein the frame ID of 99 is found and a skip value of 73 is decoded. After decoding the frame, the selective call receiver conserves power for the subsequent 73 frames. Thus, a selective call receiver with a minimum "skip" value of 1 decodes every other frame until a frame having the frame ID of the selective call receiver is found.

Line 750 shows a method for decoding the signal of line 740. Upon decoding the first frame of line 740 having an ID of 99 and a "skip" value of 0, the selective call receiver decodes in every subsequent frame until a frame having an ID of 99 is found. Three frames later, frame ID 99 and a "skip" value of 4 is found. Thus, the selective call receiver has decoded in four consecutive frames. In response to a "skip" value of 4 the selective call receiver conserves power for four frames wherein it reactivates, decodes the frame and responds to a new "skip" value of 43. Line 760 shows another example of a signal as in 740 wherein every "skip" value corresponds to the occurrence of frames having a frame ID of 99.

Figure 36:
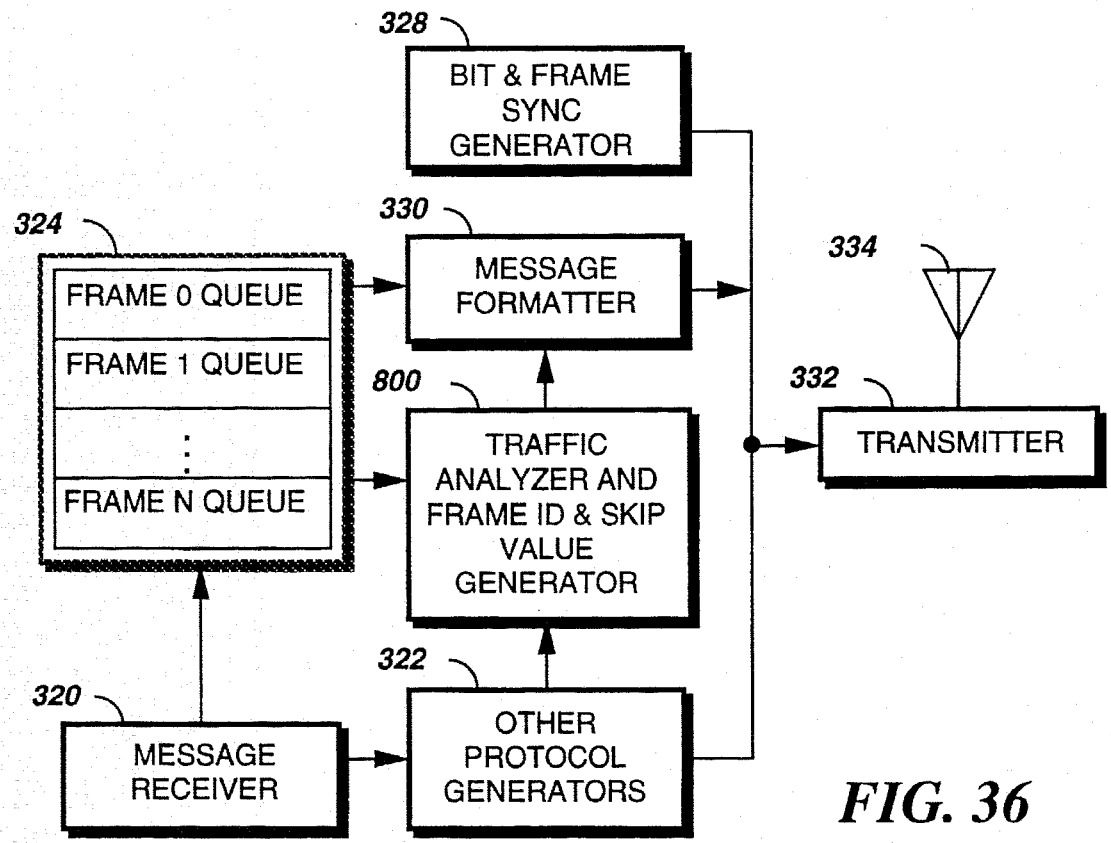
FIG. 36 is a block diagram of a selective call receiver terminal generating a paging signal in accordance with FIG. 28.

FIG. 36 shows a block diagram of a paging terminal generating a paging signal in accordance with FIG. 28. The functions of the paging terminal are substantially identical to the functions described with respect to FIG. 13 having identification numbers corresponding thereto. The difference being traffic analyzer and frame ID and skip value generator function 800. This function generates frame IDs and determines the "skip" values to be included within a frame in response to the traffic conditions of the frame. As in the capacity analyzer 326 of FIG. 13, block 800 is also responsive to other protocols being transmitted.

Figure 37:
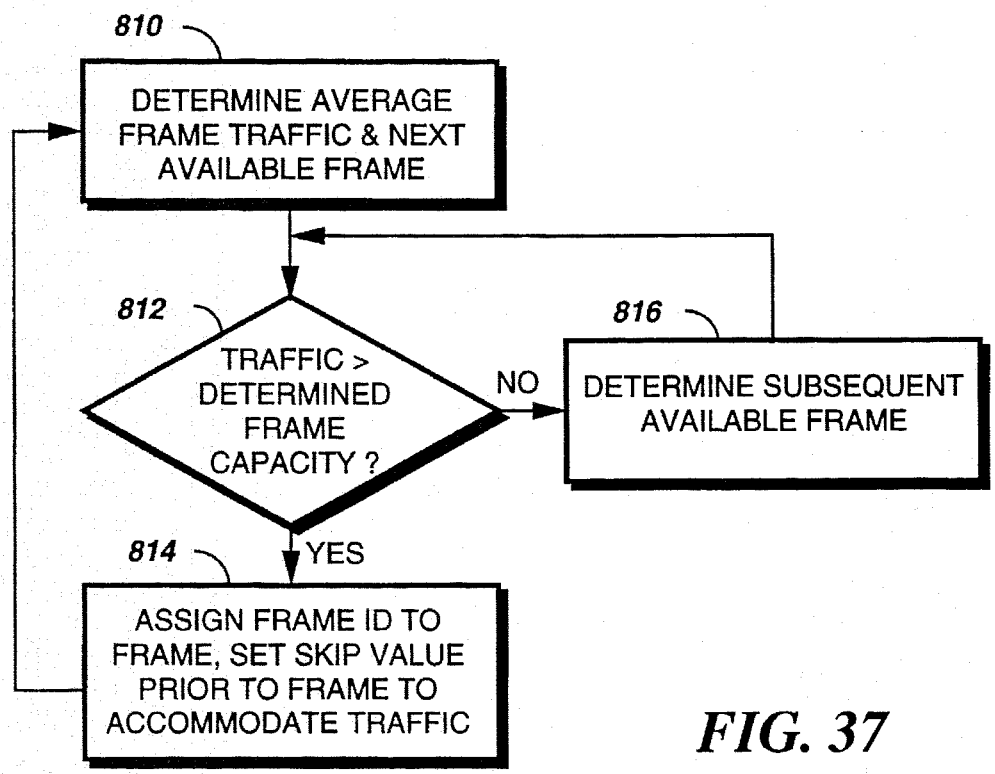
FIG. 37 is a flow diagram illustrating the operation of the traffic analyzer and interval and repetition generator.

FIG. 37 is a flow diagram illustrating the operation of the traffic analyzer and interval and repetition generator. When a frame ID is being transmitted, step 810 determines the average frame traffic and the next available frame having a vacant frame ID. Then step 812 determines if the amount of traffic is greater than the traffic provided for by the next vacant frame. If not, step 816 determines the subsequent available frame having a vacant frame ID, and returns to step 812. This sequence continues until the step 812 is satisfied. Then in step 814, the frame ID is assigned to the last determined frame. A "skip" value is set to either correspond to or be less than the occurrence of the of the determined frame in order that the extra frames may accommodate traffic sufficient to change the equality of step 812. In alternate embodiments, frames IDs may be assigned additionally in response to a minimum and/or maximum number of frames between frame IDs associated with each frame ID. Additionally, the assigned frame must provide for any minimum predetermined "skip" value associated to the selective call receivers having that predetermined frame ID.

Thus, signals corresponding to three embodiments of the present invention have been shown. FIG. 1 shows a signal which has a predetermined number of frame IDs numbered in a predetermined sequence. FIG. 16 shows a signal in which any number of frame IDs may be used in any sequence, however, the period of each frame ID is constant. FIG. 28 shows a signal in which any number of frame IDs may be used in any sequence. It should be appreciated that the repetition value may be used with any of the signals as described if FIG. 16, or be entirely eliminated. Additionally, with some minor modifications to the signal of FIG. 1, all three signals may be combined, thereby providing an extremely flexible paging system. Since selective call receivers receiving signals of FIGS. 1, 16 and 28 need not decode frame IDs and cycle, interval, period or "skip" values in every frame in which messages are decoded, and since the bit sync 102, frame sync 104 and message signals 110 have the same messages, messages within frames having frame IDs of one embodiment may be properly decoded by selective call receivers operating in accordance with another embodiment of the invention. In order to provide for an efficiently operating paging system, means for frame assignment of one, two or all three of the embodiments should be provided.

Figure 38:
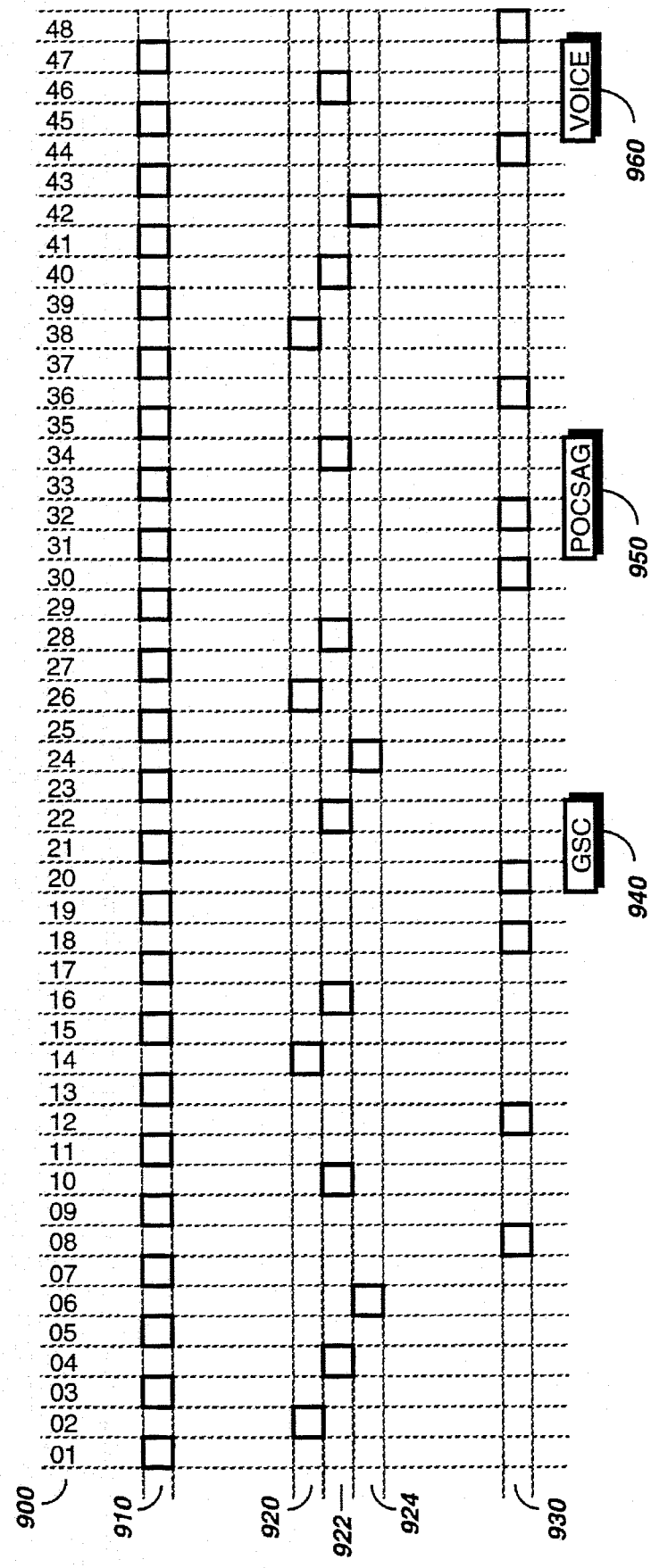
FIG. 38 is a timing diagram showing an example of the frame assignment for the combined signals of FIGS. 1, 16 and 28 and signals of other paging protocols.

FIG. 38 shows an example of a frame assignment that combines signals of FIGS. 1, 16 and 28 and signals from other paging protocols. Line 900 shows frames numbered 1 through 48, each frame having a common bit sync, frame sync and message information structure signals. Line 910 shows frames with frame IDs assigned according to FIG. 1. This embodiment of the invention has been modified such that every other frame is assigned a frame ID in accordance with FIG. 1. The frames are preferably numbered in even increments between values of 1 and 63, and the cycle values are selected such that the selective call receivers only decode in odd numbered frames. Thus, the remaining frame IDs are placed in the even numbered frames. It should be further appreciated that using this modification, frame IDs operation in accordance with FIG. 1 may alternately be used every 4th, 8th, . . . , $2^N$th frames, thereby providing for more frames to be used by the other embodiments. Selective call receivers receiving the frames of line 910 operate according to the dictates of the cycle value received in the frames.

Lines 920, 922 and 924 show frames with frame IDs operating in accordance with the signal of FIG. 16. Line 920 shows a frame ID which has a period 12 frames, line 922 shows a frame ID which has a period of 6 frames and line 924 shows a frame ID having a period of 18. Selective call receivers decoding in frames of either lines 920, 922 or 924 operate in accordance with the interval and repetition signals contained therein.

Line 930 shows remaining frames which are available for use with frame IDs used in accordance with the signal of FIG. 28. Any number of frame IDs may be used on the frames of line 930, each frame ID including a skip value causes the selective call receivers to conserve power according with the selective call receiver of FIG. 29. The frame IDs of the frames on lines 920–930 are preferably different from those of line 910 such that they are not recognized by the selective call receivers decoding the signal of FIG. 1.

For example, the period of the frame ID of line 920 is 12, and if the interval in frame 2 of line 900 is 3, the group of selective call receivers having the frame ID of line 12 would also decode in frame numbers 6 and 10. The frame ID of these frames belong to selective call receivers of lines 922 and 924, respectively. If, in another example, the interval in frame 2 of line 900 is 4, the group of selective call receivers having the frame ID of line 12 would also decode in frame numbers 5, 8 and 11, respectively. Thus, frame IDs of frames 5 and 11 are assigned to the selective call receivers of line 910, while the frame ID of frame 8 is assigned to the selective call receivers of line 930. Therefore, in this example, the selective call receivers, of the embodiment corresponding to FIG. 11, decode message information in frames operating in correspondence with the embodiments of FIGS. 1 and 28.

Items 940, 950 and 960 illustrate that other signaling protocols may co-exist with this embodiments of the present invention. Preferably, each frame is substantially 4 seconds in duration. Item 940 shows that a GSC signal is transmitted in place of frames indicated by 21, 22 and 23 on line 900. The GSC signal may be either data messages or voice messages. The GSC signal occupying these positions makes decoding of frame IDs and information by selective call receivers of the invention impossible. Since selective call receivers of the invention have a predetermined response to the absence of frame IDs, the subsequent frames in which they decode my be predicted. Thus, selective call receivers operating in accordance with line 910 having missed a frame ID in frame indicated by 21 will find a proper frame ID in the frame indicated by 23. These selective call receivers will respond according to the previous cycle value in the other frames of line 910. Additionally, selective call receivers operating in accordance with line 922, which missed a frame ID in the frame indicated by 22, will find a proper frame ID in the frame indicated by 28. Accordingly, the response of the group of selective call receivers in the intervening frames are predictable based on the predetermined interval and repetition values assigned to the group of selective call receivers, allowing the messages for the selective call receivers to be placed in the intervening frames.

Furthermore, selective call receivers operating in accordance with line 930 which are programmed to expect a frame ID in frame 20, will miss the frame ID and, will decode in accordance with the minimum skip value assigned to that group of selective call receivers. If the minimum skip was 0, these selective call receivers will decode in every subsequent frame until a frame ID matching their predetermined frame ID is found. Thus, messages for these selective call receivers may be placed in any frame after frame 22. Battery saving operation of these selective call receivers may be restored by "forcing" a frame having their frame ID in another frame, for example frame identified by number 26, thereby giving these selective call receivers a new skip value. Since the frame identified by 26 was apriori assigned to selective call receivers of line 920, the selective call receivers of line 920 will miss their expected frame ID at frame 26, causing these selective call receivers to decoded according to their predetermined interval and repetition values until the occurrence of frame identified by 38. Thus, the response of the selective call receivers of the invention to the GSC message is predictable, and synchronization to the signal is maintained. Accordingly, similar example responses to the POCSAG signal 950 and the analog voice signal 690 may be made. In this way, this invention facilitates the additions of other signaling systems by temporarily frustrating the battery saving features of the selective call receivers.

It should be appreciated that since selective call receivers of all three embodiments continue to decode in a known manner if an expected frame ID and or cycle value is not found. This provides for the transmission of another protocol such as the POCSAG or GSC paging protocol, while the selective call receivers remain in synchronization. Furthermore, this aspect provides for forcing the frame ID of a first frame of selective call receivers in the expected frame of another group of selective call receivers location to recover the battery save feature of the first group of selective call receivers.

Furthermore, the similarity in the paging terminals of FIGS. 13, 26 and 36 enable the combination of different functions. A frame queue 324 may hold the queues of the frames of all three embodiments to facilitate the combination. Accordingly, a frame which may have selective call receivers of one, two or all three embodiments may be analyzed by the capacity analyzer of each embodiment for total frame capacity. The selective call receivers of FIGS. 2, 17 and 29 operate substantially identically with the exception of the response to the received frame ID, cycle, interval and repetition, or skip value. Thus, a method for decoding any of the three embodiments may be incorporated into every selective call receiver, and an additional signal stored in the code plug of the selective call receiver to indicate the embodiment of the invention the selective call receiver.

Although several embodiments of the invention have been described by way of example, other modifications may be made to the description herein, while remaining within the spirit of the present invention.

Additional descriptions of the communication system may be found in U.S. Pat. Nos. 5,252,963 Snowden et al., 5,168,493 to Nelson et al. and 5,128,665 to DeLuca et al., all assigned to the assignee of the present invention and hereby incorporated by reference. The following appendix provides further description of the invention and its environment.

APPENDIX:
FLEX™ OVERVIEW

1.

1.1. PURPOSE

FLEX is trademark of Motorola, Inc. The major market need which drove the development of the FLEX signal protocol is the paging service provider's desire for greater channel capacity. (Prior to June 1993 this protocol was identified as WASP - Wide Area Signal Protocol). FLEX supports up to five times the traffic of a 1200 bps POCSAG channel when running at the 6400 bps rate. The Multi-speed format allows initial use at low speed (1600 bps) using much of a system's existing infrastructure. In order to maintain the simulcast and fading performance of slower speed codes like Motorola's GSC code, the protocol includes word interleaving to provide 10 mS fade protection and a modulation change to four level FM at 3200 bps and 6400 bps. Greatly improved battery life is achieved through the use of synchronous time slots in which latency in the delivery of messages can be extended to improve battery life. The code is also designed to support both local and nationwide roaming users. Channel identification of the local provider is part of the protocol. In the future, means to assist scanning pagers in identifying alternate channels which belong to nationwide networks will be defined. A special two word "long address" set supports over one billion users while a one word "short address" set serves more than two million users.

The FLEX protocol attempts to provide for the future with design flexibility allowing new system features to be added through the use of Sync "A5", "A6", "A7" and additional block information words which can be defined as needed.

1.2. SCOPE

One intent is to ensure that the FLEX protocol and the related features and services are implemented in a consistent manner among various manufacturers.

Section 3, "FLEX Protocol Definition" describes the over the air paging information as it appears on the channel. Section 4, "FLEX Encoding and Decoding Requirements", specifies the transmission rules for implementing FLEX in a paging terminal or other encoding device, and to provide decoding requirements for implementing FLEX in a pager.

This specification is intended for internal use by licensees of the FLEX protocol.

1.3. APPLICABLE DOCUMENT REFERENCE

FLEX Benchmarking

FLEX System Management Documentation:
    Battery Life Performance
    Mixing Coding Formats on a Channel
    Mixing Coding Formats on a Multi-channel Transmitter System Telocator Network Paging Protocol Version 3.6 October 20, 1993
The aforementioned documents are hereby incorporated by reference.

2. GENERAL DESCRIPTION

2.1. SYSTEM OVERVIEW

The FLEX code is a synchronous time slot protocol tied to an accurate time reference. When Frame 0 is synchronized with the start of each hour the pager can derive real time from the current frame and cycle number thus providing the user accurate time within the hour with no need for adjustment. (User sets hour and date or system provider can optionally choose to send time and date setting commands.)

Each pager is assigned a base frame in the set of 128 frames appearing on the channel during each 4 minute period of time. A user can trade battery life for the more frequent delivery of messages. FLEX has defined the concept of collapsing the frame number to less than the 7 binary bits normally required to convey a frame number. This masking of a specific number of Frame Number bits allows delivery latency to be traded for battery life. It is also valuable to force the concentration of FLEX paging traffic into very small periods of time to facilitate mixing with other codes. As an example all pagers in the system can be instructed in the block information word sent at the beginning of each frame to respond only to the 4 least significant bits in the frame number field. This results in pagers being operative for receiving messages once every 16 frames (30 seconds). Similarly the pager code plug may individually instruct specific pagers to collapse their assigned frame number. When the code plug assigned "pager collapse" value is smaller than the "system collapse" value it will take precedence and the pager will be receptive more often than the system value. If the system value is the smaller it will set the battery saving cycle.

Battery savings is also derived from the organization of fields within each frame. The active addresses are grouped together in a defined area at the beginning of each frame allowing the pager to immediately battery save at the end of this field when its address is not detected.

Once a pager acquires synchronization to the channel it expects to find its assigned frame within a very tight time window. Even if signal is lost, the pager continues to look in the expected windows possibly for up to 60 minutes (Time-out varies with system clock stability via programmed code plug value.) as might be the case during a subway ride. For this reason the terminal must maintain timing even through power failures so that when power is restored, paging will begin synchronous with the signal existing prior to the power outage.

The higher speed of FLEX creates tighter requirements on the time equalization of each transmitter link in order to minimize simulcast time offsets. It is recommended that the paging data be buffered at the transmitter site and re-clocked using an accurate timing source (possibly from a satellite). The use of 4-level FM doubles the modulation symbol length (when compared to 2-level FM) helping reduce the effect of simulcast distribution errors and the effect of propagation timing differences between multiple signals within the capture range of the receiver.

The multiple speed feature of FLEX is accomplished by multiplexing one, two, or four 1600 bps channels of traffic. If group calls are to be set up, the system provider should attempt to assign all potential members to the same frame for battery saving reasons. If members of the group have "single phase" pagers then their phases must match or the message will have to be repeated on each traffic multiplex phase.

Future high tier products will be capable of decoding all 4 phases simultaneously as may be required when message and information services share the same channel. Most alphanumeric pagers will be capable of 1600 bps reception on "any phase" while even higher tier data intensive products will be capable of 6400 bps message reception using "all phases".

3. FLEX PROTOCOL DEFINITION

3.1. MODULATION

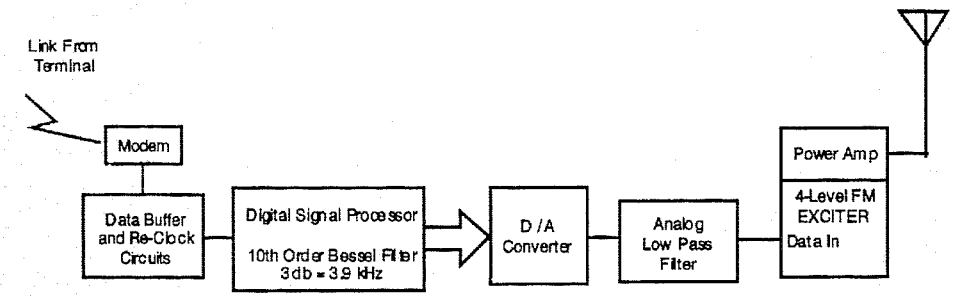

A low speed FLEX system intended to operate at 1600 bps requires few changes to an existing base station designed for 1200 / 2400 POCSAG operation. The deviation for FLEX should be set to ± 4800 Hz however if the channel is mixed with another protocol and only 2-FM is to be used, the pager will tolerate less deviation with little effect on sensitivity. When FLEX 4-FM is required then ± 4800 Hz must be used. See table below.

| 2-Level FM | | 4-Level FM (Gray Coded) | |
|---|---|---|---|
| "1" | Carrier + 4800 Hz | "10" | Carrier + 4800 Hz |
|  |  | "11" | Carrier + 1600 Hz |
|  |  | "01" | Carrier - 1600 Hz |
| "0" | Carrier - 4800 Hz | "00" | Carrier - 4800 Hz |

Deviation difference between 4-FM symbols is 3200 Hz ± 16 Hz.
Binary to 4-FM Conversion Order - Symbol MSB followed by Symbol LSB.
2-FM only - systems deviation may be reduced within range of ±4.0 to ±5.6 KHz Higher speed FLEX systems designed to operate at 3200 bps and 6400 bps require an upgraded base station and high speed communication links to each base station. The DSP filter circuit shown in figure above is required to meet adjacent channel splatter requirements while maintaining good simulcast performance.

When converting the binary data stream to 4 Level FM the first bit out becomes the MSB of the 4 level symbol with the following bit the LSB of the symbol. Thus for the FLEX protocol operating at 6400 bps, Phase "a" is always the symbol MSB with phase "b" the LSB. The same is true for phase "c" and "d".

The frequency difference between adjacent symbols shall be 3200 ± 16 Hz. The 2-level modulation within the FLEX sync portion must be held to the same accuracy as the "00" and "10" symbols in order to provide the means to derive accurate 4-level symbol thresholds.

3.2. FLEX FRAME STRUCTURE

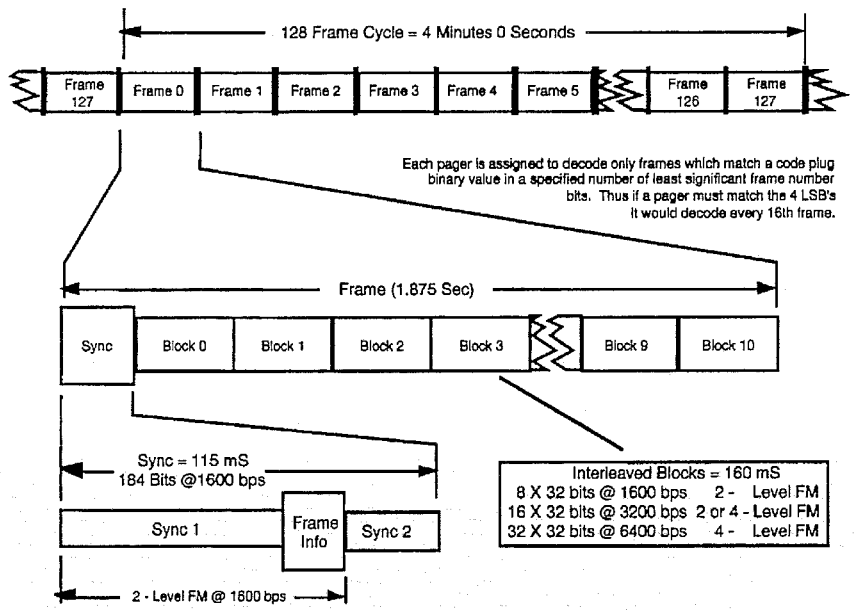

FLEX frames are transmitted at 32 frames per minute (1.875 sec per frame). A FLEX cycle is defined to be 128 frames (4 minutes) with each frame numbered from 0 to 127. An hour is divided into 15 FLEX cycles numbered 0 through 14. The frame information word contains the 7 bit frame number and the 4 bit cycle number. It is suggested that Frame 0, Cycle 0 be synchronized to real time on the hour. If this is not the case Frame 0 Cycle 0 should be made to lag real time by an integer number of frames with the offset frame value transmitted every hour in the Frame 0, Cycle 0 block information field. This allows pagers to update their real time clocks.

The Sync 1 portion of each frame is transmitted at 1600 bps providing means for obtainir frame timing, 1600 bps symbol timing, and an indication of the speed of the remainder of the frame. The frame information word carries the frame and cycle number, indications b time multiplex phase of low traffic (address field does not extend past Block 0), and a 4 b check character to ensure quality of the received information.

The Sync 2 portion of the frame is designed to provide synchronization at the Frame's block speed allowing proper de-multiplexing and decoding of the message blocks.

3.3. SYNC STRUCTURE
The structure of the FLEX synchronization signal is illustrated in the following figure.
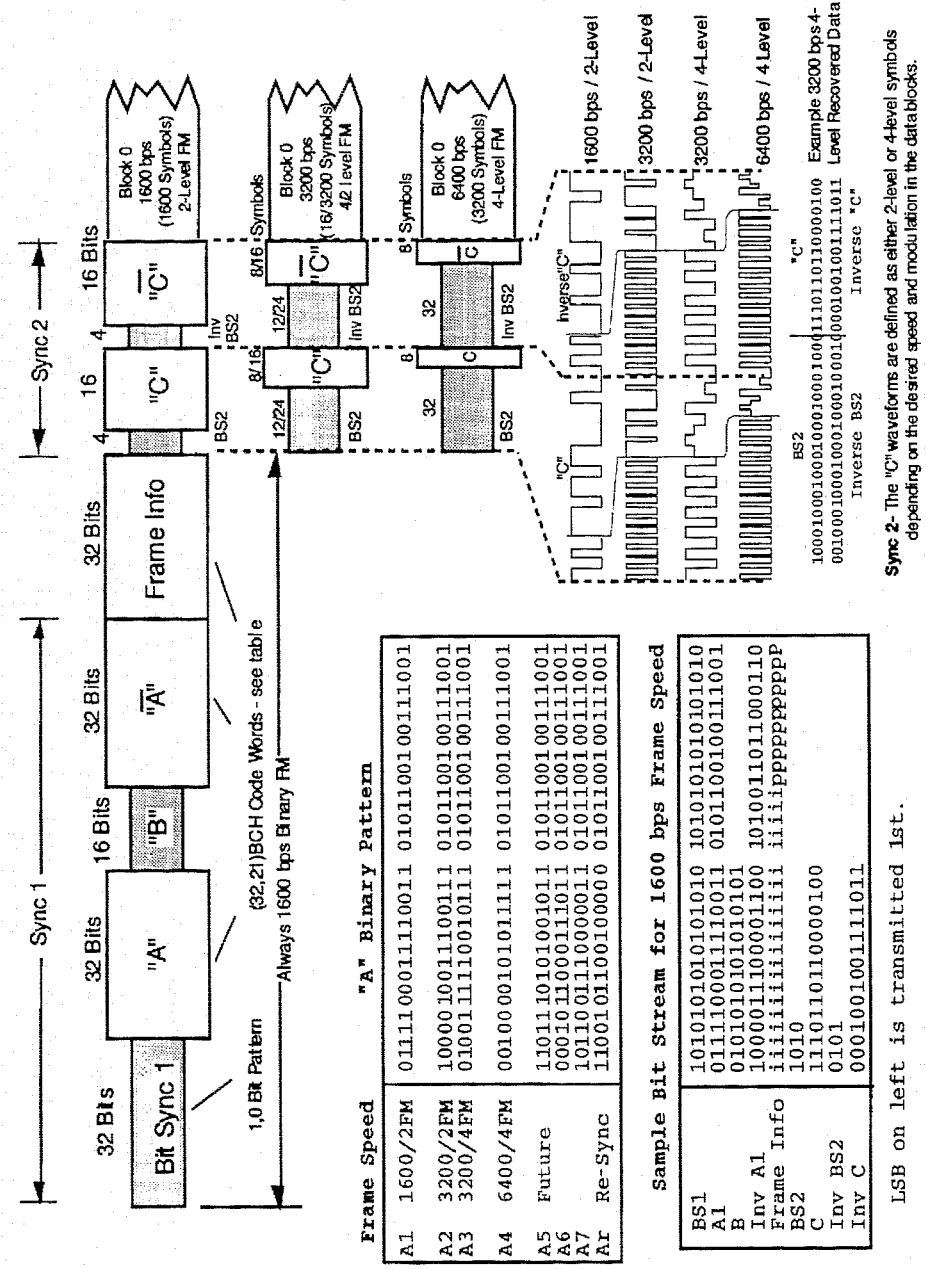

The sample bit stream table found in the above figure shows exactly the binary waveform which must appear on the channel for 1600 bps FLEX frames. For FLEX 3200 bps sent as binary 2-level FM, the A2 and the inverse A2 words are substituted for the "A1" and inverse "A1" patterns shown in the table. The Sync 2 pattern is changed to the example shown in the lower right of the figure (24 bits of comma followed by the 16 bit "C" pattern transmitted at 3200 bps). When 3200 bps 4-level is chosen the A3 and inverse A3 words are chosen to replace "A1" and a 4-level modulator is required to transmit the "C" pattern as shown in lower right of the figure. Note also that the comma now is a pattern made up of the 4-level 10, and 00 symbols. At 6400 bps the same process is used as just described substituting A4 in Sync 1 and modifying Sync 2 to 32 BS2 symbols (4-level) and 8 symbols for the "C" pattern. Possible future transmissions not presently defined and not included in this specification may use the A5, A6, and A7 sync words and variations in the "B" word pattern. When the present pager receives one of these future transmissions, battery saving will begin immediately after the first detection of A5, A6, or A7 or in the case of a pager not programmed to detect A5, A6 or A7, the absence of a detection of A1 through A4 in the expected time window will result in a return to the battery save mode.

The "C" pattern is used to facilitate the re-synchronization to the data blocks which may be sent at different speeds and with different modulation from the 1600 bps Sync 1. The "C" pattern transmitted always decodes to the same bit pattern independent of speed or modulation. ( "C" = 1110110110000100 with 1st bit transmitted on the left) The Bit Sync 2 pattern surrounding the "C" pattern is intended to look like full deviation comma on the channel. This results in decoded bit patterns of 0,1,0,1,0,1,... for 2-level modulations, 10,00,10,00,10,00... for 4 level modulations.

Table of "A" Patterns

|     | 1 2 3 4 5 6 7           16 | 17                        32 |
|-----|------------------------------|------------------------------|
| A 1 | 0 1 1 1 1 0 0 0 1 1 1 1 0 0 1 1 | 0 1 0 1 1 0 0 1 0 0 1 1 1 0 0 1 |
| A 2 | 1 0 0 0 0 1 0 0 1 1 1 0 0 1 1 1 | 0 1 0 1 1 0 0 1 0 0 1 1 1 0 0 1 |
| A 3 | 0 1 0 0 1 1 1 1 1 0 0 1 0 1 1 1 | 0 1 0 1 1 0 0 1 0 0 1 1 1 0 0 1 |
| A 4 | 0 0 1 0 0 0 0 1 0 1 0 1 1 1 1 1 | 0 1 0 1 1 0 0 1 0 0 1 1 1 0 0 1 |
| A 5 | 1 1 0 1 1 1 0 1 0 1 0 0 1 0 1 1 | 0 1 0 1 1 0 0 1 0 0 1 1 1 0 0 1 |
| A 6 | 0 0 0 1 0 1 1 0 0 0 1 1 1 0 1 1 | 0 1 0 1 1 0 0 1 0 0 1 1 1 0 0 1 |
| A 7 | 1 0 1 1 0 0 1 1 1 0 0 0 0 0 1 1 | 0 1 0 1 1 0 0 1 0 0 1 1 1 0 0 1 |
| A r | 1 1 0 0 1 0 1 1 0 0 1 0 0 0 0 0 | 0 1 0 1 1 0 0 1 0 0 1 1 1 0 0 1 |

3.4. EMERGENCY RE-SYNCHRONIZATION TRANSMISSION

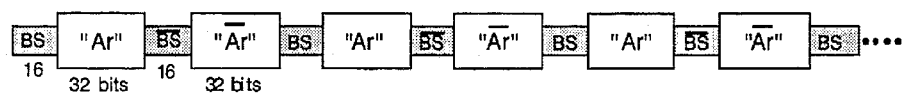

In emergency cases where the FLEX time reference backup systems fail or some other critical component is known to have failed it may become necessary for the system controller to force all pagers to re-synchronize. (Note: FLEX is intended to be a synchronous paging system requiring no preamble, thus when a pager synchronizes to the frame timing it receives over the air, all subsequent transmissions must follow with the same timing or the pager will miss messages.) The above re-synchronization pattern must be continuously transmitted on the channel for a length of time equal to the battery cycle of the pager with the largest collapse value. Thus if a pager is on the system with a collapse value of 7 (longest case) the transmission must be 4 minutes long to ensure that this pager would have at least one opportunity to receive the reset instruction. If at the other extreme the system had been running with a system collapse of "0" which forces all pagers to receive every frame, only a 1.875 second length of re-synchronization pattern would be required.

The re-synchronization pattern follows the definition of the "A" Synchronization portion of the Sync Structure described in the previous section. The "A" pattern is chosen to be the "Ar" pattern previously defined with 16 bits of comma separating the normal and inverted "Ar" words. The comma leading into the inverted "A" pattern is the inverse of the comma leading into the normal "A" pattern. There are no constraints as to how the transmission starts or ends just that the total length be at least equal to the length of the battery saving strobe period of the worst case pager in the system.

A possible use of this re-synchronization transmission might be required at the beginning of each calendar year when the GPS time reference is adjusted by a fraction of a second.

3.5. INTERLEAVED BLOCK STRUCTURE

Each FLEX block occupies 160 mS of transmission time independent of the designated frame speed. As is illustrated below additional information tracts (or multiplex phases) are combined together increasing the information per block in proportion to the selected speed.

1600 BPS Block (8 Words X 32 Bits)

```
            1 2 3 4 5 6 7 . . .           . . . . . . . .21 . . . . . . 31 32
                       Information                        Parity         Ck
   Word 0a  i i i i i i i i i i i i i i i i i i i i i   p p p p p p p p p  P
   Word 1a  i i i i i i i i i i i i i i i i i i i i i   p p p p p p p p p  P
   Word 2a  i i i i i i i i i i i i i i i i i i i i i   p p p p p p p p p  P
   Word 3a  i i i i i i i i i i i i i i i i i i i i i   p p p p p p p p p  P
   Word 4a  i i i i i i i i i i i i i i i i i i i i i   p p p p p p p p p  P
   Word 5a  i i i i i i i i i i i i i i i i i i i i i   p p p p p p p p p  P
   Word 6a  i i i i i i i i i i i i i i i i i i i i i   p p p p p p p p p  P
   Word 7a  i i i i i i i i i i i i i i i i i i i i i   p p p p p p p p p  P
```

3200 BPS Block (16 Words X 32 Bits)

```
   Word 0a  i i i i i i i i i i i i i i i i i i i i i   p p p p p p p p p  P
   Word 0c  i i i i i i i i i i i i i i i i i i i i i   p p p p p p p p p  P
   Word 1a  i i i i i i i i i i i i i i i i i i i i i   p p p p p p p p p  P
   Word 1c  i i i i i i i i i i i i i i i i i i i i i   p p p p p p p p p  P
                            .
                            .
                            .
   Word 6a  i i i i i i i i i i i i i i i i i i i i i   p p p p p p p p p  P
   Word 6c  i i i i i i i i i i i i i i i i i i i i i   p p p p p p p p p  P
   Word 7a  i i i i i i i i i i i i i i i i i i i i i   p p p p p p p p p  P
   Word 7c  i i i i i i i i i i i i i i i i i i i i i   p p p p p p p p p  P
```

6400 BPS Block (32 Words X 32 Bits)

```
   Word 0a  i i i i i i i i i i i i i i i i i i i i i   p p p p p p p p p  P
   Word 0b  i i i i i i i i i i i i i i i i i i i i i   p p p p p p p p p  P
   Word 0c  i i i i i i i i i i i i i i i i i i i i i   p p p p p p p p p  P
   Word 0d  i i i i i i i i i i i i i i i i i i i i i   p p p p p p p p p  P
   Word 1a  i i i i i i i i i i i i i i i i i i i i i   p p p p p p p p p  P
                            .
                            .
                            .
   Word 6d  i i i i i i i i i i i i i i i i i i i i i   p p p p p p p p p  P
   Word 7a  i i i i i i i i i i i i i i i i i i i i i   p p p p p p p p p  P
   Word 7b  i i i i i i i i i i i i i i i i i i i i i   p p p p p p p p p  P
   Word 7c  i i i i i i i i i i i i i i i i i i i i i   p p p p p p p p p  P
   Word 7d  i i i i i i i i i i i i i i i i i i i i i   p p p p p p p p p  P
```

The above figures represent a data stream on the channel which is generated by transmitting columns starting at the upper left and preceding to the lower right. The 3200 and 6400 bps block construction can be viewed as shown above where the code word interleaving and multiple 1600 bps data stream multiplexing are combined into one operation. It could just as correctly be viewed as multiple interleaved data streams multiplexed together.

3.5.1. Block Size

All blocks are 160 mS in time. As the channel bit rate increases so to does the multiplex degree.

```
1600 bps -  8 Words   8 X 32 =  256 bits    Multiplex degree 1
3200 bps - 16 Words  16 X 32 =  512 bits    Multiplex degree 2
6400 bps - 32 Words  32 X 32 = 1024 bits    Multiplex degree 4
```

3.5.2. Block Transmission

All words are (32,21)BCH code words arranged in rows starting at Word 0a, Word 0b, 0c,0d, 1a, - - - - 7a,7b,7c,7d. Transmission takes place by columns starting at bit 1 of word 0a. This binary bit stream is either modulated directly (binary FSK), or in the case of 3200 and 6400 bps 4-level, it is first passed through a 2 bit symbol converter. The symbol conversion is synchronized so that the first two bits of the block are always paired together to form a four level symbol (bit 0a and 0b). Bit 0a becomes the MSB of the symbol with 0b the LSB.

3.5.3. Block Reception

Each receiver extracts (de-multiplexes) its assigned sample phase ("a", "b", "c", or "d") from the bit stream forming an 8 X 32 array in memory. The 32 bit BCH code words are now identifiable and can be processed through a 2 bit error correcting algorithm. Error status is noted for each word and the information bits are extracted for further processing. Pagers are assigned a phase value of 0,1,2, or 3 via the code plug. At 6400 bps, 0 maps into phase "a", 1 = "b", 2 = "c" and 3 = "d". At 3200 bps 0 & 1 map into "a" and 2 & 3 map into "c". At 1600 bps the multiplex assignment is not a factor in the decoding parameters.

3.6. TRANSMISSION ORDER

The following figure represents field ordering within a FLEX frame. It should be noted that field boundaries are not restricted to block boundaries.

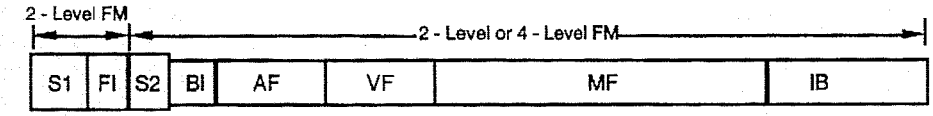

- Synchronization 1 - Consists of 112 bits at 1600 bps modulated with 2- level FM. Seven possible patterns provide over all system synchronization and specify the one of four possible frame types/rates to directly follow. Detection of the 5th, 6th or 7th "A" sync types indicates that no data is present for a standard paging receiver - i.e. the pager should battery save for remainder of this frame.
- Frame Information - This is a 32 bit code word transmitted at 1600 bps modulated with 2 - level FM. It identifies the Frame Number 0 - 127 (7 bits), the Cycle Number 0 - 14 (4 bits), battery saving flags (4 bits) leaving 2 reserved bits for future use.
- Synchronization 2 - Detection of this pattern provides timing information for synchronization to a higher speed frame. It consists of a 40 bit (40 Symbol) pattern transmitted at 1600 bps 2-FM if the frame speed is 1600 bps, an 80 bit (80 Symbol) pattern transmitted at 3200 bps if the frame speed is 3200 2-FM, an 80 bit (40 Symbol) pattern transmitted at 3200 bps 4 - Level FM if the frame speed is 3200 bps 4-FM, or a 160 bit (80 Symbol) pattern if the frame speed is 6400 bps.
- Block Information - The first 1, 2, 3, or 4 words of the first interleaved block contains frame and system structure information. Words 2, 3, and 4 are optional and will contain special information to be defined in the future. The typical case is a 1 word field with 2 bits indicating the start of the address field, 6 bits defining the start of the vector field, 2 bits to indicate traffic overflow into the next frame(s) (carry on), 3 bits indicating number of high order frame number bits to be masked (system collapse) and 4 bits indicating the number of priority addresses at the beginning of the address field.

Address Field - The address field starts directly after the Block Information Words and consist of short addresses (1 word), long addresses (2 words). Addresses which are limited to Tone Only operation should be placed at the end of the list since an associated vector is not required. Priority addresses are placed at the beginning of the field.

Vector Field - The vector field starts at the location indicated in the Block Information word and maintains a 1 to 1 relationship with the address field. The vector word points to the start word of the associated message and indicates the message length in code words.

Message Field - Contains the message words specified by the vector field.

Idle Blocks - Unused blocks should be filled with alternating all 1's and all 0's code words to produce a 1,0 pattern on the channel at 1600 bps. When transmitting 4 - level FM the unused blocks should be filled with the proper patterns to result in the same 1600 bps binary waveform on the channel.

The following figures and associated text represent the construction of a FLEX frame with a mix of message types.

Example - This diagram represents a mix of pages on just one phase of a FLEX frame transmission. An additional 1 or an additional 3 phases may be time multiplexed into this represented data when the channel speed is raised to 3200 or 6400 bps.

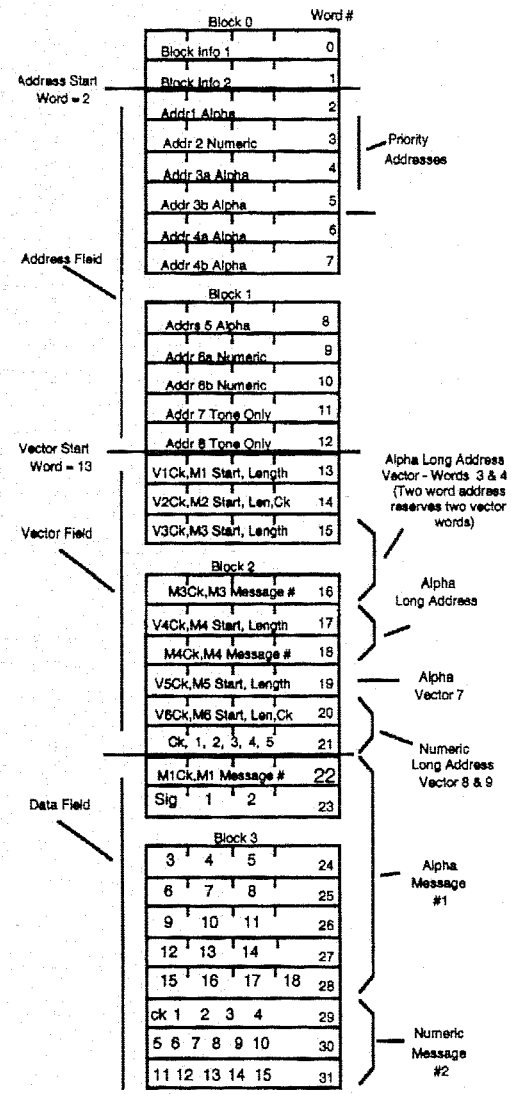

Block Information Field - This field is usually 1 word but may be up 4 words when additional information is carried. Two information bits specify the beginning (and number of Block Info Words) of the address field. Six information bits specify the beginning of the Vector field.

Address Field - By knowing the beginning of the address field and knowing the beginning of the vector field the pager can determine how many address words on the channel must be decoded in the frame in order to determine if a message is present. When an address is detected, the position in the address field is matched to the same position in the vector field to determine which vector holds the pointers to the associated message. A special priority address field is defined to occupy up to the first 15 addresses in the address field. Four bits in the Block Information Word identify this boundary.

Address Ordering is as follows:
a) Priority Addresses - First 0 - 15 Addresses
b) Addresses with associated vectors
c) Tone Only Addresses which do not require vectors. (Code plug must specify TO address - not a Tone Only function).

Long two-word Addresses - are not treated in any special manner in the address field. The extra word reserved in the vector field becomes the first word of the

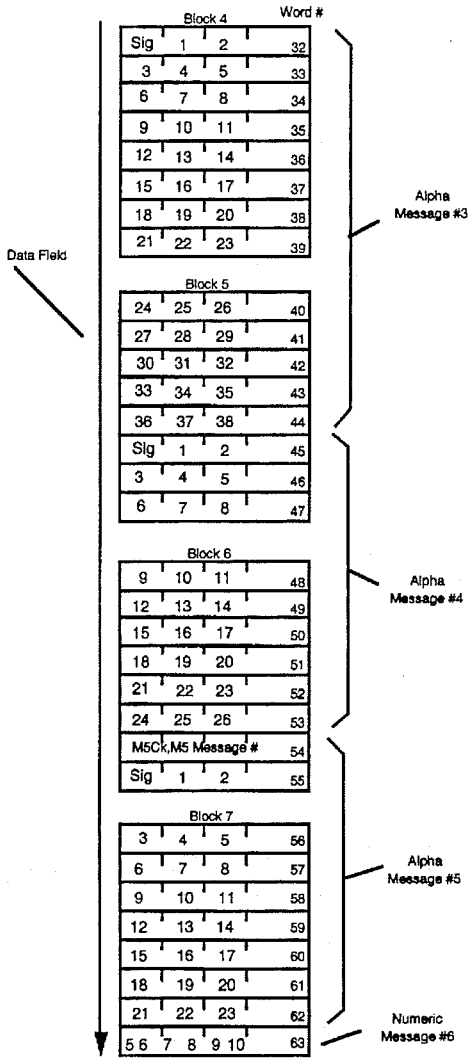

message - the vectors point to the rest of the message.

Vector Field - Vectors are defined as single (32,21,2) BCH code words (in the case of a long two word address the vector is also two words) where the first 4 bits are defined to be check bits followed by 3 vector type bits. The remaining 14 bits (14 +21 bits long addr.) carry the message start pointer, the message length (in code words) or other information depending on the vector type. See word definitions for complete definition.

Vector Types:
$V_2V_1V_0$
- 0 0 0  Secure Message Vector
- 0 0 1  Short Instruction Vector
- 0 1 0  Short Message Vector
- 0 1 1  Numeric Vector
- 1 0 0  Numeric Vector w/Format
- 1 0 1  Alphanumeric Vector
- 1 1 0  HEX / Binary Vector
- 1 1 1  Numeric Vector w/ Msg. #

Calculation of the Vector Word Position:
V (word #) = Addr(word #) - Addr Start (word # ) + Vector Start (word #)

The data field portion of each message starts with a check character as defined in the Code Word definitions of FLEX. Depending on the type of page the check character and even the first few characters may be located in the vector portion (as in case of two vector words being assigned for long addresses). The check character covers the total message field including fill bits and fill characters completing the last BCH word.

Unused blocks are filled with the all 1's and all 0's code words in the proper order to create the Bit Sync 1 pattern on the channel. (Binary 1,0 pattern at 1600 bps - blocks start with fill pattern and then are written over as frame is filled with traffic.) This pattern at the 6400 bps channel speed is equivalent to symbol transmissions of 10, 10, 00, 00, 10, 10, 00, 00 · · · · · etc., where gray coded 4-level FM symbols are used. "10" is the extreme positive deviated symbol and "00 is the extreme negative deviated symbol.

Message location in the data field does not have to be assigned in any particular order relative to the address order. Several addresses can be vectored to the same message.

3.7. ADDRESS FIELD RANGE DEFINITION

| Type | HEX | Binary | Decimal | Quantity |
|---|---|---|---|---|
| Idle Word | 000000 | 0 0000 0000 0000 0000 0000 | 0 | 1 |
| Long Addr 1 | 000001 | 0 0000 0000 0000 0000 0001 | 1 | |
| | 008000 | 0 0000 1000 0000 0000 0000 | 32,768 | 32,768 |
| Short Address | 008001 | 0 0000 1000 0000 0000 0001 | 32,769 | |
| | 1F27FF | 1 1111 0010 0111 1111 1111 | 2,041,855 | 2,009,087 |
| Info Svc Address (Reserved) | 1F2800 | 1 1111 0010 1000 0000 0000 | 2,041,856 | |
| | 1F67FF | 1 1111 0110 0111 1111 1111 | 2,058,239 | 16,384 |
| Network ID's (Reserved) | 1F6800 | 1 1111 0110 1000 0000 0000 | 2,058,240 | |
| | 1F77FF | 1 1111 0111 0111 1111 1111 | 2,062,335 | 4,096 |
| Temporary Addr's | 1F7800 | 1 1111 0111 1000 0000 0000 | 2,062,336 | |
| | 1F780F | 1 1111 0111 1000 0000 1111 | 2,062,351 | 16 |
| Reserve Addr's | 1F7810 | 1 1111 0111 1000 0001 0000 | 2,062,352 | |
| | 1F7FFE | 1 1111 0111 1111 1111 1110 | 2,064,382 | 2,031 |
| Long Addr 2 | 1F7FFF | 1 1111 0111 1111 1111 1111 | 2,064,383 | |
| | 1FFFFE | 1 1111 1111 1111 1111 1110 | 2,097,150 | 32,768 |
| Idle Word | 1FFFFF | 1 1111 1111 1111 1111 1111 | 2,097,151 | 1 |

2,097,152 Total

Addresses are always transmitted starting with the LSB to MSB followed by the BCH parity bits and the 32nd overall even parity bit.

3.8. CODE WORD DEFINITIONS

3.8.1. Basic Code Word Structure

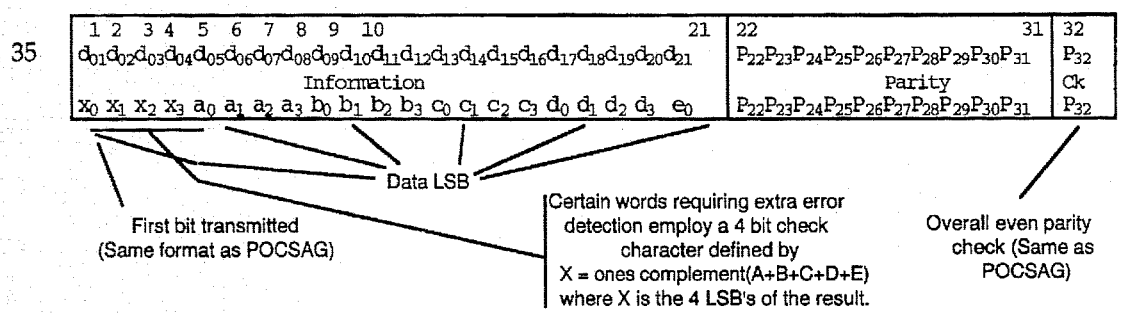

All (32,21)BCH words received in the FLEX code protocol are processed through a 2 bit error corrector. The 8 word interleaved block structure provides for correction of 16 consecutive errors in the received data stream (32 consecutive bit errors at 3200 bps and 64 consecutive bit errors at 6400 bps in the time multiplexed data stream). Since employing the maximum error correction may in some cases (low S/N and extreme cases of fading) result in an unacceptable error rate out of the decoder, the FLEX protocol utilizes check characters embedded in the data stream. The check character used in the Frame Information Word, the Block Information Word, and all Vector Words is calculated by forming 4-bit fields as shown in above figure and calculating the binary sum. The result is 1's complemented (each bit inverted) and the 4 LSB's of the result are transmitted as the check sum. (This definition eliminates the transmission of the all 0's code word since all zeros in the information field results in a check sum equal to 1111.) Check sums used elsewhere are based on the same concept but are tailored to the specific need.

Example: Calculate the check sum for the following information bits 5-21 xxxx 1010 0011 1001 1100 1

Rearrange each 4 bit field by moving LSB's to the right:
```
    0101
    1100
    1001
    0011
       1
  ------
  011110
```

1's complement of the result = 100001
The 4 LSB's = 0001
Rearranging LSB to the left for transmission = 1000 1010 0011 1001 1100 1

3.8.2. BCH Generator Polynomial

The (32,21,2)BCH code word with 32nd bit added to provide an over all even parity check is the same word as defined for the POCSAG code. Its use in FLEX is intended to follow POCSAG protocol as much as possible.

Each code word has 21 information bits, which correspond to the coefficients of a polynomial having terms from $X^{30}$ down to $X^{10}$. This polynomial is divided, modulo-2, by the generating polynomial $G(x) = X^{10} + X^9 + X^8 + X^6 + X^5 + X^3 + X^0$. The check bits correspond to the coefficients of the terms from $X^9$ to $X^0$ in the remainder polynomial found at the completion of this division. The complete block, consisting of the information bits followed by the check bits, corresponds to the coefficients of a polynomial which is integrally divisible in modulo-2 fashion by the generating polynomial.

To the 31 bits is added a 32nd bit to provide an even parity check of the whole code word.

3.8.3. Frame Information Word

| 1 2 3 4 5 6 7 . . . . . . . . . . . . . . . 21 | . . . . . . . . . 31 | 32 |
|---|---|---|
| Information | Parity | Ck |
| $x_0$ $x_1$ $x_2$ $x_3$ $c_0$ $c_1$ $c_2$ $c_3$ $f_0$ $f_1$ $f_2$ $f_3$ $f_4$ $f_5$ $f_6$ $n_0$ $r_0$ $t_0$ $t_1$ $t_2$ $t_3$ | p p p p p p p p p p | p |
| 0 0 1 1 1 1 0 0 0 0 1 1 1 1 0 0 0 0 0 0 1 | | |

Example: Cycle 3, Frame 60, Low traffic in phase d c - Cycle Number (0 - 14)  $c_3\ c_2\ c_1\ c_0$  15 Cycles per Hour
f - Frame Number (0 - 127)  $f_6\ f_5\ f_4\ f_3\ f_2\ f_1\ f_0$  128 frames per Cycle
n - Reserved bit - Default value = 0
r - Repeat Paging Indicator -
    If r = 1, $t_3\ t_2\ t_1\ t_0$ reserved to indicate repeat format on channel
    If r = 0, $t_3\ t_2\ t_1\ t_0$ are Low Traffic flags for each phase in frame
t - Definition dependent on value of "r".
    When r = 0, ($t_3\ t_2\ t_1\ t_0$) are Low Traffic Flags for phases (d,c,b,a)
        At 3200 bps $t_3=t_2$ and $t_1=t_0$ Representing the 2 phases in the frame.
        At 1600 bps $t_3=t_2=t_1=t_0$ Representing the one phase in the frame.
            t = 1 - Indicates Address field contained within block 0
            t = 0 - Indicates Address field extends past block 0
    These flags give an early indication that the traffic is light and all addresses are contained within block 0. The system controller will not set a flag to 1 even when traffic is low if a carry-on or collapse change condition exists.
x - Std 4 bit Check Character
Frames are normally transmitted in real time with Cycle 0 Frame 0 synchronized with the beginning of the hour.

3.8.4. Block Information Word 1

```
1 2 3 4 5 6 7 . . . . . . . . . . . . . . . . . . 21 . . . . . . . . 31  32
                    Information                         Parity           Ck
x₀ x₁ x₂ x₃ p₀ p₁ p₂ p₃ a₀ a₁ v₀ v₁ v₂ v₃ v₄ v₅ c₀ c₁ m₀ m₁ m₂ p p p p p p p p p p  P
0  1  0  1  0  1  0  1  0  0  1  1  1  1  1  0  0  1  1
```

Example: Addresses start at Word #3, Vectors start at Word #60, carry on into next 1 frames, System collapse of 6, first 10 addresses are priority.

p - Number of priority addresses at beginning of address field (0-15)  $p_3\ p_2\ p_1\ p_0$
a - End of Block Info Field (0-3)  $a_1\ a_0$ = (00, 01, 10, & 11 indicating address field to start at word 1, 2, 3, or 4)
v - Vector Field Start Word (1 - 63)  $v_5\ v_4\ v_3\ v_2\ v_1\ v_0$  If no vector field, this field should be set to the word position just following the last Tone Only address (Tone Only Address has no vector), If no addresses, the field should be set to the word position following the last Block Information word.
c - Flag for traffic "Carry On"  $c_1\ c_0$ = (00, 01,10,11). Traffic carried into next zero, one, two, or three frames  Flag applies only to pagers assigned to this frame - not pagers instructed to carry on in previous frame. Carry on value must be the same in all phases of the same frame.

m - System Frame ID Collapse Mask (0 - 7) All Frames Carry Same Value.

```
m₂ m₁ m₀
 0  0  0 - 2^0 = 1 Frame Latency   (pager decodes all frames)
 0  0  1 - 2^1 = 2 Frames Latency  (pager decodes every 2nd frame)
 •
 •
 •
 1  1  1 - 2^7 = 128 Frames Latency (No Collapse)
```
x - Std 4 bit Check Character

3.8.5. Block Information Word 2, 3, 4 (As required)

| 1 2 3 4 5 6 7 . . . . . . . . . . . . . . . . . 21 | . . . . . . . . 31 | 32 |
|---|---|---|
| Information | Parity | Ck |
| $x_0\ x_1\ x_2\ x_3\ f_0\ f_1\ f_2\ s_0\ s_1\ s_2\ s_3\ s_4\ s_5\ s_6\ s_7\ s_8\ s_9\ s_{10}\ s_{11}\ s_{12}\ s_{13}$ | p p p p p p p p p p | p |
| 1 1 0 1 1 0 0 1 0 1 0 0 1 1 1 1 1 0 0  1 1 | | |

Example: Date format, 5th Hour, 31 Day, 12th Month  (5:00 AM December 31)

f - Word Format Type   $f_2\ f_1\ f_0$
s - Data
x - Std 4 bit Check Character

| $f_2\ f_1\ f_0$ | $s_{13}s_{12}s_{11}s_{10}s_9\ s_8\ s_7\ s_6\ s_5$ | $s_4 s_3 s_2 s_1 s_0$ | |
|---|---|---|---|
| 0 0 0 | $i_8\ i_7\ i_6\ i_5\ i_4\ i_3\ i_2\ i_1\ i_0$ | $Z_4 Z_3 Z_2 Z_1 Z_0$ | Local ID, Time Zone |
| 0 0 1 | $m_3\ m_2\ m_1\ m_0\ d_4\ d_3\ d_2\ d_1\ d_0$ | $Y_4 Y_3 Y_2 Y_1 Y_0$ | Month, Day, Year |
| 0 1 0 | $S_2\ S_1\ S_0\ M_5\ M_4\ M_3\ M_2\ M_1\ M_0$ | $H_4 H_3 H_2 H_1 H_0$ | Second, Minute, Hour |
| 0 1 1 | $s_{13}s_{12}\ f_6\ f_5\ f_4\ f_3\ f_2\ f_1\ f_0$ | $H_4 H_3 H_2 H_1 H_0$ | Spare, Frame Offset, Hour |
| 1 0 0 | Reserved for Future Use | | |
| 1 0 1 | Reserved for Future Use | | |
| 1 1 0 | Reserved for Future Use | | |
| 1 1 1 | Reserved for Future Use | | |

When the FLEX channel operator decides to support nationwide roaming and / or the transmission of real time and date the following rules should be followed. The paging products designed to respond to these field must also accept their absence.

Local Channel ID - Every Frame "0000000" (once per 4 minutes) an additional Block Information word must be transmitted to communicate the local channel ID (in nationwide systems detection of local channel ID is used in the decision to scan to a new channel). If the channel is blocked due to channel sharing, the first valid frame following frame 0 is used. Format for this is xxxx 000 ssssssss zzzzz where "s" represents an assigned ID and "z" represents the time zone. The time zone is a part of the local ID in addition to providing time zone location to the system. Since all time zones do not lag Greenwich Mean Time by hour integers a table will identify the zone by name   See appendix. There are 512 possible local ID's per time zone per rf channel. This information may appear in additional frames if desired.

Real Time - Time should be sent once every 4 minutes in frame 0. If the channel is blocked due to channel sharing, the first valid frame following frame 0 is used. When the Local ID is sent in the 2nd block information word, a 3rd and 4th block information word can be used to carry time information. Hour field is 5 bits (00000 - 10111 , 1-23), Minute field is 6 bits (000000 - 111011, 0 -59 minutes ) and Seconds field is 3 bits (000 - 111, 1/8 minute or 7.5 Second increments). If the FLEX channel is locked to GPS time the 7.5 second time variation window will be reduced to zero since frame 0 is on an 1/8 minute boundary. The exact time synchronization with GPS is for the minute time mark to line up exactly with the first bit of the sync (1st bit of bit sync 1).

Day/Date - This information should be sent once every 4 minutes in frame 0000000. Month field is 4 bits (0001 - 1100 , Jan. - Dec.), Day field is 5 bits (00001 - 11111, 1-31), and the Year field is 5 bits (00000 - 11111, 1994 through 2025).

Frame Offset - May be sent every Frame "0000000" (once per 4 minutes) when for some reason it is found to be beneficial for the rf channel to operate with a time offsets referenced to real time (possible aid in a nationwide scan algorithm), the offset value may be communicated as a number which references the number of frames the offset channel lags the universal $T_0$ channel. It is assumed that Cycle 0 will start exactly on the hour or will start after the hour so that any adjustment in time can be calculated by multiplying 1.875 seconds times the frame number offset (received in the 7 bit frame offset number field) and adding the result to the clock. This is an alternate method for communicating time and may be used in the future. Note: For time keeping purposes only one of the two possible means for second / minute update should be used.

3.8.6. Address Word Definitions

Addresses are sent LSB 1st (opposite of POCSAG). This assumes that addresses are assigned in consecutive order resulting in the first address bit on the channel being closer to a random distribution.

3.8.6.1. Short Address

```
 1 2 3 4 5 6 7 . . . . . . . . . . . . . . . . . . 21 . . . . . . . . 31
32
              Information                                Parity         Ck
d₀ d₁ d₂ d₃ d₄ d₅ d₆ d₇ d₈ d₉ d₁₀ d₁₁ d₁₂ d₁₃ d₁₄ d₁₅ d₁₆ d₁₇ d₁₈ d₁₉ d₂₀ p p p p p p p p p
p
``` d - Short Address Information bits -
   d₂₀ d₁₉d₁₈d₁₇d₁₆  d₁₅d₁₄d₁₃d₁₂  d₁₁d₁₀d₉d₈  d₇d₆d₅d₄  d₃d₂d₁d₀  Range from
       0 0000 1000 0000 0000 0001 thru 1 1111 0010 0111 1111 1111

3.8.6.2. Long Two Word Address

| 1 2 3 4 5 6 7 . . . . . . . . . . . . . . . . . . 21 | . . . . . . . . 31 | 32 |
|---|---|---|
| Information | Parity | Ck |
| $d_0$ $d_1$ $d_2$ $d_3$ $d_4$ $d_5$ $d_6$ $d_7$ $d_8$ $d_9$ $d_{10}$ $d_{11}$ $d_{12}$ $d_{13}$ $d_{14}$ $d_{15}$ 0 0 0 0 0 | p p p p p p p p p | p |
| $e_0$ $e_1$ $e_2$ $e_3$ $e_4$ $e_5$ $e_6$ $e_7$ $e_8$ $e_9$ $e_{10}$ $e_{11}$ $e_{12}$ $e_{13}$ $e_{14}$ $e_{15}$ 1 1 1 1 1 | p p p p p p p p p | p | d - Long Address First Word Information bits -
$d_{15}d_{14}d_{13}d_{12}$ $d_{11}d_{10}d_9d_8$ $d_7d_6d_5d_4$ $d_3d_2d_1d_0$ Range from
0000 0000 0000 0001 thru 1000 0000 0000 0000 e - Long Address Second Word Information bits -
$e_{15}e_{14}e_{13}e_{12}$ $e_{11}e_{10}e_9e_8$ $e_7e_6e_5e_4$ $e_3e_2e_1e_0$ Range from
0111 1111 1111 1111 thru 1111 1111 1111 1110

Use of a Long address results in a corresponding double vector. By definition the first word of the message resides in this 2nd vector word. Now the vector pointer indicates the position of the first word of the remaining message and the message size / length field indicates the number of message words total (subtract 1 to find number of words in the message field).

3.8.7. Vector Word Definitions

3.8.7.1. Numeric Vector

| 1 2 3 4 5 6 7. . . . . . . . . . . . . . . . . . 21 | . . . . . . . . . 31 | 32 |
|---|---|---|
| Information | Parity | Ck |
| $x_0$ $x_1$ $x_2$ $x_3$ $V_0$ $V_1$ $V_2$ $b_0$ $b_1$ $b_2$ $b_3$ $b_4$ $b_5$ $b_6$ $n_0$ $n_1$ $n_2$ $K_0$ $K_1$ $K_2$ $K_3$ | p p p p p p p p p p | p |
| 1 0 0 1 1 1 0 1 1 1 0 0 0 0 1 1 0 0 1 1 1 | | |

Example: Numeric vector type, message starts at word #7 and is 4 words in length, the first 4 LSB's of the message check character are 1110

V - Vector Type    $V_2$ $V_1$ $V_0$
                      0 1 1 - Standard Numeric Vector
                      1 0 0 - Special Format Numeric Vector (rule defined in code plug)
                      1 1 1 - Numbered Numeric Vector b - Word number range of message start (3 - 87 Decimal )
n - Number of words in message = (n n n +1) (n n n = 0 to 7 Decimal )
K - Beginning check bits of message
x - Std 4 bit Check Character Note: Long addresses results in a second vector word which becomes the first message word. Remaining message words in the message field is reduced by 1.

3.8.7.2. Short Message / Tone Only Vector

| 1 2 3 4 5 6 7 . . . . . . . . . . . . . . . . 21 | . . . . . . . 31 | 32 |
|---|---|---|
| Information | Parity | Ck |
| $x_0$ $x_1$ $x_2$ $x_3$ $V_0$ $V_1$ $V_2$ $t_0$ $t_1$ $d_0$ $d_1$ $d_2$ $d_3$ $d_4$ $d_5$ $d_6$ $d_7$ $d_8$ $d_9$ $d_{10}$ $d_{11}$ | p p p p p p p p p p | p |
| $d_{12}d_{13}d_{14}d_{15}$ $d_{16}d_{17}d_{18}d_{19}$ $d_{20}d_{21}d_{22}d_{23}$ $d_{24}d_{25}d_{26}d_{27}$ $d_{28}d_{29}d_{30}d_{31}$ $d_{32}$ | p p p p p p p p p p | p |

Note: Second word bits $d_{12}$ - $d_{32}$ are present only when this vector is used with a long address.

V - Vector Type     $V_2V_1V_0$   010   Short Message / Tone Only t - Message Type

| $t_1t_0$ | $d_{11}d_{10}d_9d_8$   $d_7d_6d_5d_4$   $d_3d_2d_1d_0$ | |
|---|---|---|
| 00 | $c_3c_2c_1c_0$   $b_3b_2b_1b_0$   $a_3a_2a_1a_0$ | - 3 Char (Short Address) or 8 Char (Long Address) Numeric Message. |
| 01 | $s_{11}s_{10}s_9s_8$   $s_7s_6s_5s_4$   $s_3$ $s_2s_1s_0$ | - 8 Sources plus 9 or 30 Spare Bits |
| 10 | $s_{11}s_{10}s_9$   $N_5N_4N_3N_2N_1N_0$   $s_2s_1s_0$ | - 8 Sources, 0-63 Message Number, 3 or 24 spare bits |
| 11 | | - Spare Message Type | x - Std 4 bit Check Character (does not check 2nd code word).

Unused bits are set to 0, unused numeric characters are set to "space" (HEX C). In the case of "long addressing" there will be two vectors allowing bits $d_{12}$ through $d_{31}$ to represent 5 additional numeric characters with $d_{32}$ (spare bit) set to 0. Normal "short addressing" results in a 1 word "Short Message / Tone Only Vector".

3.8.7.3. HEX / Binary Vector

| 1 2 3 4 5 6 7 . . . . . . . . . . . . . . . . .21 | . . . . . . . .31 | 32 |
|---|---|---|
| Information | Parity | Ck |
| $x_0$ $x_1$ $x_2$ $x_3$ $V_0$ $V_1$ $V_2$ $b_0$ $b_1$ $b_2$ $b_3$ $b_4$ $b_5$ $b_6$ $n_0$ $n_1$ $n_2$ $n_3$ $n_4$ $n_5$ $n_6$ | p p p p p p p p p | p |

V - Vector Type   $V_2V_1V_0$ = 110 - HEX Message Vector b - Word Number of message start   $b_6b_5b_4b_3b_2b_1b_0$   (3 - 87 Decimal)

n - Number of message words in this frame $n_6n_5n_4n_3n_2n_1n_0$ ( 1 to 85 Decimal )
    Note: Long address results in second vector word which becomes the first message word. Remaining message words in the message field is reduced by 1.

x - Std 4 bit Check Character

3.8.7.4. Alphanumeric Vector

| 1 2 3 4 5 6 7 . . . . . . . . . . . . . . . . .21 | . . . . . . . . 31 | 32 |
|---|---|---|
| Information | Parity | Ck |
| $x_0$ $x_1$ $x_2$ $x_3$ $V_0$ $V_1$ $V_2$ $b_0$ $b_1$ $b_2$ $b_3$ $b_4$ $b_5$ $b_6$ $n_0$ $n_1$ $n_2$ $n_3$ $n_4$ $n_5$ $n_6$ | p p p p p p p p p p | p |

V - Vector Type  $V_2V_1V_0$ = 101 - Alpha Message Vector
b - Word Number of message start  (3 - 87 Decimal)
n - Number of message words in this frame  (1 to 85 Decimal)
 Note: Long address results in second vector word which becomes the first message word. Remaining message words in the message field is reduced by 1.
x - Std 4 bit Check Character

3.8.7.5. Secure Message Vector

| 1 2 3 4 5 6 7 . . . . . . . . . . . . . . . .21 | . . . . . . . . 31 | 32 |
|---|---|---|
| Information | Parity | Ck |
| $x_0$ $x_1$ $x_2$ $x_3$ $V_0$ $V_1$ $V_2$ $b_0$ $b_1$ $b_2$ $b_3$ $b_4$ $b_5$ $b_6$ $n_0$ $n_1$ $n_2$ $n_3$ $n_4$ $n_5$ $n_6$ | p p p p p p p p p p | p |

V - Vector Type  $V_2V_1V_0$ = 000 - Secure Message Vector
b - Word Number of message start  (3 - 87 Decimal)
n - Number of message words in this frame  (1 to 85 Decimal)
 Note: Long address results in second vector word which becomes the first message word. Remaining message words in the message field is reduced by 1.
x - Std 4 bit Check Character

3.8.7.6. Short Instruction Vector

| 1 2 3 4 5 6 7. . . . . . . . . . . . . . . . 21 | . . . . . . 31 | 32 |
|---|---|---|
| Information | Parity | Ck |
| $x_0\ x_1\ x_2\ x_3\ v_0\ v_1\ v_2\ i_0\ i_1\ i_2\ d_0\ d_1\ d_2\ d_3\ d_4\ d_5\ d_6\ d_7\ d_8\ d_9\ d_{10}$ | p p p p p p p p p p | p |
| $d_{11}d_{12}d_{13}d_{14}\ d_{15}d_{16}d_{17}d_{18}\ d_{19}d_{20}d_{21}d_{22}\ d_{23}d_{24}d_{25}d_{26}\ d_{27}d_{28}d_{29}d_{30}\ d_{31}$ | p p p p p p p p p | p |

Note: Second word bits $d_{11} - d_{31}$ are present only when this vector is used with a long address. All unused bits set to "0".

V - Vector Type  $v_2 v_1 v_0$ = 001  Short Instruction Vector
i - Defines instruction type
d - Definition depends on vector function
x - Std 4 bit Check Character Note: As of date of this release all bits in the second word are unused and should be set to "0". All unused spare bits should also be set to "0".

|  | $i_2\ i_1\ i_0$ | $d_{10}d_9d_8d_7d_6d_5d_4d_3d_2d_1d_0$ |  |
|---|---|---|---|
| Temp. Address Activation | 0 0 0 | $a_3 a_2\ a_1 a_0\ f_6 f_5 f_4 f_3 f_2 f_1 f_0$ | 4 Addr, 7 Frame |
| Reserved | 0 0 1 | | |
| Reserved | 0 1 0 | | |
| Reserved | 0 1 1 | | |
| Reserved | 1 0 0 | | |
| Reserved | 1 0 1 | | |
| Reserved | 1 1 0 | | |
| Reserved for Test | 1 1 1 | | |

Temporary Addresses - Each pager (as part of software in ROM) contains sixteen addresses which can be temporarily activated in a specific future frame (If the designated frame is equal to the present frame the pager is to interpret this as the next occurrence of this frame 4 minutes in the future.) These temporary addresses are similar to the Golay Sequential Code Activation Code Word which allows several activated pagers to receive a common message. The temporary address is valid for one message starting in the specified frame and remaining valid throughout the following frames to the completion of the message. If the message is not found in the specified frame (frame defined by a full 7 bit frame number) the pager returns to normal operation.

The temporary Base Address is defined to be 1 1111 0111 1000 0000 0000 (MSB to LSB) Temporary Addresses are calculated from the base address by adding binary 0 (0000) through binary 15 (1111) to the base.

3.8.8. Message Field Definitions

3.8.8.1. Numeric Data Message

Standard (V = 011) or Special Format (V = 100)  4, 10, 15, 20, 25, 31, 36, or 41 Characters

| 1 2 3 4 5 6 7 . . . . . . . . . . . . . . . . .21 Information | . . . . . . . . 31 Parity | 32 Ck |
|---|---|---|
| 1st Word | | |
| $K_4$ $K_5$ $a_0$ $a_1$ $a_2$ $a_3$ $b_0$ $b_1$ $b_2$ $b_3$ $c_0$ $c_1$ $c_2$ $c_3$ $d_0$ $d_1$ $d_2$ $d_3$ $e_0$ $e_1$ $e_2$ | p p p p p p p p p | P |
| 2nd Word | | |
| $e_3$ $f_0$ $f_1$ $f_2$ $f_3$ $g_0$ $g_1$ $g_2$ $g_3$ $h_0$ $h_1$ $h_2$ $h_3$ $i_0$ $i_1$ $i_2$ $i_3$ $j_0$ $j_1$ $j_2$ $j_3$ | p p p p p p p p p | P |
| 3rd Word | | |
| $k_0$ $k_1$ $k_2$ $k_3$ $l_0$ $l_1$ $l_2$ $l_3$ $m_0$ $m_1$ $m_2$ $m_3$ $n_0$ $n_1$ $n_2$ $n_3$ $o_0$ $o_1$ $o_2$ $o_3$ $q_0$ | p p p p p p p p p | P |
| 4th Word | | |
| $q_1$ $q_2$ $q_3$ $r_0$ $r_1$ $r_2$ $r_3$ $s_0$ $s_1$ $s_2$ $s_3$ $t_0$ $t_1$ $t_2$ $t_3$ $u_0$ $u_1$ $u_2$ $u_3$ $v_0$ $v_1$ | p p p p p p p p p | P |
| 5th Word | | |
| $v_2$ $v_3$ $w_0$ $w_1$ $w_2$ $w_3$ $y_0$ $y_1$ $y_2$ $y_3$ $z_0$ $z_1$ $z_2$ $z_3$ $A_0$ $A_1$ $A_2$ $A_3$ $B_0$ $B_1$ $B_2$ | p p p p p p p p p | P |
| 6th Word | | |
| $B_3$ $C_0$ $C_1$ $C_2$ $C_3$ $D_0$ $D_1$ $D_2$ $D_3$ $E_0$ $E_1$ $E_2$ $E_3$ $F_0$ $F_1$ $F_2$ $F_3$ $G_0$ $G_1$ $G_2$ $G_3$ | p p p p p p p p p | P |
| 7th Word | | |
| $H_0$ $H_1$ $H_2$ $H_3$ $I_0$ $I_1$ $I_2$ $I_3$ $J_0$ $J_1$ $J_2$ $J_3$ $K_0$ $K_1$ $K_2$ $K_3$ $L_0$ $L_1$ $L_2$ $L_3$ $M_0$ | p p p p p p p p p | P |
| 8th Word | | |
| $M_1$ $M_2$ $M_3$ $O_0$ $O_1$ $O_2$ $O_3$ $P_0$ $P_1$ $P_2$ $P_3$ $Q_0$ $Q_1$ $Q_2$ $Q_3$ $T_0$ $T_1$ $T_2$ $T_3$ $U_2$ $U_3$ | p p p p p p p p p | P |

Numbered (V = 111)  2, 8, 13, 18, 23, 29, 34, or 39 Numeric Characters

| 1 2 3 4 5 6 7 . . . . . . . . . . . . . . . . .21 Information | . . . . . . . 31 Parity | 32 Ck |
|---|---|---|
| 1st Word | | |
| $K_4$ $K_5$ $N_0$ $N_1$ $N_2$ $N_3$ $N_4$ $N_5$ $R_0$ $S_0$ $a_0$ $a_1$ $a_2$ $a_3$ $b_0$ $b_1$ $b_2$ $b_3$ $c_0$ $c_1$ $c_2$ | p p p p p p p p p | P |
| 2nd Word | | |
| $c_3$ $d_0$ $d_1$ $d_2$ $d_3$ $e_0$ $e_1$ $e_2$ $e_3$ $f_0$ $f_1$ $f_2$ $f_3$ $g_0$ $g_1$ $g_2$ $g_3$ $h_0$ $h_1$ $h_2$ $h_3$ | p p p p p p p p p | P |
| 3rd Word | | |
| $i_0$ $i_1$ $i_2$ $i_3$ $j_0$ $j_1$ $j_2$ $j_3$ $k_0$ $k_1$ $k_2$ $k_3$ $l_0$ $l_1$ $l_2$ $l_3$ $m_0$ $m_1$ $m_2$ $m_3$ $n_0$ | p p p p p p p p p | P |
| 4th Word | | |
| $n_1$ $n_2$ $n_3$ $o_0$ $o_1$ $o_2$ $o_3$ $q_0$ $q_1$ $q_2$ $q_3$ $r_0$ $r_1$ $r_2$ $r_3$ $s_0$ $s_1$ $s_2$ $s_3$ $t_0$ $t_1$ | p p p p p p p p p | P |
| 5th Word | | |
| $t_2$ $t_3$ $u_0$ $u_1$ $u_2$ $u_3$ $v_0$ $v_1$ $v_2$ $v_3$ $w_0$ $w_1$ $w_2$ $w_3$ $y_0$ $y_1$ $y_2$ $y_3$ $z_0$ $z_1$ $z_2$ | p p p p p p p p p | P |
| 6th Word | | |
| $z_3$ $A_0$ $A_1$ $A_2$ $A_3$ $B_0$ $B_1$ $B_2$ $B_3$ $C_0$ $C_1$ $C_2$ $C_3$ $D_0$ $D_1$ $D_2$ $D_3$ $E_0$ $E_1$ $E_2$ $E_3$ | p p p p p p p p p | P |
| 7th Word | | |
| $F_0$ $F_1$ $F_2$ $F_3$ $G_0$ $G_1$ $G_2$ $G_3$ $H_0$ $H_1$ $H_2$ $H_3$ $I_0$ $I_1$ $I_2$ $I_3$ $J_0$ $J_1$ $J_2$ $J_3$ $K_0$ | p p p p p p p p p | P |
| 8th Word | | |
| $K_1$ $K_2$ $K_3$ $L_0$ $L_1$ $L_2$ $L_3$ $M_0$ $M_1$ $M_2$ $M_3$ $O_0$ $O_1$ $O_2$ $O_3$ $P_0$ $P_1$ $P_2$ $P_3$ $Q_0$ $Q_1$ | p p p p p p p p p | P |

Data sent LSB 1st

K - 6 bit Fragment Check Character (First 4 bits are in the vector word). This check character is calculated by initializing the fragment check character (K) to zero and summing the information bits of each code word in the message fragment (including control information and termination characters and bits in the last message word) to a check sum register. The information bits of each word are broken into three groups: the first is the 8 bits comprising bits 1 through 8, the second group comprises bits 9 through 16 and the third group comprises bits 17 through 21. Bits 1, 9 and 17 are the LSB's of each group. The binary sum is calculated, the result is truncated to the 8 least significant bits. The 2 most significant bits are shifted right 6 bits and summed with the least significant 6 bits to form a new sum. This resultant sum is 1's complemented with the 6 LSB's of the result being transmitted as the message check character.

N - Message Number - When the system supports message retrieval the system controller will assign message numbers (for each paging address separately) starting at 0 and progressing to a maximum of 63 in consecutive order. The actual maximum roll over number is defined in the pager code plug to accommodate values set in the system infrastructure. When a message number is skipped the pager should alert the user. The message retrieval number displayed to the user should be 1 + N so that the user perceives messages numbered from 1 to N+1. When a normal un-numbered numeric message is received it is not to be included in the missed message calculation.

R- Spare Bit Not used - Set to 1 to be consistent with the message retrieval flag in the Alpha and HEX/Binary message modes. The use of the numbered numeric vector is the indication that the system supports numbered numeric and the retrieval of missed messages.

S- Special Format - In the numbered message format this bit set to 1 indicates that a special display format should be used.

Message Fill Rules - For numeric messages of 36 characters or less (38 characters if numbered) fewer than 8 code word on the channel are required. Only code words containing the numeric message are to be transmitted. The SPACE character (hex C) should be used to fill any unused 4-bit characters in the last word and zeros to fill any remaining partial characters. The check sum is correspondingly shortened to include only the code words comprising the shortened message along with the space characters used to fill in the last word.

Special Format Numeric - spaces and dashes as specified by the code plug are inserted into the received message. This feature in certain markets saves the transmission of an additional word on the channel. As an example in the U.S market a 10 character (area code plus telephone number) fits into two message words, if the dashes or parentheses were to be included in the message a 3rd message word on the channel would be required. The actual placement is code plug definable and can vary between markets.

3.8.8.2. HEX / Binary Message

Vector type V=110  First Only Fragment

| 1 2 3 4 5 6 7 . . . . . . . . . . . . . . . . . .21 | . . . . . . . . . . 31 | 32 |
|---|---|---|
| Information | Parity | Ck |
| 1st Word | | |
| $K_0\ K_1\ K_2\ K_3\ K_4\ K_5\ K_6\ K_7\ K_8\ K_9\ K_{10}K_{11}\ C_0\ F_0F_1\ N_0\ N_1\ N_2\ N_3\ N_4\ N_5$ | p p p p p p p p p | P |
| 2nd Word | | |
| $R_0\ M_0\ T_0\ T_1\ B_0\ B_1\ B_2\ B_3\ s_0\ s_1\ e_2\ s_3\ s_4\ S_0\ S_1\ S_2\ S_3\ S_4\ S_5\ S_6\ S_7$ | p p p p p p p p p | P |
| 3rd Word | | |
| $a_0\ a_1\ a_2\ a_3\ b_0\ b_1\ b_2\ b_3\ c_0\ c_1\ c_2\ c_3\ d_0\ d_1\ d_2\ d_3\ e_0\ e_1\ e_2\ e_3\ f_0$ | p p p p p p p p p | P |
| 4th Word | | |
| $f_1\ f_2\ f_3\ g_0\ g_1\ g_2\ g_3\ h_0\ h_1\ h_2\ h_3\ i_0\ i_1\ i_2\ i_3\ j_0\ j_1\ j_2\ j_3\ k_0\ k_1$ | p p p p p p p p p | P |
| 5th Word | | |
| $k_2\ k_3\ l_0\ l_1\ l_2\ l_3\ m_0\ m_1\ m_2\ m_3\ n_0\ n_1\ n_2\ n_3\ o_0\ o_1\ o_2\ o_3\ q_0\ q_1\ q_2$ | p p p p p p p p p | P |
| 6th Word | | |
| $q_3\ r_0\ r_1\ r_2\ r_3\ s_0\ s_1\ s_2\ s_3\ t_0\ t_1\ t_2\ t_3\ u_0\ u_1\ u_2\ u_3\ v_0\ v_1\ v_2\ v_3$ | p p p p p p p p p | P |
| . . . | | |
| nth Word | | |
| i i i i i i i i i i i i i i i i i i i i i | p p p p p p p p p | P |

Vector type V=110  All Other Fragments

| 1 2 3 4 5 6 7 . . . . . . . . . . . . . . . . . .21 | . . . . . . . . . . 31 | 32 |
|---|---|---|
| Information | Parity | Ck |
| 1st Word | | |
| $K_0\ K_1\ K_2\ K_3\ K_4\ K_5\ K_6\ K_7\ K_8\ K_9\ K_{10}K_{11}\ C_0\ F_0F_1\ N_0\ N_1\ N_2\ N_3\ N_4\ N_5$ | p p p p p p p p p | P |
| 2nd Word | | |
| $a_0\ a_1\ a_2\ a_3\ b_0\ b_1\ b_2\ b_3\ c_0\ c_1\ c_2\ c_3\ d_0\ d_1\ d_2\ d_3\ e_0\ e_1\ e_2\ e_3\ f_0$ | p p p p p p p p p | P |
| 3rd Word | | |
| $f_1\ f_2\ f_3\ g_0\ g_1\ g_2\ g_3\ h_0\ h_1\ h_2\ h_3\ i_0\ i_1\ i_2\ i_3\ j_0\ j_1\ j_2\ j_3\ k_0\ k_1$ | p p p p p p p p p | P |
| 4th Word | | |
| $k_2\ k_3\ l_0\ l_1\ l_2\ l_3\ m_0\ m_1\ m_2\ m_3\ n_0\ n_1\ n_2\ n_3\ o_0\ o_1\ o_2\ o_3\ q_0\ q_1\ q_2$ | p p p p p p p p p | P |
| 5th Word | | |
| $q_3\ r_0\ r_1\ r_2\ r_3\ s_0\ s_1\ s_2\ s_3\ t_0\ t_1\ t_2\ t_3\ u_0\ u_1\ u_2\ u_3\ v_0\ v_1\ v_2\ v_3$ | p p p p p p p p p | P |
| . . . | | |
| nth Word | | |
| i i i i i i i i i i i i i i i i i i i i i | p p p p p p p p p | P |

K - 12 bit Fragment Check Character. This check character is calculated by initializing the fragment check character (K) to zero and summing the information bits of each code word in the message fragment (including control information and termination characters and bits in the last message word ) to a check sum register. The information bits of each word are broken into three groups: the first is the 8 bits comprising bits 1 through 8, the second group comprises bits 9 through 16 and the third group comprises bits 17 through 21. Bits 1, 9 and 17 are the LSB's of each group. The binary sum is calculated, the 1's complement of the sum is determined and the 12 LSB's of the result is transmitted as the message check character.

C - 1 bit Message Continued Flag. When set to 1 indicates fragments of this message are to be expected in any or possibly all of the following frames until a fragment with c = 0 is found.

F - 2 bit Message Fragment Number. This is a modulo 3 message fragment number which is incremented by 1 in successive message fragments. The initial fragments starts at 11 and each following fragment is incremented by 1 modulo 3. (11, 00, 01, 10, 00, 01, 10, 00 etc.). The 11 state (after the start fragment) is skipped in this process to avoid confusion with an initial fragment of a non-continued message. The final fragment is indicated by the Message Continued Flag being reset to 0.

N - Message number. The system controller assigns numbers 0-63 in consecutive order allowing fragments of the same message to be identified. For retrieval and display purposes, the pager translates this range to 1 - 64 and allows the range to be modified to 1 - N where N is stored in the code plug and defines the roll over number. If the system does not have the capability to maintain number counts by address then a number must be chosen which is unique i.e. different from any other messages which may be in progress using the same address.

R - Message Retrieval Flag - When this bit is set to 1 the pager should expect to see messages numbered in order. (track each address separately). Detection of a missing number indicates a missed message. A message received with R=0 is allowed to be out of order and will not cause the pager to indicate that a message has been missed.

M - 1 bit Mail drop Flag. When set to1 indicates the message is to be stored in a special area in memory. It automatically writes over existing data in that memory space.

T - Message Type Field - $T_1T_0$ - 00 -Display left to right, 01 Display right to left, 10 - transparent data, 11 - transparent data with text header. (default value = 00)

B - Blocking Length - Indicates bits per character or unit of data. $B_3B_2B_1B_0$ - 0001 binary 1bit per symbol, 1111 -15 bits per symbol, 0000 - 16 bits per symbol. (default value = 0001)

s - 5 bit Field Reserved for future use. Default value = 00000

S - 8 bit Signature Field. The signature is defined to be the 1's complement of the binary sum over the total message (all fragments) taken 8 bits at a time starting with the first 8 bits directly following the signature field. ( $b_3b_2b_1b_0a_3a_2a_1a_0 + d_3d_2d_1d_0c_3c_2c_1c_0$ etc. )the 8 least significant bits of the result is transmitted as the message signature. (Note: This sum includes the termination bits in the very last message word even though they might not be considered part of the message.)

Fields R through S are only transmitted in the first fragment of a message. The fields K through N make up the first word of every fragment in a long message.

Message Content - Starting with the 2nd word in the message, each 4 bit field represents 1 of any of the 16 possible combinations with no restrictions (data can be binary).

Message Termination - Unused bits in a message word are filled with all 0's or all 1's depending on the last valid data bit. Choice is the opposite polarity of the last valid data bit with at least 1 bit required to denote end of message.

3.8.8.3. Alphanumeric Message

Vector type V=101   First Only Fragment

```
         1 2 3 4 5 6 7 . . . . . . . . . . . . . . . . .21 . . . . . . . . . 31  32
                          Information                      Parity               Ck
1st Word
         K₀ K₁ K₂ K₃ K₄ K₅ K₆ K₇ K₈ K₉ C₀ F₀ F₁ N₀ N₁ N₂ N₃ N₄ N₅ R₀ M₀  p p p p p p p p p p   P
2nd Word
         S₀ S₁ S₂ S₃ S₄ S₅ S₆ a₀ a₁ a₂ a₃ a₄ a₅ a₆ b₀ b₁ b₂ b₃ b₄ b₅ b₆  p p p p p p p p p p   P
3rd Word
         c₀ c₁ c₂ c₃ c₄ c₅ c₆ d₀ d₁ d₂ d₃ d₄ d₅ d₆ e₀ e₁ e₂ e₃ e₄ e₅ e₆  p p p p p p p p p p   P
4th Word
         f₀ f₁ f₂ f₃ f₄ f₅ f₆ g₀ g₁ g₂ g₃ g₄ g₅ g₆ h₀ h₁ h₂ h₃ h₄ h₅ h₆  p p p p p p p p p p   P
5th Word
         i₀ i₁ i₂ i₃ i₄ i₅ i₆ j₀ j₁ j₂ j₃ j₄ j₅ j₆ k₀ k₁ k₂ k₃ k₄ k₅ k₆  p p p p p p p p p p   P
                                   .
                                   .
                                   .
nth Word
         i i i i i i i i i i i i i i i i i i i i i                        p p p p p p p p p p   P
```

Vector type V=101   Other Fragment

```
         1 2 3 4 5 6 7 . . . . . . . . . . . . . . . . .21 . . . . . . . . . 31  32
                          Information                      Parity               Ck
1st Word
         K₀ K₁ K₂ K₃ K₄ K₅ K₆ K₇ K₈ K₉ C₀ F₀ F₁ N₀ N₁ N₂ N₃ N₄ N₅ R₀ M₀  p p p p p p p p p p   P
2nd Word
         a₀ a₁ a₂ a₃ a₄ a₅ a₆ b₀ b₁ b₂ b₃ b₄ b₅ b₆ c₀ c₁ c₂ c₃ c₄ c₅ c₆  p p p p p p p p p p   P
3rd Word
         d₀ d₁ d₂ d₃ d₄ d₅ d₆ e₀ e₁ e₂ e₃ e₄ e₅ e₆ f₀ f₁ f₂ f₃ f₄ f₅ f₆  p p p p p p p p p p   P
4th Word
         g₀ g₁ g₂ g₃ g₄ g₅ g₆ h₀ h₁ h₂ h₃ h₄ h₅ h₆ i₀ i₁ i₂ i₃ i₄ i₅ i₆  p p p p p p p p p p   P
5th Word
         j₀ j₁ j₂ j₃ j₄ j₅ j₆ k₀ k₁ k₂ k₃ k₄ k₅ k₆ l₀ l₁ l₂ l₃ l₄ l₅ l₆  p p p p p p p p p p   P
                                   .
                                   .
                                   .
nth Word
         i i i i i i i i i i i i i i i i i i i i i                        p p p p p p p p p p   P
```
Data sent LSB 1st K - 10 bit Fragment Check Character. This check character is calculated by initializing the fragment check character (K) to zero and summing the information bits of each code word in the message fragment (including control information and termination characters and bits in the last message word) to a check sum register. The information bits of each word are broken into three groups: the first is the 8 bits comprising bits 1 through 8, the second group comprises bits 9 through 16 and the third group comprises bits 17 through 21. Bits 1, 9 and 17 are the LSB's of each group. The binary sum is calculated, the 1's complement of the sum is determined and the 10 LSB's of the result is transmitted as the message check character.

C - 1 bit Message Continued Flag. When set (=1) indicates fragments of this message are to be expected in following frames.

F - 2 bit Message Fragment Number. This is a modulo 4 message fragment number which is incremented by 1 in successive message fragments. Initial fragments start at 11 and increment 1 for each successive fragment. The 11 state (after the start fragment) is skipped in this process to avoid confusion with an initial fragment of a non-continued message. The final fragment is indicated by Message Continued Flag being reset (=0).

N - Message number. The system controller assigns numbers 0-63 in consecutive order allowing fragments of the same message to be identified. For retrieval and display purposes, the pager translates this range to 1 - 64 and allows the range to be modified to 1 - N where N is stored in the code plug and defines the roll over number. If the system does not have the capability to maintain number counts by address then a number must be chosen which is unique i.e. different from any other messages which may be in progress using the same address.

R- Message Retrieval Flag - When this bit is set to 1 the pager should expect to see messages numbered in order. (track each address separately). Detection of a missing number indicates a missed message.

M - 1 bit Mail drop Flag. When set (=1) indicates the message is to be stored in a special area in memory. It automatically writes over existing data in that memory space.

S - 7 bit Signature Field. The signature is defined to be the 1's complement of the binary sum over the total message (all fragments) taken 7 bits at a time (on alpha character boundary) starting with the first 7 bits directly following the signature field. ( $b_6 b_5 b_4 b_3 b_2 b_1 b_0 + c_6 c_5 c_4 c_3 c_2 c_1 c_0$ etc.) the 7 least significant bits of the result is transmitted as the message signature.

Message Content - Starting with the 2nd word in the message, each 7 bit field represents Standard ASCII (ISO 646-1983E) characters with options for certain International characters.

Message Termination - The ASCII character ETX ($03) should be used to fill any unused 7-bit characters in a word.

3.8.8.4. Secure Message

Vector type V=000   All Fragment

| 1 2 3 4 5 6 7 . . . . . . . . . . . . . . . . . .21 | . . . . . . . 31 | 32 |
|---|---|---|
| Information | Parity | Ck |
| 1st Word | | |
| $K_0$ $K_1$ $K_2$ $K_3$ $K_4$ $K_5$ $K_6$ $K_7$ $K_8$ $K_9$ $C_0$ $F_0$ $F_1$ $N_0$ $N_1$ $N_2$ $N_3$ $N_4$ $N_5$ $R_0$ $M_0$ | p p p p p p p p p p | P |
| 2nd Word | | |
| $a_0$ $a_1$ $a_2$ $a_3$ $a_4$ $a_5$ $a_6$ $b_0$ $b_1$ $b_2$ $b_3$ $b_4$ $b_5$ $b_6$ $c_0$ $c_1$ $c_2$ $c_3$ $c_4$ $c_5$ $c_6$ | p p p p p p p p p p | P |
| 3rd Word | | |
| $d_0$ $d_1$ $d_2$ $d_3$ $d_4$ $d_5$ $d_6$ $e_0$ $e_1$ $e_2$ $e_3$ $e_4$ $e_5$ $e_6$ $f_0$ $f_1$ $f_2$ $f_3$ $f_4$ $f_5$ $f_6$ | p p p p p p p p p p | P |
| 4th Word | | |
| $g_0$ $g_1$ $g_2$ $g_3$ $g_4$ $g_5$ $g_6$ $h_0$ $h_1$ $h_2$ $h_3$ $h_4$ $h_5$ $h_6$ $i_0$ $i_1$ $i_2$ $i_3$ $i_4$ $i_5$ $i_6$ | p p p p p p p p p p | P |
| 5th Word | | |
| $j_0$ $j_1$ $j_2$ $j_3$ $j_4$ $j_5$ $j_6$ $k_0$ $k_1$ $k_2$ $k_3$ $k_4$ $k_5$ $k_6$ $l_0$ $l_1$ $l_2$ $l_3$ $l_4$ $l_5$ $l_6$ | p p p p p p p p p p | P |
| . . . | | |
| nth Word | | |
| i i i i i i i i i i i i i i i i i i i i i | p p p p p p p p p p | P |

Data sent LSB 1st

K - 10 bit Fragment Check Character. This check character is calculated by initializing the fragment check character (K) to zero and summing the information bits of each code word in the message fragment (including control information and termination characters and bits in the last message word ) to a check sum register. The information bits of each word are broken into three groups: the first is the 8 bits comprising bits 1 through 8, the second group comprises bits 9 through 16 and the third group comprises bits 17 through 21. Bits 1, 9 and 17 are the LSB's of each group. The binary sum is calculated, the 1's complement of the sum is determined and the 10 LSB's of the result is transmitted as the message check character.

C - 1 bit Message Continued Flag. When set (=1) indicates fragments of this message are to be expected in following frames.

F - 2 bit Message Fragment Number. This is a modulo 4 message fragment number which is incremented by 1 in successive message fragments. Initial fragments start at 11 and increment 1 for each successive fragment. The 11 state (after the start fragment) is skipped in this process to avoid confusion with an initial fragment of a non-continued message. The final fragment is indicated by Message Continued Flag being reset (=0).

N - Message number. The system controller assigns numbers 0-63 in consecutive order allowing fragments of the same message to be identified. For retrieval and display purposes, the pager translates this range to 1 - 64 and allows the range to be modified to 1 - N where N is stored in the code plug and defines the roll over number. If the system does not have the capability to maintain number counts by address then a number must be chosen which is unique i.e. different from any other messages which may be in progress using the same address.

R, M - Not used and set to 0.

Message Content - Starting with the 2nd word in the message, each 7 bit field represents Standard ASCII (ISO 646-1983E) characters with options for certain International characters.

Message Termination - The ASCII character ETX ($03) should be used to fill any unused 7-bit characters in a word.

3.8.8.5. Full Bandwidth Message Protocol

It may be desired to deliver messages over the channel at the full 6400 bps rate. An extension of the FLEX protocol will be defined providing the assembly of messages at the full 6400 bps rate (as opposed to the single phase rate of 1600 bps). It is expected that this capability would be used for special applications only since it does not have an effect on channel capacity just the latency in receiving long data files.

4. FLEX ENCODING AND DECODING REQUIREMENTS

4.1. PURPOSE

The purpose of this section is to specify the encoding requirements for implementing FLEX in a paging terminal or other encoding device, and to provide decoding requirements for implementing FLEX in a pager. The intent is to ensure that FLEX related features and services are implemented in a consistent manner among various manufacturers. The description in this appendix combined with the aforementioned description, incorporated references and subject matter know to those familiar with the art should provide a description enabling one of ordinary skill in the art to make use the desired FLEX based encoders, decoders and supporting equipment.

4.2. SCOPE

The encoding and decoding specifications in this document identify the minimum requirements which must be met by the pager, paging terminal or other encoding equipment to properly format a FLEX data stream for RF transmission and to successfully decode it.

4.3. FLEX ENCODING RULES

4.3.1. General FLEX Encoder Rules 4.3.1.1. The stability of the encoder system clock used to determine time positions of FLEX frames must be no worse than ±25 ppm (includes worst case temperature and aging).

4.3.1.2. Once a FLEX transmission has been initiated to FLEX pagers, the FLEX encoding device must continuously maintain frame synchronization timing.

4.3.1.3. Should the encoder loose FLEX frame synchronization timing, the Emergency Re-synchronization pattern must be sent before any new pages can be transmitted. This pattern must be sent continuously for a duration that exceeds the longest pager battery save cycle used in the system. The Emergency Re-synchronization pattern is defined in the FLEX Protocol Specification Document.

4.3.2. Frame Management Rules 4.3.2.1. Frames may be truncated early on block boundaries if the frame is not filled.

4.3.2.2. A minimum frame must include the block information word found in the first block.

4.3.2.3. Frames may be skipped to provide access to another protocol when supporting mixed signaling on the channel.

4.3.2.4. A maximum collapse value must be assigned to each individual and radio group address. This value defines the maximum interval between frame searches, regardless of the system collapse value.

4.3.2.5. The maximum collapse value information of 4.3.2.4 must be stored in the encoding device and the pager for each individual and radio group address.

4.3.2.6. The system collapse value must be the same for all phases of a multi-phase frame.

4.3.2.7. The 4 Low Traffic Flags in the Frame Information word must be cleared (set to 0) in every frame following a change of the System Frame ID Collapse Mask in Block Information word 1. This condition must persist for a duration that exceeds the longest pager battery save cycle used in the system.

4.3.2.8. The 4 Low Traffic Flags in the Frame Information word must be cleared (set to 0) in any frame where the Carry On feature is used (i.e. the two Carry On bits are non-zero).

4.3.3. Pager Synchronization Acquisition Rules 4.3.3.1. Minimum channel activity required to support FLEX is at least 1 full frame per minute (32 frames) or in the case of shared channel operation at least 1 full frame per 4 minutes (128 frames). The FLEX encoder and the FLEX pager must support both conditions. A full frame is defined to be 1.875 seconds long, with idle code filling any unused portion of the frame. Once a full frame is sent within the specified time period, additional frames may be truncated.

4.3.3.2. It is recommended that idle time on the channel be filled. When possible, idle time on the channel should be filled with FLEX idle frames. In the case of a mixed channel, a channel fill pattern (1600 BPS 2 level FSK 1,0,1,0... pattern) can be sent when an idle frame is inappropriate. For example, a channel fill pattern should be started at the end of the POCSAG transmission and continued until the FLEX frame begins.

4.3.5.6. For the duration of time that an individual or radio group address is being used to send a fragmented message, that same address must not appear more than once in any frame to send an unfragmented message.

4.3.5.7. Once a specific dynamic group address (temporary address) is assigned to a group, it must not be reused until its associated message has been delivered in its entirety. Given this constraint, the same dynamic group address can only appear once in any frame.

4.3.6. Message Formatting Rules 4.3.6.1. Messages formatted using any of the three defined Numeric Vectors (011, 100, 111) cannot be fragmented, and thus must be completely contained in a single frame.

4.3.6.2. Fragments of the same message must be sent at a frequency of at least 1 every 32 frames (at least once a minute) or in the case of shared channel 1 every 128 frames. Encoder and Pager must support both conditions.

4.3.7. Message Retrieval Numbering Rules 4.3.7.1. Message numbering is an optional feature available on an individual subscriber basis.

4.3.7.2. Message numbers must be assigned sequentially.

4.3.7.3. Message number sequences must be separately maintained for each individual and radio group address.

4.3.7.4. Message numbers are not used (retrieval message number disabled) in conjunction with a dynamic group address.

4.3.7.5. Identical message numbers cannot be used with two different messages in process at the same time to the same individual address. For example, given a maximum of 64 unique message numbers, once a long message is started, no more than 63 short messages can be sent to the same individual address used for the long message for as long as the long message is in the process of being sent. Refer to the FLEX Protocol Specification Document for more information on the use of message numbers.

4.3.7.6. When a missed page is re-transmitted from message retrieval storage, the message must not be numbered (retrieval message number feature must be disabled).

4.4. FLEX DECODING RULES

4.4.1. General FLEX Decoding Rules 4.4.1.1. Pager products can implement either Single Phase addressing, Any Phase addressing or both.

4.4.1.2. Tone only pager products must support the first mode (000) of the Short Instruction Vector (001) and the second mode (01) of the Short Message Vector (010). Support for all other vector types is optional.

4.4.1.3. Numeric pager products must support the first mode (000) of the Short Instruction Vector (001), the first two modes (00, 01) of the Short Message Vector (010) and the Standard Numeric Vector (011). Support for all other vector types is optional.

4.4.1.4. Alphanumeric pager products must support the first mode (000) of the Short Instruction Vector (001), the first two modes (00, 01) of the Short Message Vector (010), the Standard Numeric Vector (011), and the Alphanumeric Vector (101). Support for all other vector types is optional.

4.4.1.5. Pager products must be capable of decoding frames at all of the following combinations of data rate and modulation mode. They are: 1600 bps, 2 level; 3200 bps, 2 level; 3200 bps, 4 level; 6400 bps, 4 level.

5.1. ACRONYMS AND ABBREVIATIONS

| | |
|---|---|
| BER | Bit Error Rate |
| BPS | Bits Per Second |
| BSR | Battery Save Ratio |
| FCC | Federal Communications Commission |
| FM | Frequency Modulation |
| FSK | Frequency Shift Keying |
| GSC | Golay Sequential Code |
| ISO | International Organization for Standardization |
| MBE | Message Bit Efficiency |
| POCSAG | Post Office Code Standardization Advisory Group |
| RCC | Radio Common Carrier |
| RF | Radio Frequency |
| TDM | Time Division Multiplexing |
| FLEX | Motorola's High Speed Paging Protocol |

5.2. GLOSSARY OF TERMS

*Address Classification* – Refers to the scope of phase assignment for an address. The three available address classifications are Single Phase, Any Phase and All Phase.

*Address Code Word* – An address code word is a code word whose information portion contains a numeric value assigned as a specific address type.

*Address Falsing* – Address falsing occurs when an address code word is incorrectly detected as valid.

*Address Latency Time* – The time delay incurred from the instant the entire page is available to the encoding device to the instant in time the FIRST bit of the page goes out on the channel. Address latency time is independent of message length.

*Address Mode* – Refers to the scope of the address type. Serves as an indicator of whether the message associated with the address type is directed to a single recipient or multiple recipients. The three address modes are Individual, Radio Group and Dynamic Group.

*Address Type* – A group of address code words which identifies the major paging service categories. The four address types are Short, Long, Information Services and Network Identification.

*All Phase Address Classification* – An address that can be assigned to multiple phases within its frame for the purpose of spreading a single message across more than one phase resulting in the possible reception of messages at the full 6400 bps rate. (precise definition reserved for the future)

*Any Phase Address Classification* – An address that can be arbitrarily assigned to any phase at the time of transmission. Message reception is limited to a single phase per frame at 1600 bps.

*Battery Save Ratio* – The battery save ratio (BSR) is a measure of the protocol's ability to minimize the number of bits that must be examined in order to detect an address match. The BSR can be expressed in the following terms:

$$BSR = \frac{\text{total number of bits sent per unit of time}}{\text{total number of bits examined per unit time}}$$

The effective "total number of bits examined per unit time" attributed to a pager would also include the bits occurring while the receiver is on but in the process of warming up while the BSR attributed to the code would assume zero receiver warm time.

*Channel Fill Pattern* – Interleaved all 1's or all 0's code words resulting in a 1600 bps 1,0,1,0... pattern on the RF channel.

*Code Word* – A FLEX code word is defined as being a member of the set of BCH (32,21) code words with a 32nd even parity added to provide a minimum distance of 6.

*Dynamic Group Address Mode* – The dynamic group address mode enables an unlimited number of recipients to receive the same message. Using a Short or Long individual address, each group member is sent an instruction to meet in a future frame to receive a message and to use a preassigned temporary address shared by all group members. Although this mode (sometimes referred to as Terminal Group Call) is usually less efficient in the use of air time than the Radio Group Address mode, it easily allows members of the group to change.

*Fading Sensitivity* – Fading sensitivity is defined as the probability of decoding a page without uncorrectable errors in the presence of Raleigh fading at a specific fade rate.

*False Dial Rate* – The false dial rate is the rate at which a telephone number is dialed incorrectly, the false dial rate is in the range of 1% to 3%. Some paging systems employ error detection by adding an extra check digit to the dialed number. This is a large source of false page reception.

*Falsing* – Erroneously identifying data on the communications channel as the anticipated bit sequence. The data could be address, synchronization, message etc.

*Fragmented Message* – A message is considered fragmented when the address and associated message are not completely contained in a single frame. All dynamic group messages using temporary addresses are considered to be fragmented regardless of message length. Messages sent using individual or radio group addresses that span more than one frame are fragmented messages. The fragmentation process is considered to start with the first fragment (or first short instruction vector) and ends when the last fragment is received.

Frame – A FLEX frame consists of synchronization information and 11 interleaved blocks of information. A pager's frame is the one its assigned to as well as any frame it examines as defined by its collapse value and the system collapse mask.

Idle Frame – An idle FLEX frame is a minimum FLEX frame completely filled with 11 idle blocks, with the first block containing a valid Block Information Word.

Individual Address Mode – The individual address mode enables an individual subscriber to be the only recipient of a message by sending a unique Short or Long address followed by the message.

Local Channel Identification – The FLEX protocol includes space for one local channel ID number that uniquely identifies the specific paging system from which the transmission originated. There are more than 16,000 numbers available for use as local channel IDs.

Mail Drop Message Mode – A user selectable message mode whereby messages of a particular nature are always deposited in the same message slot thus overwriting the previous slot contents.

Minimum Frame – A minimum FLEX frame contains Synchronization information and the first block with a valid Block Information Word.

Page – The information on the channel directed to the recipient, includes address and message information.

Private Message Mode – The default message mode of messages received by the paging device. Private messages do not go to a preassigned spot, instead they are deposited in the next available message slot.

Radio Group Address Mode – The radio group address mode enables an unlimited number of recipients to receive the same message by sending one Short or Long address common to all group members, followed by the message. This method is very efficient in the use of air time but requires a pre-arrangement of the groups and thus is more difficult to change. Many times there is a battery life impact when the individual address and the group address are in different frames.

RF Channel – The medium over which FLEX is broadcast.

Single Phase Address Classification – An address that is specifically assigned in advance to one of four phases. This address would only appear in its assigned phase.

Simulcast – Providing wide area radio coverage by simultaneously sending synchronized data from multiple transmitters having overlapping coverage areas.

Source – Additional information associated with tone alert pages that can be used to identify the calling party.

*Symbol* – A symbol is a signal element used during the modulation, transmission and demodulation of the protocol. A symbol may represent one or more bits of data.

*Unfragmented Message* – A message that is started and completed in a single frame. By definition, all messages using the Numeric Vector are unfragmented messages as they must be sent within one frame.

5.3. NUMERIC CHARACTER SET

The following table defines the characters to be displayed in the FLEX Numeric message mode.

| Character | $B_3$ | $B_2$ | $B_1$ | $B_0$ |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| Spare | 1 | 0 | 1 | 0 |
| U | 1 | 0 | 1 | 1 |
| Space | 1 | 1 | 0 | 0 |
| - | 1 | 1 | 0 | 1 |
| ] | 1 | 1 | 1 | 0 |
| [ | 1 | 1 | 1 | 1 |

5.4. ALPHANUMERIC CHARACTER SET

The following table represents the characters to be displayed in the FLEX alphanumeric message mode. Control characters that are not acted upon by the pager are ignored in the display process (do not require display space) but are stored in memory for possible down load to an external device.

Characters Used in Alphanumeric Messages   -   ISO 646-1983E

| $B_4$ | $B_3$ | $B_2$ | $B_1$ | $B_7$<br>$B_6$<br>$B_5$<br>HEX | 0<br>0<br>0<br>0 | 0<br>0<br>1<br>1 | 0<br>1<br>0<br>2 | 0<br>1<br>1<br>3 | 1<br>0<br>0<br>4 | 1<br>0<br>1<br>5 | 1<br>1<br>0<br>6 | 1<br>1<br>1<br>7 |
|---|---|---|---|---|---|---|---|---|---|---|---|---|
| 0 | 0 | 0 | 0 | 0 | NUL | DLE | SP | 0 | @ | P | ` | p |
| 0 | 0 | 0 | 1 | 1 | SOH | DC1 | ! | 1 | A | Q | a | q |
| 0 | 0 | 1 | 0 | 2 | STX | DC2 | " | 2 | B | R | b | r |
| 0 | 0 | 1 | 1 | 3 | ETX | DC3 | # | 3 | C | S | c | s |
| 0 | 1 | 0 | 0 | 4 | EOT | DC4 | $ | 4 | D | T | d | t |
| 0 | 1 | 0 | 1 | 5 | ENQ | NAK | % | 5 | E | U | e | u |
| 0 | 1 | 1 | 0 | 6 | ACK | SYN | & | 6 | F | V | f | v |
| 0 | 1 | 1 | 1 | 7 | BEL | ETB | ' | 7 | G | W | g | w |
| 1 | 0 | 0 | 0 | 8 | BS | CAN | ( | 8 | H | X | h | x |
| 1 | 0 | 0 | 1 | 9 | TAB | EM | ) | 9 | I | Y | i | y |
| 1 | 0 | 1 | 0 | A | LF | SUB | * | : | J | Z | j | z |
| 1 | 0 | 1 | 1 | B | VT | ESC | + | ; | K | [ | k | { |
| 1 | 1 | 0 | 0 | C | FF | FS | , | < | L | \ | l | | |
| 1 | 1 | 0 | 1 | D | CR | GS | - | = | M | ] | m | } |
| 1 | 1 | 1 | 0 | E | SO | RS | . | > | N | ^ | n | ~ |
| 1 | 1 | 1 | 1 | F | SI | US | / | ? | O | _ | o | DEL |

FLEX products are expected to provide options to remap certain characters in the above table to special characters required in each international market. Specifically ASCII HEX characters 23, 24, 40, 5B, 5C, 5D, 5E, 5F, 60, 7B, 7C, 7D, 7E, and 7F are candidates for remap.

5.5. TRAFFIC LEVELING USING "CARRY ON" FIELD

When incoming traffic levels are on the average less than the channel capacity and the distribution among frames is not uniform resulting in an over flow condition in a particular frame, the "Carry On" field (in the block information word) may be used to instruct each member (pager with address assigned to this frame - not "carried on" into frame) of the overloaded frame to also decode the following 1, 2 or 3 frames. Since pagers are being instructed to decode frames which would normally be ignored, degraded battery life might be expected. This effect is expected to be small however because occurrence of this problem is expected only in a small portion of the busy hour which is in itself a small portion of the day.

The terminal could take traffic from the overloaded frame and fill in excess capacity in the following 1, 2, or 3 frames or it could (preferred approach) give priority to the "carry on" traffic and displace the traffic in the following frame. When traffic is displaced, the following frames may become over loaded and require a "carry on" condition. This will continue until a frame is encountered with sufficient excess capacity to satisfy the "carry on" condition.

5.6. LONG MESSAGE FRAGMENTATION

The longest message which will fit into a frame is 88 code words less one block info word, an address word, a vector word, and the 1 overhead word in the message or 84 code words total. Three alpha characters per word yields a max. 252 characters message in a frame assuming no other traffic. Messages longer than this value must be sent as several fragments. Furthermore in systems with a mixture of traffic types it is recommended that short messages be given priority over the longer alphanumeric and data traffic thus message fragmentation is used as a tool to redistributed traffic to frames that are lightly loaded.

The pager is instructed to expect additional fragments when the "continue bit" in the message header is set. This causes the pager to examine every following frame for additional fragments until the last fragment with the continue bit reset is found. The only requirement relating to the placement in time of the remaining fragments is that no more than 32 frames (1 minute) may pass between segment receptions. On reception of the last fragment, the pager returns to the battery saving mode in which only assigned frames are decoded.

Each fragment contains a check sum character to detect errors in the fragment, a fragment number 0, 1 or 2 to detect missing fragments, a message number to identify which message the fragment is a part, and the continue bit which either indicates that more fragments are in queue or the that the last fragment has been received.

5.7. GROUP MESSAGING TECHNIQUES

The FLEX protocol offers several methods of forming groups of pagers for the purpose of receiving common messages. Each method offers a different trade between pager battery life, the amount of traffic incurred on the channel to complete the group call and the complexities of setting up the group.

At the extremes, the system could repeat the message to each pager in the group (sometimes referred to as terminal group call) or each member of the group may have known from the start that they needed common group addresses resulting in only one message transmitted but each pager now most likely is monitoring two frames with a resulting reduction in battery life.

FLEX offers several intermediary possibilities. The first is the temporary address which can be assigned over the air to each of the pagers in the intended group. The instruction to do this is very short (only 2 code words on the channel) thus if the message is long, adding an additional recipient costs only 2 additional code words on the channel. The temporary address is assigned to be active in a specified frame in the future. In the case of "single phase" pagers this also implies the same phase.

A variation of the above approach is to assign a common group address to each member of the group but assign the address to the same frame and phase as the pager's primary address. Now there is no battery life degradation due to the monitoring of additional frames. When a group message is to be transmitted the terminal first sends a short 2 code word instruction using the common address in each frame and phase for which a member is assigned. This instruction activates the common address in a frame in the future.

5.8. CHANNEL SHARING USING "COLLAPSE FUNCTION"

Ideally the FLEX pager is designed to monitor time slots (frames) separated in time by an exact value representative of the users desires in the trade off between message delivery latency and battery life. Thus a small pen or watch pager user might choose time slots separated by as much as 4 minutes in time in order to achieve long battery life. The user of a belt pager might choose a time value which gives quicker delivery (say 15 seconds) between time slots since battery life might not be as important to him as is the timely response to a call. Basically each user can be provided the latency which fits his needs.

The above scenario is realizable if the channel is dedicated to the FLEX protocol or even if the channel carries other traffic but the FLEX protocol takes priority. When this is not the case there is no assurance that when the one opportunity to send a message to the small pager operating on a 4 minute cycle occurs that the channel will be available. The collapse concept was designed to solve this problem during the initial implementation of FLEX on an existing channel.

There are two types of collapse defined in the FLEX protocol. The first is dictated by the user and is programmed into the code plug ("pager collapse" value). This value is the desired time slot spacing. The second collapse value is the one dictated by the system ("system collapse") and transmitted in the block information word of every frame. This value initially will instruct the pagers desiring the long battery save cycle to look more often. When the system collapse value is equal to 0 all pagers will monitor every frame (many frames will be missing due to channel sharing with the existing protocol). When the system collapse field equals 1, each pager will monitor every other frame with the choice being the frames that match the LSB of their assigned frame. Likewise when the collapse value is 2, pagers will match the 2 LSBs of their assigned frame and thus monitor every 4th frame on the channel. When FLEX dominates the channel the collapse value will be increased to 7 resulting in the monitoring of 1 of 128 frames if the pager code plug value is this large. In most cases the pager code plug value will dictate a smaller battery save cycle. (Smaller of the two collapse values dominates). Note: the collapse value referenced here is the exponent of 2 which results in the desired battery save cycle. i.e. 2^7 = 128 frame cycle.

5.9. MESSAGE NUMBERING AND MESSAGE RETRIEVAL

Message numbering is offered in the Numeric, HEX / Binary, Alphanumeric, Secure, and Instruction message formats. The use of this feature is product and system dependent. Possible uses are:
1) To provide the means for identifying fragments of the same message in the reconstruction process.
2) To allow detection of a missed message when a message number is skipped. The system provider may provide a retrieval service.
3) Possibly to assist the user in time ordering his messages through display of the number as part of the message.

The HEX / Binary, Alphanumeric, Secure, and Instruction message formats all have a signature field in the first message word (1st fragment only). This field is intended to help in the duplicate message detection process since the signature is algorithmically derived from the callers entered message.

In the case of the Numeric message, the numbered numeric vector type must be chosen. This choice indicates that the first two characters (8 bits) of the numeric message represent a 6 bit number (0-63) along with a 7th bit to indicate active message retrieval and an 8th bit to indicate that special formatting is desired for this message.

5.10. REAL TIME CLOCK MAINTENANCE

It is recommended that the FLEX frame timing be synchronized to an accurate real time source with frame 0000000 cycle 0000 synchronized to the start of each hour. This allows time to within the hour to be derived from the FLEX frame and cycle numbering system. Every hour (at cycle 0000, Frame 0000000 or the next available frame on a shared channel) the optional block information words are used to convey the hour, the date and if required a correction factor for systems not synchronized to the hour as recommended.

After a pager is initially synchronized and the clock and date set, a confirming recheck of the hour and date is required infrequently. Expect once per day or once every time the pager is turned one would be more than sufficient.

5.11. SIMULCAST CONTROL REQUIREMENTS

As in most simulcast systems, reception begins to degrade rapidly when two signals being received simultaneously have magnitude differences less than the capture ratio of the receiver and the time offset between the two signals approach 1/4 of the symbol duration. The FLEX goal is to time equalize the simulcast transmitters to within a few microseconds and reserve most of the allowable differential delay for path differences.

5.12. NATIONWIDE ROAMING / CHANNEL ACQUISITION

When scanning is implemented within the FLEX protocol the pager will scan and select its network frequency. Multiple networks can share the same frequency in an area

5.13. EMERGENCY SYSTEM RE-SYNCHRONIZATION

In the unlikely case of the system controller detecting a loss or an uncontrolled change in the system clock a system wide reset may be desirable. The timing source must be battery backed up to allow a synchronous restart after a power outage thus making the need for re-synchronizing very very infrequent. The pattern described in section 3.4 is transmitted long enough for all pagers to detect at least one "Ar" code word and start a continuous search for a valid FLEX frame. The pager should look for a least one minute after the last "Ar" pattern is detected.

Since it is also possible for the system timing to have jumped to a time position out of the pager's range but not be detected by the controller it may be advisable to have a battery operated monitor FLEX receiver tied to the controller signifying the detection of each FLEX sync pattern as it is transmitted.

5.14. TIME ZONE INFORMATION

Part of the local ID carried in the block information field (optional information now but in future may become required in nationwide roaming) is made up of a 5 bit time zone field. The total 14 bit field including the time zone identifies a unique system per time zone and rf frequency. Also in the future the time zone identify may be displayed along with the time as additional information to assist the traveler. The following table is used to convert the 5 bit field to specific time zones.

| Zone Field $Z_4Z_3Z_2Z_1Z_0$ | Relative Hours to Greenwich | Time Zone |
|---|---|---|
| 10000 | ----- | RESERVED |
| 10001 | +5Hrs 40 Min | Nepal |
| 10010 | +6.5 | Burma, Corcos Is. |
| 10011 | +9.5 | Central Australia |
| 10100 | -3.5 | Newfoundland |
| 10101 | -11 | Midway Is. |
| 10110 | -10 | Hawaii |
| 10111 | -9 | Alaska |
| 11000 | -8 | Pacific |
| 11001 | -7 | Mountain |
| 11010 | -6 | Central |
| 11011 | -5 | Eastern |
| 11100 | -4 | Atlantic |
| 11101 | -3 | Greenland |
| 11110 | -2 | S. Sandwich Is. |
| 11111 | -1 | Azares, Cape Verde |
| 00000 | 0 | Greenwich Meridian |
| 00001 | +1 | France, Germany, Italy |
| 00010 | +2 | Egypt, Greece |
| 00011 | +3 | Iraq, Saudi Arabia, Turkey |
| 00100 | +4 | Oman |
| 00101 | +5 | Pakistan |
| 00110 | +6 | B.I.O.T. |
| 00111 | +7 | Laos, Thailand, Cambodia |
| 01000 | +8 | China, Hong Kong, Taiwan |
| 01001 | +9 | Japan, Korea |
| 01010 | +10 | Northern Mariana Is., Tasmania |
| 01011 | +11 | New Caledonia |
| 01100 | +12 | New Zealand |
| 01101 | +3.5 | Iran |
| 01110 | +4.5 | Afganistan |
| 01111 | +5.5 | India, Sri Lanka |

5.15. FLEX CAPCODE

The FLEX CAPCODE is defined to represent either a "Short" or a "Long" address. The short address is defined in the protocol specification as one code word and is represented by a 7 decimal digit field. The long address is defined in the protocol specification to be two words on the rf channel and is represented by a 9 decimal digit field. An Alpha "CAPCODE type" character always precedes the 7 or 9 digit address field providing information as to the type of address and distinguishing FLEX CAPCODES from the CAPCODES of other paging protocols.

The letters "U through Z" indicate that additional information is required and act as a separator to the field containing a single digit "b" battery cycle field or a 4 digit "fffb" field combining the battery cycle digit with a 3 digit "f" frame number field. This form may be shortened as in 2) below when label space limits the number of characters printed (this form indicates that the code plug or system data base must be accessed in order to determine the assigned frame and battery cycle).

The alpha letters "A" through "L" indicate that a rule is defined on how to derive the frame and phase information from the address field and that the standard battery cycle of 4 (16 frame cycle) for FLEX is to be used, as shown in 4) below. The battery cycle "b" field must be included when it is not equal to 4 (the FLEX standard) as in 3) below. The eight possible forms of the FLEX CAPCODE are shown below:

|    | Short      | Long         |
|----|------------|--------------|
| 1) | fffbU1234567 | fffbU123456789 |
| 2) | U1234567   | U123456789   |
| 3) | bA1234567  | bA123456789  |
| 4) | A1234567   | A123456789   |

The "fff" field is a number from "000" to "127" indicating the base FLEX frame to which the address is assigned. The "b" field is a number from "0" to "7" indicating the battery cycle. In the forms using the letters "A" through "L", "b" is not displayed unless it is a value other than 4. (The FLEX standard battery cycle value is 4 where $2^4 = 16$ frames = 30 second between active frames.)

The convention of always using 7 digits to represent a Short address and 9 digits to represent a Long address was chosen to help differentiate between the two types of addresses. In terms of the range of decimal address numbers the field consists of the numbers 1 through 999,999,999 where Short addresses fall below 2,100,225 and Long addresses are above 2,100,224.

The convention in displaying a CAPCODE is always to use the shortest form possible thus even though the non-standard form could represent a standard assignment, the standard form is chosen to indicate the fact that it is a standard assignment. All forms except 2) above contain all the information required to send a message to a pager. Again the form 2) should be avoided when possible since it requires retrieval of the missing information from the pager code plug or from the system data base.

The following address range table defines the address usage assignment:

| CAPCODE Address | Value | Description |
|---|---|---|
|  | 000,000,000 | Not Used - Illegal |
| 000,000,001 | 002,009,087 | Short Addresses |
| 002,009,088 | 002,025,471 | Reserved for Information Services |
| 002,025,472 | 002,029,567 | Reserved for Network ID's |
| 002,029,568 | 002,029,583 | Temporary Addresses |
| 002,029,584 | 002,031,614 | Reserved for Future Use |
| 002,031,615 | 002,100,224 | Not Used - Illegal |
| 002,100,225 | 999,999,999 | Long Addresses |

Note: The FLEXprotocol supports "Long" addresses up to 1,075,842,048 however the 9 digit "Long" address cap code convention limit is 999,999,999

CAPCODE Assignment Table

Standard Frame and Phase Embedding Rule

Maximum battery life in a FLEX pager is achieved when all of the addresses assigned to a pager are in the same frame. For Single Phase pagers, it is also a requirement that all of the assigned addresses be in the same phase.

Normally, it is very desirable to spread the population of FLEX pagers on a system across all four phases of all 128 frames. Frame and phase spreading can be performed automatically as addresses are assigned sequentially by embedding that information into the 7 and 9 digit FLEX address.

The standard procedure for deriving the phase and frame values from the CAPCODE starts by separating the 7 or 9 digit decimal address portion (field to the right of the Alpha character) and performing a decimal to binary conversion. The least significant bit is labeled "bit 0", in order the following "bits 2 and 3" specify phases 00, 01, 10, or 11 for phase 0,1,2,3 (a,b,c,d), and "bits 4-10" represent frames "000" through "127".

The frame and phase can also be derived from the 7 or 9 digit decimal address by using modulo arithmetic (base 10) where Phase = Modulo 4 (Integer (Addr/4)) and Frame = Modulo 128 (Integer (Addr/16))

This definition has the property that when addresses are assigned in order, the phase will increment after assigning 4 consecutive addresses while the frame will increment after 16 addresses have been assigned.

CAPCODE Alpha Character Definition

The alpha character in the FLEX CAPCODE indicates the type of pager to which the address is assigned ("Single phase", "Any phase", or "All phase" ), if the address is the first, second, third or fourth address in the pager (assuming the addresses use the standard rules) and the rules to follow in determining the phase and frame for which the address is active.

| Standard Rules | No Rules (Non-Standard Form) |
|---|---|
| A - Single Phase Subtract 0 | U - Single Phase, Phase 0 |
| B - Single Phase Subtract 1 | V - Single Phase, Phase 1 |
| C - Single Phase Subtract 2 | W - Single Phase, Phase 2 |
| D - Single Phase Subtract 3 | X - Single Phase, Phase 3 |
| E - Any Phase Subtract 0 | Y - Any Phase |
| F - Any Phase Subtract 1 | |
| G - Any Phase Subtract 2 | |
| H - Any Phase Subtract 3 | |
| I - All Phase Subtract 0 | Z - All Phase |
| J - All Phase Subtract 1 | |
| K - All Phase Subtract 2 | |
| L - All Phase Subtract 3 | |

The alpha character "A" represents a single phase pager using the standard rules for embedding phase and frame. A letter "B" is similar to "A" except 1 is subtracted from the CAPCODE before applying the standard rule. Likewise the letter "C" and "D" indicates that 2 or 3 is to be subtracted before applying the rule. (These rules modify the standard rule and are intended to simplify the order entry process for multiple address pagers. It is assumed that addresses will be assigned in sequential order i.e. the salesman will indicate that a certain range of addresses are to be used. When a quantity of 4 address pagers are ordered with the requirement that addresses assigned to each pager to be in the same phase and frame, the subtract 1,2,3 ensures that the calculation for each additional address is referenced back to the first address.)

"E through H" and "I through L" represent "Any" and "All" phase pagers where the subtract rule is modified to ensure that all addresses of a multiple address pager are in the same frame.

For the cases where no rule is defined the letters "U through X" indicate single phase pagers assigned to phases 0 through 3 with the frame and battery cycle displayed explicitly. "Y" and "Z" indicate non-standard any and all phase pagers.

Interim or "Phantom" TNPP FLEX

This initial form of TNPP supporting FLEX in system which already contain POCSAG will be limited to the standard CAPCODE rule (no pre-subtraction alphas supported). This means that if multiple address pagers are desired they must be chosen so the simple rule applies. For example, a 4 address single phase pager must have its first address evenly divisible by 4 in order that the standard rule will result in the next 3 address in the same phase and frame. Likewise a 16 address any phase pager must have a first address which is evenly divisible by 16 so that all 16 addresses are in the same frame.

TNPP Revision 3.6 and Beyond

This level of TNPP supports the frame and phase characteristics of FLEX. The terminal will use the Alpha characters in the capcode to derive the explicit frame, phase and battery cycle.

CAPCODE to Binary Conversion

To convert a short address CAPCODE, the number 32,768 is added to the 7 digit decimal CAPCODE address. This resultant number is then converted to a 21 bit binary number which becomes the information bits of the (31,21)BCH code word. (The LSB calculated becomes the first bit on the channel followed by the remaining information bits and the 10 parity bits.) The 32nd overall even parity bit is added to make the 32 bit address code word.

To convert a long CAPCODE, the number 2,067,457 is subtracted from the 9 digit decimal CAPCODE address. This "Resultant" number is then divided by 32,768 with the remainder plus 1 equal to the 1st long address word (same as "Resultant" Modulo 32768 plus 1). This value is converted to a 21 bit binary number which becomes the information bits in the (32,21)BCH code word generation. Again LSB first bit on the channel.

The 2nd long address word is determined by first calculating the Integer portion of the "Resultant" divided by 32,768. This value is then subtracted from 2,097,151 (Equivalent to 1's complement of the value in binary) and converted to a 21 bit binary number which becomes the information bits in the (32,21)BCH code word generation. LSB first bit on the channel.

Binary to CAPCODE Conversion

Given the address code word values the CAPCODE can be calculated by performing the inverse of the above process. The short address code word is converted to decimal and the number 32,768 is subtracted to arrive at the 7 digit address portion of the CAPCODE. For a long address the 2nd NW word is complemented (or subtracted from 2,097,151 decimal) and converted to decimal. This value is multiplied by 32,768, added to 2,067,456 and then added to the 1st NW address word converted to decimal. The resultant is the 9 digit address portion of the FLEX CAPCODE.

If the pager contains only a single individual address and the user is content with the recommended 30 second battery cycle then the letter "A", "E", or "I" is added as a prefix to the 7 or 9 digit address. ("A" Single Phase Pager, "E" Any phase pager, and "I" All phase pager)

If the pager were to be a two address pager where both addresses are individual addresses then "A", "E", or "I" would again preface the address field of the first address. "B", "F", or "J" would preface the second address. The "B, F, J" indicates that the address is a second address and it is to have the properties of the first address. This rule eliminates the need for an order entry operator or a salesman to calculate a starting address which would allow standard rule to always apply.

In other cases especially where a group address is to be included it is very likely that the "U" through "Z" forms of the CAPCODE will be used so that phase and frame can be explicitly chosen to provide best battery life (and same phase operation in the case of the single phase products).

In view of the aforementioned description and appendix, what has been described includes a method and apparatus capable of conserving power while searching for the occurrence of its own group.

What is claimed is:

1. In a selective call receiver having a power consuming circuit for receiving a synchronous communication signal having a multiplicity of frames, each of the multiplicity of frames having a frame synchronization signal and a frame identification signal being a member of a plurality of frame identification signals, each of the plurality of frame identification signals occurring in a predetermined sequence, the selective call receiver having means for storing, the means for storing having an assigned frame identification signal corresponding to one of the plurality of frame identification signals and a first mask, a method of conserving power during an interval of time after acquiring frame synchronization and before a first occurrence of a desired frame of the multiplicity of frames, comprising the steps of:

enabling the power consuming circuit;

receiving the frame synchronization signal to acquire frame synchronization;

receiving one of the plurality of frame identification signals to produce a received frame identification signal;

wherein each frame comprises a second mask;

comparing the assigned frame identification signal with the first mask stored in the selective call receiver and the second mask received from the one of the plurality of frames to generate a plurality of assigned frame identification signals;

determining the first occurrence of the desired frame of the multiplicity of frames as a result of the plurality of assigned frame identification signals generated in the step of comparing; and disabling the power consuming circuit until the first occurrence of the desired frame.

2. The method according to claim 1 wherein the desired frame corresponds to the one of the multiplicity of frames having the frame identification signal equivalent to the assigned frame identification signal.

3. The method according to claim 1 wherein the plurality of frame identification signals corresponds to $2^N$ frame identification signals, the predetermined sequence corresponds to a consecutive sequence from zero to $2^N-1$, and said step of determining determines the first occurrence of the desired frame by determining a number of intervening frames of the multiplicity of frames occurring between a frame having the received frame identification signal and a other frame having a next occurring one of the plurality of assigned frame identification signals.

4. In a selective call receiver having a power consuming receiver circuit for receiving a synchronous communication signal having a multiplicity of frames, each of the multiplicity of frames having system mask signals and an identification signal being a member of a plurality of identification signals, each of the plurality of identification signals occurring in a predetermined sequence, the selective call receiver having a mask for generating at least one assigned identification signal, each of the at least one assigned identification signal corresponding to one of the multiplicity of frames, a method of producing at least one desired identification signal prior to the first occurrence of a frame of the multiplicity of frames having the identification signal equivalent to the at least one assigned identification signal, comprising:

enabling the power consuming receiver circuit;

receiving one of the plurality of identification signals to produce a received identification signal during a one frame of the multiplicity of frames, the one frame being a frame other than an at least one frame of the multiplicity of frames having the identification signal equivalent to the at least one assigned identification signal;

receiving system mask signals during the one frame;

generating a system mask from the system mask signals;

generating at least one desired frame signal by comparing the mask and the system mask;

determining a number of intervening frames of the multiplicity of frames occurring between the one frame having the received identification signal and a next occurring one of the at least one frame having the desired identification number;

disabling the power consuming receiving circuit during the occurrence of the number of intervening frames.

* * * * *